US012373885B1

(12) United States Patent
Bent, II

(10) Patent No.: US 12,373,885 B1
(45) Date of Patent: *Jul. 29, 2025

(54) SYSTEMS, METHODS AND PROGRAM PRODUCTS FOR ALLOCATION TO MAXIMIZE INSURANCE OR MAXIMIZE INTEREST FOR CLIENT ACCOUNTS

(71) Applicant: Island Intellectual Property, LLC, Manhasset, NY (US)

(72) Inventor: Bruce R. Bent, II, New York, NY (US)

(73) Assignee: Island Intellectual Property, LLC, Manhasset, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/652,243

(22) Filed: May 1, 2024

Related U.S. Application Data

(63) Continuation of application No. 17/534,546, filed on Nov. 24, 2021, now Pat. No. 12,051,104.

(60) Provisional application No. 63/117,590, filed on Nov. 24, 2020.

(51) Int. Cl.
   *G06Q 40/02* (2023.01)
   *G06Q 40/08* (2012.01)
(52) U.S. Cl.
   CPC ............ *G06Q 40/02* (2013.01); *G06Q 40/08* (2013.01)
(58) Field of Classification Search
   CPC ................................ G06Q 40/02; G06Q 40/08
   See application file for complete search history.

(56) References Cited

U.S. PATENT DOCUMENTS

| 4,232,367 | A | * | 11/1980 | Youden | G06Q 40/03 708/134 |
| 4,346,442 | A | | 8/1982 | Musmanno | |
| 4,376,978 | A | | 3/1983 | Musmanno | |
| 4,597,046 | A | | 6/1986 | Musmanno et al. | |
| 4,674,044 | A | | 6/1987 | Kalmus et al. | |
| 4,694,397 | A | | 9/1987 | Grant et al. | |
| 4,700,297 | A | | 10/1987 | Hagel et al. | |
| 4,751,640 | A | | 6/1988 | Lucas et al. | |
| 4,774,663 | A | * | 9/1988 | Musmanno | G06Q 40/02 705/36 R |

(Continued)

FOREIGN PATENT DOCUMENTS

AU    2001286897 A1    3/2002
WO    2002021374 A1    3/2002

OTHER PUBLICATIONS

Memorandum from Ken Johnson re: Insured Deposit Products, Aug. 18, 1992, 3 pgs.

(Continued)

Primary Examiner — Bennett M Sigmond
Assistant Examiner — Marla Hudson
(74) Attorney, Agent, or Firm — Amster, Rothstein & Ebenstein LLP

(57) ABSTRACT

Systems, methods, and program products of performing a deposit transaction in which allocations to depository accounts are made in accordance with customer selection of maximum interest coverage or maximum interest rate. Maximum balances associated with maximum interest customers and maximum insurance customers are taken into account at each depository institution to determine an optimal allocation that meets customer's preferences without exceeding the maximum balances.

12 Claims, 14 Drawing Sheets

(56) References Cited

U.S. PATENT DOCUMENTS

| | | |
|---|---|---|
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,649,116 A | 7/1997 | Mccoy et al. |
| 5,671,363 A | 9/1997 | Cristofich et al. |
| 5,689,650 A | 11/1997 | Mcclelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,241 A | 10/1998 | Stein et al. |
| 5,826,243 A | 10/1998 | Musmanno et al. |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,041,314 A | 3/2000 | Davis |
| 6,044,371 A | 3/2000 | Person et al. |
| 6,047,324 A | 4/2000 | Ford et al. |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,732 A | 11/2000 | Tarbox |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | Mcnamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,366,695 B1 | 4/2008 | Allen-Rouman et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 | 7/2008 | Arena et al. |
| 7,440,914 B2 | 10/2008 | Jacobsen |
| 7,502,758 B2 | 3/2009 | Burke |
| 7,505,937 B2 | 3/2009 | Dilip et al. |
| 7,509,286 B1 | 3/2009 | Bent et al. |
| 7,519,551 B2 | 4/2009 | Bent et al. |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 | 12/2009 | Hyland |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,707,106 B1 | 4/2010 | Swanson et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,849,003 B2 | 12/2010 | Egnatios et al. |
| 7,860,771 B2 | 12/2010 | Colvin |
| 7,865,435 B1 | 1/2011 | Medina, III |
| 7,873,571 B1 | 1/2011 | Wehmer |
| 7,873,677 B2 | 1/2011 | Messing et al. |
| 7,886,969 B2 | 2/2011 | Antoo et al. |
| 7,890,424 B1 | 2/2011 | Wakim et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,084 B1 | 9/2011 | Hirka et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,984 B2 | 10/2011 | Elterich |
| 8,036,986 B2 | 10/2011 | Jacobsen |
| 8,051,004 B2 | 11/2011 | Jacobsen |
| 8,051,005 B2 | 11/2011 | Jacobsen |
| 8,055,557 B2 | 11/2011 | Sorbe et al. |
| 8,069,113 B2 | 11/2011 | Elterich |
| 8,086,508 B2 | 12/2011 | Dheer et al. |
| 8,090,651 B2 | 1/2012 | Winslow et al. |
| 8,095,446 B2 | 1/2012 | Green et al. |
| 8,103,582 B1 | 1/2012 | Zettner |
| 8,108,272 B2 | 1/2012 | Sorbe et al. |
| 8,121,943 B2 | 2/2012 | Elterich |
| RE43,246 E | 3/2012 | Bent et al. |

(56) References Cited

U.S. PATENT DOCUMENTS

| | | |
|---|---|---|
| 8,150,766 B1 | 4/2012 | Bent et al. |
| 8,191,156 B2 | 5/2012 | Kubo |
| 8,200,554 B1 | 6/2012 | Foss et al. |
| 8,234,188 B1 * | 7/2012 | Phillips .................. G06Q 40/12 705/30 |
| 8,239,321 B1 | 8/2012 | Bent et al. |
| 8,244,611 B2 | 8/2012 | Galit |
| 8,260,697 B1 | 9/2012 | Bent et al. |
| 8,260,705 B1 | 9/2012 | Bent et al. |
| 8,275,703 B1 | 9/2012 | Billman |
| 8,290,859 B1 | 10/2012 | Bent et al. |
| 8,290,860 B1 | 10/2012 | Bent et al. |
| 8,290,861 B1 | 10/2012 | Bent et al. |
| 8,306,912 B2 | 11/2012 | Galit |
| 8,311,916 B1 | 11/2012 | Bent et al. |
| 8,311,939 B1 | 11/2012 | Bent et al. |
| 8,326,766 B2 | 12/2012 | Hirka et al. |
| 8,352,342 B1 | 1/2013 | Bent et al. |
| 8,355,985 B1 | 1/2013 | Bent et al. |
| 8,359,267 B1 | 1/2013 | Bent et al. |
| 8,364,586 B1 | 1/2013 | Medina, III |
| 8,370,236 B1 | 2/2013 | Bent |
| 8,380,621 B1 | 2/2013 | Bent et al. |
| 8,386,382 B1 | 2/2013 | Bent |
| 8,386,383 B1 | 2/2013 | Bent |
| 8,392,299 B2 | 3/2013 | Sorbe et al. |
| 8,392,304 B1 | 3/2013 | Phillips et al. |
| 8,392,330 B2 | 3/2013 | Sorbe et al. |
| 8,401,962 B1 | 3/2013 | Bent |
| 8,429,074 B2 | 4/2013 | Galit |
| 8,452,702 B1 | 5/2013 | O'Donnell |
| 8,458,089 B1 | 6/2013 | Gareis |
| 8,498,933 B1 | 7/2013 | Bent et al. |
| 8,571,984 B1 | 10/2013 | Bent et al. |
| 8,583,515 B2 | 11/2013 | Sorbe et al. |
| 8,589,295 B2 | 11/2013 | Sorbe et al. |
| 8,606,676 B1 | 12/2013 | Bent et al. |
| 8,612,324 B1 | 12/2013 | Bent et al. |
| 8,630,943 B2 | 1/2014 | Maricondi |
| 8,655,689 B1 | 2/2014 | Gareis |
| 8,660,928 B2 | 2/2014 | Green |
| 8,666,887 B2 | 3/2014 | Elterich |
| 8,682,730 B2 | 3/2014 | Hirka et al. |
| 8,688,577 B1 | 4/2014 | Bent |
| 8,712,911 B1 | 4/2014 | Bent et al. |
| 8,719,062 B1 | 5/2014 | Bent et al. |
| 8,719,157 B1 | 5/2014 | Bent et al. |
| 8,781,931 B1 | 7/2014 | Bent et al. |
| 8,788,409 B1 | 7/2014 | Souza |
| 8,788,414 B2 | 7/2014 | Sorbe et al. |
| 2001/0023414 A1 | 9/2001 | Kumar et al. |
| 2001/0032182 A1 | 10/2001 | Kumar et al. |
| 2002/0007330 A1 | 1/2002 | Kumar et al. |
| 2002/0046144 A1 | 4/2002 | Graff |
| 2002/0069147 A1 | 6/2002 | Sheehan et al. |
| 2002/0082981 A1 | 6/2002 | Madden |
| 2002/0087454 A1 | 7/2002 | Calo et al. |
| 2002/0091637 A1 | 7/2002 | Bent |
| 2002/0095592 A1 | 7/2002 | Daniell et al. |
| 2002/0128951 A1 | 9/2002 | Kiron et al. |
| 2002/0161707 A1 | 10/2002 | Cole et al. |
| 2002/0165757 A1 | 11/2002 | Lisser |
| 2002/0174048 A1 | 11/2002 | Dheer et al. |
| 2002/0178098 A1 | 11/2002 | Beard |
| 2002/0194099 A1 | 12/2002 | Weiss |
| 2003/0023529 A1 | 1/2003 | Jacobsen |
| 2003/0041003 A1 | 2/2003 | Kayser, III |
| 2003/0065642 A1 | 4/2003 | Zee |
| 2003/0080185 A1 | 5/2003 | Werther |
| 2003/0135437 A1 | 7/2003 | Jacobsen |
| 2003/0149646 A1 | 8/2003 | Chen et al. |
| 2003/0163403 A1 | 8/2003 | Chen et al. |
| 2003/0177092 A1 | 9/2003 | Paglin |
| 2003/0191702 A1 | 10/2003 | Hurley |
| 2003/0200174 A1 | 10/2003 | Star |
| 2003/0208438 A1 | 11/2003 | Rothman |
| 2003/0236728 A1 | 12/2003 | Sunderji et al. |
| 2004/0039674 A1 | 2/2004 | Coloma |
| 2004/0107157 A1 | 6/2004 | Bleunven et al. |
| 2004/0111361 A1 | 6/2004 | Griffiths et al. |
| 2004/0128229 A1 | 7/2004 | Raines et al. |
| 2004/0128235 A1 | 7/2004 | Kemper et al. |
| 2004/0138974 A1 | 7/2004 | Shimamura et al. |
| 2004/0153398 A1 | 8/2004 | Baumgartner et al. |
| 2004/0153400 A1 | 8/2004 | Burke |
| 2004/0162773 A1 | 8/2004 | Del et al. |
| 2004/0177036 A1 | 9/2004 | Nutahara et al. |
| 2004/0249741 A1 | 12/2004 | Understein |
| 2005/0044035 A1 | 2/2005 | Scott |
| 2005/0044038 A1 | 2/2005 | Whiting et al. |
| 2005/0091137 A1 | 4/2005 | Woeber |
| 2005/0102225 A1 | 5/2005 | Oppenheimer et al. |
| 2005/0102226 A1 | 5/2005 | Oppenheimer et al. |
| 2005/0108120 A1 | 5/2005 | Malka et al. |
| 2005/0108149 A1 | 5/2005 | Bent et al. |
| 2005/0114246 A1 | 5/2005 | Coloma |
| 2005/0149436 A1 | 7/2005 | Elterich |
| 2005/0154662 A1 | 7/2005 | Langenwalter |
| 2005/0177496 A1 | 8/2005 | Blagg et al. |
| 2005/0228733 A1 | 10/2005 | Bent et al. |
| 2006/0004655 A1 | 1/2006 | Alexander et al. |
| 2006/0047593 A1 | 3/2006 | Naratil et al. |
| 2006/0106703 A1 | 5/2006 | Del et al. |
| 2006/0155644 A1 | 7/2006 | Reid et al. |
| 2006/0167773 A1 | 7/2006 | Yang et al. |
| 2006/0212385 A2 | 9/2006 | Bent et al. |
| 2006/0212389 A2 | 9/2006 | Bent et al. |
| 2006/0213980 A1 | 9/2006 | Geller et al. |
| 2006/0273152 A1 | 12/2006 | Fields |
| 2006/0282356 A1 | 12/2006 | Andres et al. |
| 2007/0043666 A1 | 2/2007 | Burdette |
| 2007/0083938 A1 | 4/2007 | Aoki et al. |
| 2007/0118449 A1 | 5/2007 | De La Motte et al. |
| 2007/0130065 A1 | 6/2007 | Staab et al. |
| 2007/0143196 A1 | 6/2007 | Colvin |
| 2007/0198404 A1 | 8/2007 | Hirka et al. |
| 2007/0255655 A1 | 11/2007 | Kemper et al. |
| 2007/0271174 A2 | 11/2007 | Bent et al. |
| 2007/0276752 A1 | 11/2007 | Whiting et al. |
| 2007/0288400 A1 | 12/2007 | Menon |
| 2008/0015985 A1 | 1/2008 | Abhari et al. |
| 2008/0046358 A1 | 2/2008 | Holm-Blagg et al. |
| 2008/0065532 A1 | 3/2008 | De La Motte |
| 2008/0077996 A1 | 3/2008 | Kubo |
| 2008/0097899 A1 | 4/2008 | Jackson et al. |
| 2008/0120228 A1 | 5/2008 | Bent et al. |
| 2008/0133280 A1 | 6/2008 | Ziegler |
| 2008/0133396 A1 | 6/2008 | De La Motte |
| 2008/0195534 A1 | 8/2008 | Landis et al. |
| 2008/0222053 A1 | 9/2008 | Jacobsen |
| 2008/0288398 A1 | 11/2008 | Maricondi |
| 2009/0006985 A1 | 1/2009 | Fong et al. |
| 2009/0012899 A1 | 1/2009 | Friesen |
| 2009/0024496 A1 | 1/2009 | Balachandran et al. |
| 2009/0043699 A1 | 2/2009 | Elterich |
| 2009/0043701 A1 | 2/2009 | Elterich |
| 2009/0055313 A1 | 2/2009 | Elterich |
| 2009/0119227 A1 | 5/2009 | Green et al. |
| 2009/0138412 A1 | 5/2009 | Jacobsen |
| 2009/0150284 A1 | 6/2009 | Burke |
| 2009/0164320 A1 | 6/2009 | Galit |
| 2009/0164350 A1 | 6/2009 | Sorbe et al. |
| 2009/0164351 A1 | 6/2009 | Sorbe et al. |
| 2009/0164352 A1 | 6/2009 | Sorbe et al. |
| 2009/0164353 A1 | 6/2009 | Sorbe et al. |
| 2009/0164368 A1 | 6/2009 | Galit |
| 2009/0164370 A1 | 6/2009 | Sorbe et al. |
| 2009/0241197 A1 | 9/2009 | Troyansky |
| 2009/0327154 A1 | 12/2009 | Van Vooren et al. |
| 2010/0268668 A1 | 10/2010 | Burdette |
| 2010/0274687 A1 | 10/2010 | Ghosh et al. |
| 2010/0274718 A1 | 10/2010 | Ghosh et al. |
| 2011/0106703 A1 * | 5/2011 | Jay ........................ G06Q 20/10 705/44 |

(56) References Cited

U.S. PATENT DOCUMENTS

| | | |
|---|---|---|
| 2011/0131103 A1 | 6/2011 | Hirka et al. |
| 2011/0208640 A1 | 8/2011 | Geoghegan et al. |
| 2011/0246359 A1 | 10/2011 | O'Brien et al. |
| 2011/0270720 A1 | 11/2011 | Manohar |
| 2011/0276473 A1 | 11/2011 | Blok |
| 2012/0016782 A1 | 1/2012 | Hardison, III |
| 2012/0041875 A1 | 2/2012 | Sorbe et al. |
| 2012/0047066 A1 | 2/2012 | Sorbe et al. |
| 2012/0078750 A1 | 3/2012 | Watkins |
| 2012/0179628 A1 | 7/2012 | Green |
| 2012/0197689 A1* | 8/2012 | Hunter ............... G06Q 30/0207 705/14.1 |
| 2013/0030971 A1 | 1/2013 | Weiss et al. |
| 2013/0030974 A1 | 1/2013 | Casey et al. |
| 2013/0066702 A1 | 3/2013 | Galit |
| 2013/0159152 A1 | 6/2013 | Minor et al. |
| 2013/0179339 A1 | 7/2013 | Sorbe et al. |
| 2013/0232080 A1 | 9/2013 | Galit |
| 2013/0238505 A1 | 9/2013 | Hirka et al. |
| 2014/0012726 A1 | 1/2014 | Kruse |
| 2014/0052625 A1 | 2/2014 | Sorbe et al. |
| 2014/0143140 A1 | 5/2014 | Elterich |
| 2014/0180962 A1 | 6/2014 | Fiala et al. |
| 2014/0188737 A1 | 7/2014 | Salah et al. |
| 2014/0344158 A1 | 11/2014 | Hirka et al. |
| 2018/0158049 A1* | 6/2018 | Jackson ............... G06Q 20/023 |
| 2020/0294150 A1* | 9/2020 | Smith ................... G06Q 40/06 |

OTHER PUBLICATIONS

Memorandum from John E. Oncken re: Insured Savings Update, Jun. 15, 1990, 7 pgs.

Memorandum from John E. Oncken re: Brokered Deposit Issue vs. Insured Savings, Mar. 22, 1990, 8 pgs.

Memorandum from Ed Piner re: Insured Savings Product Update, Feb. 1, 1990, 4 pgs.

Insured Savings Correspondent Agreement with Exhibits A-D, 28 pgs.

First City, Texas Insured Savings Agency Agreement with Exhibits A-B and Insured Savings Program, 1996 or earlier; 10 pgs.

Product Bulletin from Bill McCain, Subject: Insured Savings Product Announcement, May 8, 1989, 7 pgs.

Insured Savings Project Team Meeting, Feb. 2, 1989, 16 pgs.

Insured Savings Product Description, Product Name: Insured Savings, Product Description: U.S. Pat. No. 4,985,833, 3 pgs.

Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.

Automatic Insured Deposit Method, Patent Application Information, Jul. 11, 1988, 17 pgs.

Insured Savings, Overview & Marketing Plan, Dec. 6, 1988, 23 pgs.

Memorandum from Dick Zinser, re: A First City-Austin deposit program to hold existing customers' deposits, Mar. 17, 1988, 7 pgs.

Insured Savings Remote Site Sweep Procedures, 1996 or earlier; 3 pgs.

Letter to Malcolm L. Duke, Dec. 27, 1989 with Insured Savings Correspondent Agreement, Exhibits A-D, and Letter to Malcolm L. Drake, Nov. 21, 1989, 37 pgs.

Memorandum from Ken Johnson, re: Attached Insured Savings Letters, Jul. 5, 1990, 1 pg.

Letter to Jerry Crutsinger, Jul. 3, 1990, 1 pg.

Letter to Bill Goertz, Jul. 3, 1990, 1 pg.

Letter to Susan Goodwin, Jul. 3, 1990, 1 pg.

Insured Savings Rate Change Notice, Jul. 17, 1990; 1 pg.

Addendum to Insured Savings Agency Agreement, Jul. 17, 1990; 1 pg.

Letter to Paula Martin, Jul. 3, 1990, 1 pg.

Letter to John Lovell, Jul. 3, 1990, 1 pg.

Insured Savings Balance Limits form, 1996 or earlier; 1 sheet.

Email from John Oncken re: Depository Levels at Insured Savings Depositories, Nov. 2, 1989, 1 pg.

Cash Management Balance Monitoring Agreement Form; 1996 or earlier; 1 sheet.

Memorandum from Ed Piner, Subject: Discontinuation of Automatic Balance Monitoring in conjunction with Insured Savings Accounts, May 21, 1991, 1 pg.

Blank form letter from Edward N. Piner, May 24, 1991, 1 pg.

Letter from First City National Bank of Austin, Sep. 20, 1982, 5 pgs.

First City, Texas—Austin, Special Products, Feb. 20, 1992, with Schedule A & Schedule B, 6 pgs.

Letter From William W. Wiles, Secretary of the Board, Board of Governors of the Federal Reserve System, Jun. 22, 1983, 6 Sheets.

Letter From Oliver I. Ireland, Associate General Counsel, Board of Governors of the Federal Reserve System, Jun. 22, 1988, 5 Sheets.

Alliance Insured Account, Information Statement, Sep. 1999, 6 sheets.

Lawsuit by Carlo DeBlasio et al. and Merrill Lynch & Co., Inc et al., Opinion and Order, Jul. 27, 2009, Civil Action No. 07 CIV. 318, 47 pgs.

Lawsuit by Carlo DeBlasio et al. and Merrill Lynch & Co., Inc et al., Second Amended Class Action Complaint, Jury Trial Demanded, Jun. 11, 2007, Civil Action No. 07 cv 318, 137 pgs.

Investors MoneyAccount$^{SM}$ and Insurance Plus Service Agreement, Schedule A, Mar. 1994; 3 sheets.

Investors MoneyAccount$^{SM}$ (an FDIC-insured money market account), Apr. 1996; 4 sheets.

Investors MoneyAccount$^{SM}$ The FDIC-Insured Money Market with an Important Plus., Apr. 1996; 2 sheets.

Investment Company Act of 1940—Section 3(a)(1), 2(a)(36); Securities Act of 1933—Section 2(1), Nov. 29, 1985, Kempter Financial Services, Inc., 9 pgs.

Insured Money Account Program Agreement and Disclosure Statement, Mar. 2000; 11 sheets.

First National Bank in Brookings, Certificates of Deposit, Jul. 17, 2009 5 sheets.

Summary of Commentary on Current Economic Conditions by Federal Reserve Districts, Jan. 1985, 44 pgs.

Board of Governors of the Federal Reserve System, Blank Form Letter, Apr. 22, 2004, 8 pgs.

FDIC Law, Regulations, Related Acts, 4000—Advisory Opinions, FDIC-93-35, Jun. 28, 1993, 2 sheets.

§204.134, 12 CFR Ch. 11 (Jan. 1, 2009 Edition), 2 sheets.

Money Fund $$ Moving to Bank Deposits, 6 *FRC Monitor*, Dec. 2003, 2 sheets.

Crane, P. & Krasner, Mike, *An iMoney Net Special Report™*, "Brokerage Cash Sweep Options: The Shift from Money Funds to FDIC-Insured Bank Deposit Accounts", Nov. 2004, 64 pgs.

The May 1998 Senior Financial Officer Survey, *Board of Govenors of the Federal Reserve System*, with Appendix A, 48 pgs.

Interest Rate Review © A Publication of *Meyer Weekly Interest Rate Survey*, A Look at Tiers, vol. II, No. 4, Apr. 1987, 6 pgs.

Interest Rate Review © A Publication of *Meyer Weekly Interest Rate Survey*, A Study of Historical Rates and Yields, vol. II, No. 6, Jun. 1987, 8 pgs.

Blank form letter to Oliver Ireland, Oct. 7, 1994, 1 pg.

Letter to L.P. Fleming, Jr. Esq., Feb. 7, 1995, 3 pgs.

Letter to James E. Creekman, Aug. 1, 1995, 4 pgs.

Letter to Brenda L. Skidmore, Aug. 30, 1995, 4 pgs.

Merrill Lynch & Co., Inc. Form 10-K405 (Annual Report (Regulation S-K, item 405)), Filed Mar. 14, 02 for the Period Ending Dec. 28, 2001, with Schedules, Exhibits, and 2001 Annual Report, 248 pgs.

Merrill Lynch & You, "Financial Services the Way You Want, When You Want Them," Jan. 2000 4 Sheets.

Merrill Lynch, Pierce, Fenner & Smith Incorporated, "Information Statement," 2000, 12 Sheets.

Merrill Lynch, Information Statement Regarding Changes to Interest Rates on Deposits in the Merrill Lynch Banks, Document 64-14, Nov. 12, 2007, Case 1:07-cv-00318, 2 sheets.

Street Talk, "Merrill Moves CMA Cash to Bank", *On Wall Street*, Nov. 2000, 1 sheet.

Quest Insured Account, *QUESTessentials*, May 17, 1994; 3 sheets.

(56) References Cited

OTHER PUBLICATIONS

Quest Insured Account, *Information Statement*, 5 sheets.
OCC Insured Bank Deposit Account, Jun. 1993; 3 sheets.
Insured Bank Deposit Account, *Information Statement*, Jul. 1, 2000, 2 sheets.
Letter from Marilyn J. Hensle, announcing Salomon Smith Barney Bank Deposit Program.$^{SM}$, with Q&A, Aug. 16, 2000; 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 1982; 18 pgs.
The Insured Savings Account, Issuer Guide to Offering MMDAs through Merrill Lynch, Jul. 1986; 27 pgs.
Insured Savings Account Fact Sheet, The Merrill Lynch Cash Management Account Financial Service, Apr. 1987, 11 pgs.
CMA Insured Savings Account Fact Sheet, Jul. 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, American Banker, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by *Island Intellectual Property LLC and Intrasweep LLC* against *Deutsche Bank Trust Company Americas and Total Bank Solutions*, Complaint for Patent Infringement, Jury Trial Demanded, Feb. 23, 2010, Case No. 10 CV 1518, (Document 1).
Lawsuit by *Island Intellectual Property LLC and Lids Capital LLC* against *Deutsche Bank Trust Company Americas and Total Bank Solutions*, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial agility for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.
Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. Plus Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denison Company, Sheboygan, WI, retrieved from internet Nov. 2, 2009; 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, May 2006; 2 sheets.
Customer Agreement, Cleared Through Legent Clearing, May 2006; 3 pgs.
Cash Management, Mesirow Financial—B/D and IA Services, www.mesirowfinancial.com/bdia/cas_mgmt.jsp, Jan. 15, 2010, 2 sheets.
Frequently Asked Questions: FDIC Sweep Program, optionsXpress, retrieved from internet Jan. 6, 2010; www.optionsxpress.com/welcom/faq/aq/fdc.aspx#rate.
Terms & Conditions for optionsXpress' Bank Insured Deposit Program, optionsXpress, Oct. 14, 2009; 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.

(56) References Cited

OTHER PUBLICATIONS

Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, January 6, 2010m 6 pgs.
Money Market Mutual Fund and FDIC-Insured Deposit Program Rates & Bank List, Jan. 5, 2010; www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, Apr. 2007; 12 pgs.
Insured deposit account program disclosure booklet, 16 pgs.
Update New FDIC product at IPI: Deutsche Bank Insured Deposit Program, Investment Professionals Inc, Feb. 4, 2009, 11 pgs.
Insured cash account, , http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, Jul. 17, 2009; 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, 2 sheets.
Client account agreement to Sterne Agee Clearing, Inc, Sterne, Agee & Leach, Inc and its authorized agents, Feb. 3, 2009, 5 pgs.
Valet a full service asset management account, http://valetaccount.com/visaTerms.php, Nov. 12, 2009, 6 pgs.
A sweet suite of business products brings our bank to you, AndroscogginBank, www.androscogginbank.com, 1 sheet.
We have your banking needs covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.
Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/, Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/, Nov. 2, 2009, 1 sheet.
Over $12,5 million of FDIC deposit insurance available, Insured Deposit Program, Deutsche Bank, Apr. 2009; www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, retrieved from internet May 14, 2009; 2 sheets.
Insured deposit online, The Insured Deposit Program, Evolve Bank & Trust, retrieved from internet Apr. 3, 2009; 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, , www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm, Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Bank, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, Apr. 2009; 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.

(56) References Cited

OTHER PUBLICATIONS

Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, Broker Sweep Program, www.totalbanksolutions.com/brokerweep.htm, Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage FREE Webiners, http://209.235.145/cgi-bin/websuite/tcsassnwebsuite.pl?. . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, Dec. 18, 2009; 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.
CD's pass agencies as largest holding in MMFs: Repo plunges in sept., www.cranedata.us/archives/news/2009/10/, Nov. 3, 2009, 14 pgs.
Lawsuit by *Island Intellectual Property LLC, Lids Capital LLC, Double Rock Corporation, and Intrasweep LLC* against *Deutsche Bank Trust Company Americas, and Total Bank Solutions, LLC*, Defendants' Preliminary Invalidity Contentions, Mar. 12, 2010, Civil Action No. 09 Civ. 2675 (VM) AJP).
Lawsuit *Island Intellectual Property LLC and Intrasweep LLC* against *Institutional Deposits Corp.*, Defendant Institutional Deposits Corp.'s Preliminary Invalidity Contentions, Mar. 15, 2010; Case No. 09-CV-03079-JEC.
Exhibit 1, Invalidity Chart: IMA and Insurance Plus Service Agreement, U.S. Pat. No. 7,509,286, 21 pgs.
Exhibit 2, Invalidity Chart: Investors Money AccountSM System, U.S. Pat. No. 7,509,286, 26 pgs.
Exhibit 3, Invalidity Chart: Insured Money Account System, U.S. Pat. No. 7,509,286, 26 pgs.
Exhibit 4, Invalidity Chart: U.S. Pat. No. 4,985,833 (Oncken), U.S. Pat. No. 7,509,286, 21 pgs.
Exhibit 5, Invalidity Chart: First City Bank of Texas' Insured Savings Program, U.S. Pat. No. 7,509,286, 39 pgs.
Exhibit 6, Invalidity Chart: Quest Insured Account, U.S. Pat. No. 7,509,286, 19 pgs.
Exhibit 7, Invalidity Chart: CIBC World Markets—Insured Bank Deposit Account, U.S. Pat. No. 7,509,286, 16 pgs.
Exhibit 8, Invalidity Chart: Merrill Lynch CMA/ISA Service, U.S. Pat. No. 7,509,286, 72 pgs.
Exhibit 9, Invalidity Chart: 1983 Fed Letter, U.S. Pat. No. 7,509,286, 16 pgs.
Exhibit 10, Invalidity Chart: Merrill Lynch Banking Advantage Program ("MLBA Program"), U.S. Pat. No. 7,509,286, 22 pgs.
Exhibit 11, Invalidity Chart: Merrill Lynch & You + MLBA Information Statement, U.S. Pat. No. 7,509,286, 18 pgs.
Exhibit 12, Invalidity Chart: Smith Barney Insured Deposit Account, U.S. Pat. No. 7,509,286, 22 pgs.
Exhibit 13, Invalidity Chart: Smith Barney Bank Deposit Program, U.S. Pat. No. 7,509,286, 18 pgs.
Exhibit 14, Invalidity Chart: Alliance Insured Account, U.S. Pat. No. 7,509,286, 16 pgs.
Exhibit 15, Invalidity Chart: Reserve's American Express Presentation, U.S. Pat. No. 7,509,286, 16 pgs.
Exhibit 16, Invalidity Chart: U.S. Pat. No. 7,376,606 (Jacobsen), U.S. Pat. No. 7,536,350, 6 pgs.
Exhibit 17, Obviousness Combinations Chart, U.S. Pat. No. 7,509,286, 351 pgs.
Lawsuit by *Island Intellectual Property LLC, et al.* v. *Deutsch Bank Trust Company Americas, et al.*; Defendant Deutsche Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. No. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering of MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Investors MoneyAccountSM and Insurance Plus Service Agreement, attached Schedule A (List of Banks Participating in the Insurance Plus Service), IMAD Mar. 1994, 3 pages.
Investors Money AccountSM (an FDIC-insured money market account), IMA-1; Mar. 1994, 4 pages.
Investors MoneyAccountSM, "The FDIC-Insured Money Market Investment with an Important Plus," IMA Oct. 1995, 2 pages.
1985 SEC No-Act. Lexis 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/20000524121111/www.firstnb.com/cd.htm>; Multi-Bank CDs, <URL: http://web.archive.org/web/20000524132934/www.firstnb.com/mbcd.htm>, 5 pages.

(56) References Cited

OTHER PUBLICATIONS

Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Monitor, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Account, CMA; Broker Begins Testing With 12 Institutions," Sep. 23, 1983, 4 pages.
Bent et al., Office Action U.S. Appl. No. 10/071,053, with attached SB08, dated considered Mar. 10, 2009, 2 pages.
Merrill Lynch & You, "Financial Services the Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Pat. No. 11,767,827, Date Mailed Sep. 23, 2009, 4 pages.
USPTO Office Action, Office Action Summary, U.S. Pat. No. 11,767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promontory Interfinancial Network, LLC, dated Jul. 22, 2008, (attached Attachments A-E), 35 pages.
Letter to C.R. Macedo, from R.L. Rainey, Re: Promontory Interfinancial Network, LLC, dated Oct. 16, 2008, (attached Attachments A-C), 22 pages.
Letter to C.R. Macedo, from R.L. Rainey, Re: Promontory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit ProgramSM, (attached Q&A: Important Information about the New Salomon Smith Barney Bank Deposit Program), Aug. 16, 2002, 14 pages.
Salomon Smith Barney, "Bank Deposit Program Disclosure Statement," 2002; 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 1987; 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved form the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998; 1998; p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, Lexsee 51 FR 9632, "Definition of Deposit and Technical Amendments," Action: Final Rule, Mar. 20, 1986, 13 pages.
Federal Reserve System, Lexsee 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition); Aug. 1980; pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, Lexsee 47 FR 55207, "Reserve Requirements of Depository Institutions; Money Market Deposit Account," Dec. 8, 1982, Action: Final Rule, 5 pages.
Insured Bank Deposits™ Program Summary Information Statement, May 9, 2002; 11 pages.
Insured Bank Deposits™ Program Information Statement, (attached List of Eligible Program Banks, Effective May 9, 2002; New Account Application, Joint Account Agreement), 11 pages.
Wayne Hummer Investments, "Insured Bank Deposits™ Program, Frequently Asked Questions," 2001 or earlier; 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital BuilderSM Account Financial Service, Insured SavingsSM Account Participating Depository Institutions, 1996, 2 pages.
Insured Deposit Account, May 21, 1996, 14 pages.

(56) References Cited

OTHER PUBLICATIONS

An Introduction to the Smith Barney Insured Deposit Account, Sep. 20, 1995; 8 pages.
Smith Barney Inc. Capital Markets, Debt Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
"Bank of Oak Ridge to Offer FDIC Insurance on up to $1.5 Million," Dialog Web Command Mode, 2 Sheets, Sep. 25, 2003, http://www.dialogweb.com/cgi/dwclient.
"Man Bites Dog: Funds Move Into Banking," IBC's Money Fund Selector, 2 Sheets, Nov. 6, 1998.
"Reverse Ups Insurance Limit on Money Market Account," Thomson Financial Inc., Mutual Fund Market News, 1 Sheet, Aug. 26, 2002.
"The Bank of New York adds a $300,000 FDIC-Insured Money Market Account Option to its Dividend Income Checking Account," PR Newswire Associations, Inc., PR Newswire, 2 Sheets, Apr. 18, 2002.
"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.
12 CFR Part 329—Interest on Deposit, Source: 51 FR 10808, Mar. 31, 1986, 5 Sheets.
AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.
AB 2011 Assembly Bill—Bill Analysis, Senate Rules Committee, Third Reading, http://www.leginfo.ca.gov/pub/bill/asm/ab_2001-2050/ab_2011_cfa_20060705_161454_sen_floor.html, 2006, pp. 1-7.
AB 2011 Assembly Bill—Chaptered, http://www.leginfo.ca.gov/pub/bill/asm/ab_2001-2050/ab_2011_bill_20060925_chaptered.html, 2006, pp. 1-3.
AB 2011 Assembly Bill—Enrolled, http://www.leginfo.ca.gov/pub/bill/asm/ab_2001-2050/ab_2011_bill_20060816_enrolled.html, 2006, pp. 1-3.
AB 2011 Assembly Bill—History, Complete Bill History, http://www.leginfo.ca.gov/pub/bill/asm/ab_2001-2050/ab_2011_bill_20060925_history.html, 2006, p. 1.
About iMoneyNet, Inc., About iMoneyNet's Money Funds Division, 4 Sheets, Aug. 21, 2003, http://www.ibcdata.com/about.htm.
Adler, Joe, "Promontory to Roll Out Deposit Service Insuring Liquid Funds", American Banker, Feb. 22, 2010, 1 sheet.
An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.
Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.
Announcing Changes in Automatic "Sweep" Investment Options, LPL Financial Services, Linsco/Private Ledger, Member NASD/SIPC, Jun. 2006; 26 Sheets.
Bank Deposit Program, Online http://web.archive.org/web/20030620100115/http:/www.smithbarney.com/products_servi, Jan. 19, 2001, 4 Sheets.
Bent, "Bruce Bent Makes Money Market Funds Act Like Bank Accounts," Equity BBDP, Oct. 5, 1998, 3 Sheets.
Blackwell, "ABA to Approve System for Sharing Deposit Coverage," American Banker, 2 Sheets, Feb. 11, 2003.
Blackwell, "New Pitch: Deposit Insurance Sharing," American Banker Online, 4 Sheets, Jan. 21, 2003.
Board of Governors of the Federal Reserve System, 1984 Fed. Res. Interp. Ltr. Lexis 56, Nov. 16, 1984, 3 Sheets.
Board of Governors of the Federal Reserve System, 1988 Fed. Res. Interp. Ltr. Lexis 141, Jun. 22, 1988, 3 Sheets.
Board of Governors of the Federal Reserve System, 1989 Fed. Res. Interp. Ltr. Lexis 154, Jun. 21, 1989, 2 Sheets.
Board of Governors of the Federal Reserve System, 1989 Fed. Res. Interp. Ltr. Lexis 77, Mar. 14, 1989, 2 Sheets.
Board of Governors of the Federal Reserve System, 1990 Fed. Res. Interp. Ltr. Lexis 94, Feb. 1, 1990, 1 Sheet.
Board of Governors of the Federal Reserve System, 1991 Fed. Res. Interp. Ltr. Lexis 232, Jan. 30, 1991, 2 Sheets.
Board of Governors of the Federal Reserve System, 1994 Fed. Res. Interp. Ltr. Lexis 156, Jun. 24, 1994, 3 Sheets.
Board of Governors of the Federal Reserve System, 1994 Fed. Res. Interp. Ltr. Lexis 314, Oct. 17, 1994, 2 Sheets.
Board of Governors of the Federal Reserve System, 1994 Fed. Res. Interp. Ltr. Lexis 419, Oct. 14, 1994, 4 Sheets.
Britt, "Struggling with Sweep Accounts," America's Community Banker, vol. 6, No. 12, 11 Sheets, Dec. 1, 1997.
California Independent Bankers, ICBA Independent Community Bankers of America, Banker Bulletin, 2006, CIB 16th Annual Convention, vol. 4, issue 6, http://www.cib.org/banker_bulletin.htm.
Capital Briefs: Corporate Checking Account Relief Sought, American Banker, vol. 162, Jul. 28, 1997, 1 Sheet.
Certificate of Deposit Registry Service: Keeping Deposits in the Corn Patch, Banknews, 2 Sheets. Mar. 2003.
Chapelle et al. "Peering Into Tomorrow: At the Threshold of a New Century, Brokers and Others Discuss Where They were Going," Securities Data Publishing on Wall Street, 6 Sheets, Dec. 1, 1999.
Chapelle, "Merrill's Rivals Say They, Too. Offer Services Beyond Banking," Securities Data Publishing on Wall Street, 2 Sheets, Feb. 1, 2003.
CMA, Insured Savings Account Fact Sheet, Merrill Lynch, Pierce, Fenner & Smith Incorporated, 1997, pp. 49-57.
CMA, Insured Savings Account Fact Sheet, Merrill Lynch, Pierce, Fenner & Smith Incorporated, Jul. 1994, pp. 47-54.
CMA, The Investor Credit Line Service, Cost-Effective Financing for the '90s, Merrill Lynch, Pierce, Fenner & Smith Incorporated, 1997, pp. 36-46.
CMA, The Merrill Lynch Cash Management Account Financial Service, Insured Savings Account Participating Depository Institutions, Merrill Lynch, Pierce, Fenner & Smith Incorporated, Mar. 1995, 2 Sheets.
CMA, The Merrill Lynch Cash Management Account Financial Service, Insured Savings Account Participating Depository Institutions, Merrill Lynch, Pierce, Fenner & Smith Incorporated, Nov. 1992, 2 Sheets.
CMA, The Merrill Lynch Cash Management Account Financial Service, Merrill Lynch, Pierce, Fenner & Smith Incorporated, Jan. 1997, 35 Sheets.
Litigation Notice After Payment of Issue Fee filed in Parent U.S. Appl. No. 10/382,946, filed Apr. 3, 2009, 160 pages.
Coyle, "A Look at commercial Demand Deposit Options," America's Community Banker, vol. 9, Issue 2, Bell & Howell Information and Learning Company, 9 Sheets, Feb. 1, 2000.
Crockett, "Big Banks Found Stepping Up Marketing of 'Sweep' Accounts," American Banker, vol. 159, No. 198, American Banker Inc., 3 Sheets, Oct. 13, 1994.
Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.
Declaration of Mr. Bruce Bent II, Vice Chairman and Registrant of Applicant. (3 Sheets) and Exhibits A, B, C and D (6 Sheets).
Deposit Growth Strategies for Financial Institutions, New Sweep Account Helps Retain $40 Million in Business Deposits, vol. 7, No. 12, The Reserve Funds, May 2001, 1 Sheet.
Deutsche Bank Insured Deposit Program, Marketing Literature 2007, 3 pages.
DI 48, Excerpts of Transcript of Hearing, U.S. Dist. Ct., District of Delaware, Civil Action No. 82-680, Apr. 8, 1983, 5 sheets.

(56) References Cited

OTHER PUBLICATIONS

DI 56, Interrog. Response, U.S. Dist. Ct. District of Delaware, Civil Action No. 82-680, May 20, 1983, 15 Sheets.
DI 99, Suppl. Interrogatory Response, U.S. Dist. Ct., District of Delaware, Civil Action No. 82-630, May 30, 1984, 6 Sheets.
Dreyfus Insured Deposit Program, Disclosure Statement and Terms and Conditions, Dreyfus a BNY Mellon Company, 8 Sheets.
Dreyfus Insured Deposit Program, Multiple List Program—Effective May 11, 2009, 1 Sheet.
Email from Olivia Kim to Charles Macedo on Jun. 9, 2010 with attachement of Lawsuit by *Island Intellectual Property LLC, Lids Capital LLC, Double Rock Corporation, and Intrasweep LLC* against *Deutshe Bank Trust Company Americas and Total Bank Solutions, LLC*, Defendant Deutsche Bank Trust Company America's responses to Intrasweep's common interrogatory Nos. 1-5, Confidential-Attorneys only, Civil Action No. 09 Civ. 2675 (VM) (AJP).
Email from Olivia Kim to Charles Macedo on May 13, 2010 with attachment of Lawsuit by *Island Intellectual Property LLC, Lids Capital LLC, Double Rock Corporation, and Intrasweep LLC* against *Deutshe Bank Trust Company Americas and Total Bank Solutions, LLC*, Defendant Deutsche Bank Trust Company America's responses to Double Rock's Common interrogatory Nos. 1-10 to defendants Reservation of Right, Civil Action No. 09 Civ. 2675 (VM) (AJP).
Email from Olivia Kim to Charles Macedo on May 13, 2010 with attachment of Lawsuit by *Island Intellectual Property LLC, Lids Capital LLC, Double Rock Corporation, and Intrasweep LLC* against *Deutshe Bank Trust Company Americas and Total Bank Solutions, LLC*, Defendant Total Bank Solutions, LLC's responses to Double Rock's Common interrogatory Nos. 1-10 to defendants, Reservation of Right, Civil Action No. 09 Civ. 2675 (VM) (AJP).
FDIC Federal Register Citations: Email from Bert Ely to Comments, Mar. 8, 2006, Subject: Large-Bank Deposit Insurance Determination Proposal—Rin 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.
FDIC, Federal Deposit Insurance Corporation, Letter to Mr. Ronald Rexter, Feb. 28, 2003, From Michelle M. Borzillo, Counsel Supervision and Legislation Section, 2 Sheets.
Federal Register: Oct. 9, 1997 (vol. 62, No. 196), pp. 52809-52868. http://www.fdic.gov/news/news/inactivefinancial/1997/fil97111b.html.
Financial Services Industry, "Web Watch: Trading Company Bundles CDs for Better Rates," Community Banker, Jun. 2002, online, http://findarticles.com/p/articles/mi_qa5344/is_200206/ai_n21313883/.
Finistar Reg. No. 2,939,558, Registered Apr. 12, 2005.
Finistar, Providing FDIC Insured Funds as a Stable Source of Deposits to Commercial Banking Institutions, 16 Sheets, www.Finistar.com.
Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.
Frost Bank, Member FDIC, Checking Accounts, 1 Sheet, Sep. 19, 2003, https://www.frostbank.com/cgi-bin/ecomm/frost1/scripts/products/product_detail.jsp?BV_.
Garmhausen, "Matching Small Banks with Large Muni Deposits," American Banker, Online the Financial Services Resource, Oct. 4, 2005, 4 pages, http://www.finstar.com/docs/AmericanBanker.html.
Heavyweight Funding, Bankers News, Mar. 4, 2003, vol. II, Issue No. 5, 2 Sheets.
Hencke, "New Rules for FDIC deposit Insurance", ABA Bank Compliance, vol. 20, No. 7, Jul./Aug. 1999, pp. 31-37.
Hoffman, "Reserve's FDIC-Insured Account Draws Regionals; But some see little need for insurance," Crain Communications Inc., Investment News, 2 Sheets, Jun. 4, 2001.
IDC Deposits, online, http://idcdeposits.com/ , 2009, 1 Sheet.
In the Know, Important Information About Your Account, Smith Barney Citigroup, 2005, 6 Sheets.
Insured Bank Deposit Program Summary Information Statement, Information Statement, and list of Eligible Program Banks Effective Feb. 10, 2005, 11 pages.
Insured Cash Account Program Disclosure Booklet, LPL Financial Services, Linsco/Private Ledger, Member NASD/SIPC 14 pages.
Jong et al., "The Valuation and Hedging of Variable Rate Savings Accounts," University of Amsterdam, Nov. 15, 2001, 23 Sheets.
Keenan, "Tapping Brokerages for Alternative to CDs," American Banker, The Financial Services Daily, 3 Sheets, Feb. 18, 2004.
Lake Forest Bank & Trust Company, Introducing MaxSafe Deposit Accounts with up to $3.75 Million in FDIC Insurance, www.lakeforestbank.com/maxsafe, 2 Sheets.
Lavine, "Check Out High-Yield Checking Accounts," Broward Daily Business Review, vol. 39, No. 102, 2 Sheets, Apr. 27, 1998.
Lawsuit by *Island Intellectual Property LLC, Lids Capital. LLC, Double Rock Corporation and Intrasweep LLC*, against *Promontory Interfinancial Network, LLC, Deutsche Bank AG, Deutsche Bank Trust Company Americas and Total Bank Solutions, LLC*, Complaint, Apr. 14, 2009, Case No. 09 CV 3750.
Lawsuit by *Carlo DeBlasio et al.* against *Merrill Lynch & Co., Inc. et al.*, Declaration of Andrew W. Stern, including Exhibits A, B, C, D, E and F, Nov. 12, 2007, Case No. 07-cv-318 (RJS) (Document 59).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks"; Feb. 5, 2008.
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion For Dismissal of the Second Amended Class Action Complaint, Including: . . . Feb. 5, 2008 (Document 74).
Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).
Lawsuit by *Carlo DeBlasio et al.* against *Merrill Lynch & Co., Inc. et al.*, Declaration of Kenneth I. Schacter, including Exhibits A, B, C, D, F, G, H, I, J, K, L, M, N, O, P, Q and R, Nov. 14, 2007, Case No. 07-cv-318 (RJS) (Document 69).
Lawsuit by *Carlo DeBlasio et al.* against *Merrill Lynch & Co., Inc. et al.*, Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14, 2007, Case No. 07-318 (RJS) (Document 67).
Lawsuit by *Carlo DeBlasio et al.* against *Merrill Lynch & Co., Inc. et al.*, Declaration of Scott D. Musoff in Support of the Merrill Lynch Defendants' Motion to Dismiss the Second Amended Class Action Complaint, ECF Case, Nov. 12, 2007, Case No. 07-cv-318 (RJS) (Document 64).
Lawsuit by *Carlo DeBlasio et al.* against *Merrill Lynch & Co., Inc. et al.*, Reply Declaration of Kenneth Schacter including Exhibits S and T, Mar. 6, 2008, Case No. 07-cv-318 (RJS) (Document 81).
Lawsuit by *Carlo DeBlasio et al.* against *Merrill Lynch & Co., Inc. et al.*, Second Amended Class Action Complaint, Jury Trial Demanded, Introduction and Summary of Allegations, Jun. 11, 2007, Case No. 07-cv-318-VM.

(56) References Cited

OTHER PUBLICATIONS

Lawsuit by *Carlo DeBlasio et al.* against *Merrill Lynch & Co., Inc. et al.*, Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by *Carlo DeBlasio et al.* against *Merrill Lynch & Co., Inc. et al.*, Opinion and Order Regarding Motions, Jul. 27, 2009, Case No. 07 CIV 318(RJS).

Lawsuit by *Island Intellectual Property LLC and Intrasweep LLC* against *Deutsche Bank Trust Company Americas and Total Bank Solutions, LLC*, Deutsche Bank Trust Company Americas' answer to plaintiffs' Feb. 23, 2010 complaint and counterclaims, May 4, 2010, Civil Action No. 09 Civ. 2675 (VM) (AJP)(Document 111).

Lawsuit by *Island Intellectual Property LLC and Intrasweep LLC* against *Deutsche Bank Trust Company Americas and Total Bank Solutions, LLC*, Total Bank Solutions, LLC's answer to plaintiffs' Feb. 23, 2010 complaint and counterclaims, May 4, 2010, Civil Action No. 09 Civ. 2675 (VM) (AJP)(Document 112).

Lawsuit by *Island Intellectual Property LLC and Intrasweep LLC* against *Institutional Deposits Corp.* The Island Plaintiffs' Complaint against Defendant Institutional Deposits Corp., Nov. 4, 2009, Civil Action No. 1 09-CV-3079.

Lawsuit by *Island Intellectual Property LLC and Intrasweep LLC* against *Institutional Deposits Corp.*, Complaint for Patent Infringement, Jury Trial Demanded, Nov. 4, 2009, Civil Action No. 09 CV 3079.

Lawsuit by *Island Intellectual Property LLC and Intrasweep LLC* against *Institutional Deposits Corp.*, Consent Order, Apr. 21, 2010, Case No. 09-CV-3079 (Document 44).

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by *Island Intellectual Property LLC and Lids Capital LLC* against *Deutsche Bank Trust Company Americas and Total Bank Solutions, LLC*, Deutsche Bank Trust Company answer to plaintiffs' Mar. 16, 2010 complaint and counterclaims, May 4, 2010, Civil Action No. 09 Civ. 2675 (VM) (AJP) (Document 113).

Lawsuit by *Island Intellectual Property LLC and Lids Capital LLC* against *Deutsche Bank Trust Company Americas and Total Bank Solutions, LLC*, Total Bank Solutions, LLC's answer to plaintiffs' Mar. 16, 2010 complaint and counterclaims, May 4, 2010, Civil Action No. 09 Civ. 2675 (VM)(Document 114).

Lawsuit by *Island Intellectual Property LLC, et al.* against *Deutsche Bank Trust Company Americas, et al.,*. Defendant Deutsch Bank Trust Company Americas' Responses to Double Rock's Interrogatories Nos. 1-10; May 2010; Civil Action No. 09 Civ. 2675 (VM)(AJP).

Lawsuit by *Island Intellectual Property LLC, et al.* against *Deutsche Bank Trust Company Americas*; Defendant Total Bank Solutions, LLC's Responses to Double Rock's Common Interrogatory Nos. 1-10 to Defendants; May 2010; Civil Action No. 09 Civ. 2675 (VM)(AJP).

Lawsuit by Island Intellectual Property LLC, Intrasweep LLC and Double Rock Corporation against Deutsche Bank AG, Deutsche Bank Trust Company Americas and Total Bank Solutions, LLC, Complaint for Patent Infringement, May 19, 2009, Case No. 09 CIV 4673.

Lawsuit by *Island Intellectual Property LLC, Lids Capital LLC, and Double Rock Corporation* against *Deutsche Bank AG, Deutsche Bank Trust Company Americas and Total Bank Solutions, LLC*, including Cover Sheet, Summons, Complaint and Rule 7.1 Statement, Mar. 24, 2009, Case No. 09 CV 2677.

Lawsuit by *Island Intellectual Property LLC, Lids Capital LLC, and Double Rock Corporation* against *Promontory Interfinancial Network, LLC and MBSC Securities Corporation*, including Cover Sheet, Summons, Complaint and Rule 7.1 Statement, Mar. 24, 2009, Case No. 09 CV 2675.

Lawsuit by *Island Intellectual Property LLC, Lids Capital LLC, Double Rock Corporation and Intrasweep LLC* against *Deutsche Bank AG, Deutsche Bank Trust Company Americas and Total Bank Solutions, LLC*, Stipulated Dismissal of Deutsche Bank AG Without Prejudice, Nov. 19, 2009, Civil Action No. 09 CIV 2675 (VM) (AJP) (Document 79).

Lawsuit by *Island Intellectual Property LLC, Lids Capital LLC, Double Rock Corporation and Intrasweep LLC* against *Deutsche Bank Trust Company Americas and Total Bank Solutions, LLC*, Deutsche Bank Trust Company Americas' First Amended Answer to Consolidated First Amended Complaint and Counterclaims, Dec. 4, 2009, Civil Action No. 09 CIV 2675 (VM) (AJP), (Document 86).

Lawsuit by *Island Intellectual Property LLC, Lids Capital LLC, Double Rock Corporation and Intrasweep LLC* against *Deutsche Bank Trust Company Americas and Total Bank Solutions, LLC*, Total Bank Solutions, LLC's First Amended Answer to Consolidated First Amended Complaint and Counterclaims Dec. 4, 2009, Civil Action No. 09 CIV 2675 (VM) (AJP) (Document 87).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Answer and Counter Claims, Answer of Defendant MBSC Securities Corporation, Jun. 25, 2009, Case No. 09 CV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Answer and Counter Claims, Answer of Defendant Promontory Interfinancial Network, LLC, Jun. 25, 2009, Case No. 09 CV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Consolidated First Amended Complaint, Jury Trial Demanded, Jun. 11, 2009, Civil Action No. 09 CIV 2675 (VM).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank AG's Answer to Consolidated First Amended Complaint, Jun. 25, 2009, Civil Action No. 09 CIV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank Trust Company Americas' Answer to Consolidated First Amended Complaint and Counter Claims, Jun. 25, 2009, Civil Action No. 09 CIV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Total Bank Solutions, LLC's Answer to Consolidated First Amended Complaint and Counterclaims, Jun. 25, 2009, Civil Action No. 09 CIV 2675.

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Stipulated Dismissal of Counts I-III of Defendant Promontory Interfinancial Network, LLC's, Counterclaim with Prejudice, Oct. 19, 2009, (Document 68).

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total*

(56) References Cited

OTHER PUBLICATIONS

*Bank Solutions, LLC*, Stipulation and Order, Oct. 29, 2009, Case No. 09 CV 2675 (VM) (AJP) (Document 73).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Deutsche Bank Trust Company Americas' Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant MBSC Securities Corporation's Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Promontory Interfinancial Network LLC's Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Total Bank Solutions, LLC's Counterclaims, Jul. 9, 2009, Civil Action No. 09 CIV 2675 (VM).
Lawsuit by *Promontory Interfinancial Network, LLC* against *Double Rock Corporation p/k/a Reserve Management Corporation and Lids Capital LLC*, Amended Complaint, Mar. 27, 2009, Civil Action No. 1:09 CV 316.
Lawsuit by *Promontory Interfinancial Network, LLC* against *Double Rock Corporation p/k/a Reserve Management Corporation*, Complaint, Mar. 24, 2009, Civil Action No. 1:09 CV 316.
Lawsuit by *Promontory Interfinancial Network, LLC* against *Double Rock Corporation p/k/a Reserve Management Corporation, Island Intellectual Property LLC, Lids Capital LLC and Intrasweep LLC*, Amended Complaint, Apr. 15, 2009, Civil Action No. 3:09 CV 217.
Lawsuit by *Promontory Interfinancial Network, LLC* against *Double Rock Corporation p/k/a Reserve Management Corporation, Island Intellectual Property LLC, Lids Capital LLC and Intrasweep LLC*, Complaint, May 19, 2009, Civil Action No. 3:09 CV 322.
Lawsuit by *Promontory Interfinancial Network, LLC* against *Double Rock Corporation, p/k/a Reserve Management Corporation, Island Intellectual Property LLC and Lids Capital LLC*, including Cover Sheet, Summons and Complaint, Apr. 14, 2009, Civil Action No. 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, Lexsee 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, Lexsee 1985 Sec No-Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16, 1984, 4 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter to Mr. James E. Creekman, Group Vice President, From Oliver Ireland, Associate General Counsel, Aug. 1, 1995, 4 Sheets.
Letter to Mr. Jonathan L. Levin, Esq., From Oliver Ireland, Associate General Counsel, Oct. 18, 1996, 2 Sheets.
Letter to Mr. L.P. Fleming, Jr., Esq., From Oliver Ireland, Associate General Counsel, Feb. 7, 1995, 3 Sheets.
Letter to Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
McReynolds et al. "Unusual Products for Unusual Times," Securities Data Publishing on Wall Street, 6 Sheets, May 1, 2001.
McReynolds, "The Power of Cash: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", 2 Sheets.
Merrill Lynch Announces Beyond Banking, The Power of Advice for Smarter Cash Management, Jan. 8, 2 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
Munk, Merrill Makes New Push Into Traditional Banking, Dow Jones Newswires, Jan. 3, 2003, 1 Sheet.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, 4 Sheets.
Northbrook Bank & Trust Company, Seven Times the Security of a Normal CD, Introducing our MaxSafe CD, 4 Sheets.
O'Brian, "Money-Market Funds Suit Many Investors, But Proud Creator Frets About Extra Risk," Re-Printed From the Wall Street Journal, Monday, Nov. 6, 2000, Dow Jones & Company, Inc., 2 Sheets.
On Wall Street, Helping Brokers Build a More Successful Business, The Power of Cash, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, Mar. 1994; 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.

(56) References Cited

OTHER PUBLICATIONS

Promontory to Roll Out Deposit Service Insuring Liquid Funds, American Banker, by Joe Adler, Feb. 22, 2010, 2 sheets.
Reserve Insured Deposits, United States Patent and Trademark Office, Reg. U.S. Pat. No. 2,694,910, Registered Mar. 11, 2003, 1 Sheet.
Reserve Management Corporation, Reserve Insured Deposits, U.S. Appl. No. 76/315,600, Issued.
Ring, National /Global, "Amex Spans The Globe in Retail Bank Buildup," Nov. 27, 2000, 1 Sheet.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before the Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwritting, From: Denise Russo, Director, Underwritting, 6 Sheets.
The Insured Savings Account, Issuer Guide to Offering MMDAs Through Merrill Lynch, Merrill Lynch Money Markets, Inc., "Operational Guide to the Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Pat. No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From the Cash Management Expert, 1999; 2 Sheets.
Total Bank Solutions, Bank Sweep FAQs http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, Oct. 2001; 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.
Lawsuit by *Island Intellectual Property LLC* against *Clearview Correspondent Services, LLC, et al.*; Complaint for Patent Infringement; Civil Action No. 1:11-cv-448 (LO/TRJ); Apr. 26, 2011; 55 pages.
Lawsuit by *Island Intellectual Property LLC* against *First Southwest Company*; Complaint for Patent Infringement; Civil Action No. 1:11-cv-00371-UNA; Apr. 26, 2011; 42 pages.
Lawsuit by *Island Intellectual Property LLC et al.*, against *Deutsche Bank Trust Company Americas, et al.*; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ.2675(VM)(AJP), Oct. 28, 2010; 1,119 pages.
Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.
Lawsuit by *Island Intellectual Property LLC* v. *Clearview Correspondent Services, LLC, et al.*; Clearview Correspondent Services,

(56) References Cited

OTHER PUBLICATIONS

LLC's Answer to Complaint and Counterclaims; Civil Action No. 1:11-cv-448- LO-IDD; Jun. 20, 2011; 12 pages.
Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.
Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.
Lawsuit by *Island Intellectual Property LLC, et al.* against *Deutsche Bank Trust Company Americas, et al.*; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.
Lawsuit by *Island Intellectual Property LLC, et al.* against *Deutsche Bank Trust Company Americas, et al.*; Expert Report of the Honorable Gerald J. Mossinghoff and Exhibits A-E; Civil Action No. 09 Civ. 2675 (VM)(AJP); Nov. 23, 2010; 107 pages.
Lawsuit by *Island Intellectual Property LLC, et al.*, against *Deutsche Bank Trust Company Americas, et al.*; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by *Island Intellectual Property LLC, et al.*, against *Deutsche Bank Trust Company Americas, et al.*; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
*Island Intellectual Property LLC et al.* v. *Deutsche Bank AG, et al.*; Memorandum and Order; Case 1:09-cv-02675-KBF; Doc. 289; Feb. 14, 2012; pp. 1-28.
*Island Intellectual Property LLC et al.* v. *Deutsche Bank AG, et al.*; Order; Case 1:09-cv-02675-KBF; Doc. 221; Feb. 14, 2012; pp. 1-34.
*Island Intellectual Property LLC et al.* v. *Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.
*Island Intellectual Property LLC et al.* v. *Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.
*Island Intellectual Property LLC et al.* v. *Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.
*Island Intellectual Property LLC et al.* v. *Deutsche Bank Trust Company Americas, et al.*; Memorandum and Order; Case 1:09-cv-02675-KBF; Doc. 265; Feb. 6, 2012; pp. 1-22.
*Island Intellectual Property LLC et al.* v. *Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.
*Island Intellectual Property LLC et al.* v. *Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.
*Island Intellectual Property LLC et al.* v. *Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.
*Island Intellectual Property LLC et al.* v. *Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.
*Island Intellectual Property LLC et al.* v. *Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.
*Island Intellectual Property LLC et al.* v. *Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.
Knight-Ridder; Money Matters, Tips you can use—Limits Apply as FDIC Insurance Covers Depositor, Not Account; Chicago Tribune; Feb. 4, 1998; 2 pages.
Lawsuit by *Island Intellectual Property LLC et al.* v. *Deutsche Bank Trust Company Americas, et al.*; Joint Statement of Claims and Defenses to be Presented at Trial Set for Feb. 27, 2012; Jan. 16, 2012; Case 1:09-cv-02675-KBF (Document 227).
Lawsuit by *Island Intellectual Property LLC et al.* v. *Deutsche Bank Trust Company Americas, et al.*; Declaration of Olivia M. Kim in Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC, et al.* v. *Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
Lawsuit by *Island Intellectual Property LLC et al.* v. *Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC et al.* v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC et al.* v. *Deutsche Bank Trust Company Americas, et al.*; Order; Dec. 7, 2011; Case 1:09-cv-02675-VM, Document 212.
Lawsuit by *Island Intellectual Property LLC et al.* v. *Deutsche Bank Trust Company Americas, et al.*; Special Master's Report and Recommended Decision on Defendants' Summary Judgment Motion of Invalidity Under 35 U.S.C. § 101; Dec. 19, 2011.
Lawsuit by *Island Intellectual Property LLC et al.* v. *Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Martens, Don W.; letter to Hon. Victor Marrero re. supplement to letter of Nov. 28, 2011 on tentative rulings on claim construction in *Island Intellectual Property LLC et al.* v. *Deutsche Bank Trust Co., et al.*; Nov. 28, 2011; Case 1:09-cv-02675-VM; Document 211.
Martens, Don W.; letter to Hon. Victor Marrero re. tentative rulings on claim construction in *Island Intellectual Property LLC et al.* v. *Deutsche Bank Trust Co., et al.*; Nov. 28, 2011; Case 1:09-cv-02675-VM, Document 210.
Scottrade Bank Deposit Program—Terms, Conditions & Disclosures; Author unknown; Aug. 2011; pp. 1-3.

(56) References Cited

OTHER PUBLICATIONS

Hencke, Christopher; New Rules for FDIC Deposit Insurance; ABA Bank Compliance, Jul./Aug. 1999, 20,7; pp. 31-37.

Campbell, Andrew, et al.; A new standard for deposit insurance and government guarantees after the crisis; Journal of Financial Regulation and Compliance, vol. 17 No. 3, 2009; pp. 210-239.

Cynamon et al.; Redefining the Monetary Aggregates: A Clean Sweep; Eastern Economic Journal, vol. 32, No. 4, Fall 2006; pp. 661-672.

12 CFR Part 330; Simplification of Deposit Insurance Rules; Federal Register, vol. 63 Issue 90; May 11, 1998; pp. 1-31.

The Merrill Lynch Cash Management Account—Financial Service; Jan. 1985; 18 pages.

Opening Brief Filed by Appellant Island Intellectual Property LLC, filed in *Island Intellectual Property LLC v. TD Ameritrade, Inc.*, CAFC Case No. 23-1318, Dkt. No. 20, filed on Apr. 4, 2023.

Response Brief Filed by Appellees TD Ameritrade, Inc., TD Ameritrade Clearing, Inc., TD Ameritrade Trust Co., TD Ameritrade Holding Corp. and Charles Schwab Corporation, filed in *Island Intellectual Property LLC v. TD Ameritrade, Inc.*, CAFC Case No. 23-1318, Dkt. No. 26, filed on Jun. 13, 2023.

Reply Brief Filed by Appellant Island Intellectual Property LLC, filed in *Island Intellectual Property LLC v. TD Ameritrade, Inc.*, CAFC Case No. 23-1318, Dkt. No. 29, filed on Jul. 28, 2023.

U.S. Appl. No. 14/179,096, filed Feb. 12, 2014, Island Intellectual Property LLC.

U.S. Appl. No. 14/268,479, filed May 2, 2014, Island Intellectual Property LLC.

Order Granting Defendant's Motion to Dismiss, issued in *Island Intellectual Property LLC v. Stone Castle Management LLC et al.*, Case No. 19-04792-JPO (S.D.N.Y.), Dkt. No. 58, issued on May 29, 2020.

Order Granting Plantiff's Request for an Indicative Ruling, issued in *Island Intellectual Property LLC v. Stone Castle Management LLC et al.*, Case No. 19-04792-JPO (S.D.N.Y.), Dkt. No. 73, issued on Apr. 13, 2021.

Order Granting Plaintiff's Motion to Vacate the May 29, 2020 Opinion and Order, issued in *Island Intellectual Property LLC v. Stone Castle Management LLC et al.*, Case No. 19-04792-JPO (S.D.N.Y.), Dkt. No. 75, issued on Apr. 16, 2021.

Notice of Voluntary Dismissal with Prejudice Pursuant to F.R.C.P. 41(a)(1)(A)(i), filed in *Island Intellectual Property LLC v. Stone Castle Management LLC et al.*, Case No. 19-04792-JPO (S.D.N.Y.), Dkt. No. 76, issued on Apr. 20, 2021.

First Amended Complaint, filed in *Stone Castle Management LLC v. Island Intellectual Property LLC*, Case No. 20-cv-07868-JMF (S.D.N.Y.), Dkt. No. 28, filed on Dec. 22, 2020.

Exhibit 1—U.S. Pat. No. 7,509,286 to First Amended Complaint, filed in *Stone Castle Management LLC v. Island Intellectual Property LLC*, Case No. 20-cv-07868-JMF (S.D.N.Y.), Dkt. No. 28-1, filed on Dec. 22, 2020.

Exhibit 2—U.S. Pat. No. 7,519,551 to First Amended Complaint, filed in *Stone Castle Management LLC v. Island Intellectual Property LLC*, Case No. 20-cv-07868-JMF (S.D.N.Y.), Dkt. No. 28-2, filed on Dec. 22, 2020.

Exhibit 3—U.S. Pat. No. 7,536,350 to First Amended Complaint, filed in *Stone Castle Management LLC v. Island Intellectual Property LLC*, Case No. 20-cv-07868-JMF (S.D.N.Y.), Dkt. No. 28-3, filed on Dec. 22, 2020.

Exhibit 4—U.S. Pat. No. 7,668,772 to First Amended Complaint, filed in *Stone Castle Management LLC v. Island Intellectual Property LLC*, Case No. 20-cv-07868-JMF (S.D.N.Y.), Dkt. No. 28-4, filed on Dec. 22, 2020.

Exhibit 5—U.S. Pat. No. 7,672,886 to First Amended Complaint, filed in *Stone Castle Management LLC v. Island Intellectual Property LLC*, Case No. 20-cv-07868-JMF (S.D.N.Y.), Dkt. No. 28-5, filed on Dec. 22, 2020.

Exhibit 6—U.S. Pat. No. 7,680,734 to First Amended Complaint, filed in *Stone Castle Management LLC v. Island Intellectual Property LLC*, Case No. 20-cv-07868-JMF (S.D.N.Y.), Dkt. No. 28-6, filed on Dec. 22, 2020.

Exhibit 7—U.S. Pat. No. 7,716,131 to First Amended Complaint, filed in *Stone Castle Management LLC v. Island Intellectual Property LLC*, Case No. 20-cv-07868-JMF (S.D.N.Y.), Dkt. No. 28-7, filed on Dec. 22, 2020.

Exhibit 8—U.S. Pat. No. 7,752,129 to First Amended Complaint, filed in *Stone Castle Management LLC v. Island Intellectual Property LLC*, Case No. 20-cv-07868-JMF (S.D.N.Y.), Dkt. No. 28-8, filed on Dec. 22, 2020.

Exhibit 9—U.S. Pat. No. 7,769,688 to First Amended Complaint, filed in *Stone Castle Management LLC v. Island Intellectual Property LLC*, Case No. 20-cv-07868-JMF (S.D.N.Y.), Dkt. No. 28-9, filed on Dec. 22, 2020.

Exhibit 10—U.S. Pat. No. 7,809,640 to First Amended Complaint, filed in *Stone Castle Management LLC v. Island Intellectual Property LLC*, Case No. 20-cv-07868-JMF (S.D.N.Y.), Dkt. No. 28-10, filed on Dec. 22, 2020.

Exhibit 11—U.S. Pat. No. 7,933,821 to First Amended Complaint, filed in *Stone Castle Management LLC v. Island Intellectual Property LLC*, Case No. 20-cv-07868-JMF (S.D.N.Y.), Dkt. No. 28-11, filed on Dec. 22, 2020.

Exhibit 12—U.S. Pat. No. 8,019,667 to First Amended Complaint, filed in *Stone Castle Management LLC v. Island Intellectual Property LLC*, Case No. 20-cv-07868-JMF (S.D.N.Y.), Dkt. No. 28-12, filed on Dec. 22, 2020.

Exhibit 13—U.S. Pat. No. 8,260,697 to First Amended Complaint, filed in *Stone Castle Management LLC v. Island Intellectual Property LLC*, Case No. 20-cv-07868-JMF (S.D.N.Y.), Dkt. No. 28-13, filed on Dec. 22, 2020.

Exhibit 14—U.S. Pat. No. 8,290,859 to First Amended Complaint, filed in *Stone Castle Management LLC v. Island Intellectual Property LLC*, Case No. 20-cv-07868-JMF (S.D.N.Y.), Dkt. No. 28-14, filed on Dec. 22, 2020.

Exhibit 15—U.S. Pat. No. 8,290,860 to First Amended Complaint, filed in *Stone Castle Management LLC v. Island Intellectual Property LLC*, Case No. 20-cv-07868-JMF (S.D.N.Y.), Dkt. No. 28-15, filed on Dec. 22, 2020.

Exhibit 16—U.S. Pat. No. 8,290,861 to First Amended Complaint, filed in *Stone Castle Management LLC v. Island Intellectual Property LLC*, Case No. 20-cv-07868-JMF (S.D.N.Y.), Dkt. No. 28-16, filed on Dec. 22, 2020.

Exhibit 17—U.S. Pat. No. 8,311,916 to First Amended Complaint, filed in *Stone Castle Management LLC v. Island Intellectual Property LLC*, Case No. 20-cv-07868-JMF (S.D.N.Y.), Dkt. No. 28-17, filed on Dec. 22, 2020.

Exhibit 18—U.S. Pat. No. 8,355,985 to First Amended Complaint, filed in *Stone Castle Management LLC v. Island Intellectual Property LLC*, Case No. 20-cv-07868-JMF (S.D.N.Y.), Dkt. No. 28-18, filed on Dec. 22, 2020.

Exhibit 19—U.S. Pat. No. 8,386,383 to First Amended Complaint, filed in *Stone Castle Management LLC v. Island Intellectual Property LLC*, Case No. 20-cv-07868-JMF (S.D.N.Y.), Dkt. No. 28-19, filed on Dec. 22, 2020.

Exhibit 20—U.S. Pat. No. 8,401,962 to First Amended Complaint, filed in *Stone Castle Management LLC v. Island Intellectual Property LLC*, Case No. 20-cv-07868-JMF (S.D.N.Y.), Dkt. No. 28-20, filed on Dec. 22, 2020.

Exhibit 21—U.S. Pat. No. 7,536,350 to First Amended Complaint, filed in *Stone Castle Management LLC v. Island Intellectual Property LLC*, Case No. 20-cv-07868-JMF (S.D.N.Y.), Dkt. No. 28-21, filed on Dec. 22, 2020.

Exhibit 22—U.S. Pat. No. 8,498,933 to First Amended Complaint, filed in *Stone Castle Management LLC v. Island Intellectual Property LLC*, Case No. 20-cv-07868-JMF (S.D.N.Y.), Dkt. No. 28-22, filed on Dec. 22, 2020.

Exhibit 23—U.S. Pat. No. 8,560,442 to First Amended Complaint, filed in *Stone Castle Management LLC v. Island Intellectual Property LLC*, Case No. 20-cv-07868-JMF (S.D.N.Y.), Dkt. No. 28-23, filed on Dec. 22, 2020.

(56) References Cited

OTHER PUBLICATIONS

Exhibit 24—U.S. Pat. No. 8,566,200 to First Amended Complaint, filed in *Stone Castle Management LLC v. Island Intellectual Property LLC*, Case No. 20-cv-07868-JMF (S.D.N.Y.), Dkt. No. 28-24, filed on Dec. 22, 2020.

Exhibit 25—U.S. Pat. No. 8,566,201 to First Amended Complaint, filed in *Stone Castle Management LLC v. Island Intellectual Property LLC*, Case No. 20-cv-07868-JMF (S.D.N.Y.), Dkt. No. 28-25, filed on Dec. 22, 2020.

Exhibit 26—U.S. Pat. No. 8,571,984 to First Amended Complaint, filed in *Stone Castle Management LLC v. Island Intellectual Property LLC*, Case No. 20-cv-07868-JMF (S.D.N.Y.), Dkt. No. 28-26, filed on Dec. 22, 2020.

Exhibit 27—U.S. Pat. No. 8,612,324 to First Amended Complaint, filed in *Stone Castle Management LLC v. Island Intellectual Property LLC*, Case No. 20-cv-07868-JMF (S.D.N.Y.), Dkt. No. 28-27, filed on Dec. 22, 2020.

Exhibit 28—U.S. Pat. No. RE43246 to First Amended Complaint, filed in *Stone Castle Management LLC v. Island Intellectual Property LLC*, Case No. 20-cv-07868-JMF (S.D.N.Y.), Dkt. No. 28-28, filed on Dec. 22, 2020.

Exhibit 29—U.S. Pat. No. 6,374,231 to First Amended Complaint, filed in *Stone Castle Management LLC v. Island Intellectual Property LLC*, Case No. 20-cv-07868-JMF (S.D.N.Y.), Dkt. No. 28-29, filed on Dec. 22, 2020.

Exhibit 30—U.S. Pat. No. 8,150,766 to First Amended Complaint, filed in *Stone Castle Management LLC v. Island Intellectual Property LLC*, Case No. 20-cv-07868-JMF (S.D.N.Y.), Dkt. No. 28-30, filed on Dec. 22, 2020.

Exhibit 31—U.S. Pat. No. 8,359,267 to First Amended Complaint, filed in *Stone Castle Management LLC v. Island Intellectual Property LLC*, Case No. 20-cv-07868-JMF (S.D.N.Y.), Dkt. No. 28-31, filed on Dec. 22, 2020.

Exhibit 32—U.S. Pat. No. 8,712,911 to First Amended Complaint, filed in *Stone Castle Management LLC v. Island Intellectual Property LLC*, Case No. 20-cv-07868-JMF (S.D.N.Y.), Dkt. No. 28-32, filed on Dec. 22, 2020.

Exhibit 33—U.S. Pat. No. 8,719,157 to First Amended Complaint, filed in *Stone Castle Management LLC v. Island Intellectual Property LLC*, Case No. 20-cv-07868-JMF (S.D.N.Y.), Dkt. No. 28-33, filed on Dec. 22, 2020.

Exhibit 34—U.S. Pat. No. 8,655,689 to First Amended Complaint, filed in *Stone Castle Management LLC v. Island Intellectual Property LLC*, Case No. 20-cv-07868-JMF (S.D.N.Y.), Dkt. No. 28-34, filed on Dec. 22, 2020.

Exhibit 35—Maier et al., Patent Protection Provides Long-term Net Strategy to First Amended Complaint, filed in *Stone Castle Management LLC v. Island Intellectual Property LLC*, Case No. 20-cv-07868-JMF (S.D.N.Y.), Dkt. No. 28-35, filed on Dec. 22, 2020.

Exhibit 36—Oct. 29, 2018 Letter from IIP to SCP to First Amended Complaint, filed in *Stone Castle Management LLC v. Island Intellectual Property LLC*, Case No. 20-cv-07868-JMF (S.D.N.Y.), Dkt. No. 28-3, filed on Dec. 22, 2020.

Exhibit 37—Nov. 13, 2018 Letter from SC to IIP to First Amended Complaint, filed in *Stone Castle Management LLC v. Island Intellectual Property LLC*, Case No. 20-cv-07868-JMF (S.D.N.Y.), Dkt. No. 28-36, filed on Dec. 22, 2020.

Exhibit 38—Nov. 20, 2018 Letter from IIP to SC to First Amended Complaint, filed in *Stone Castle Management LLC v. Island Intellectual Property LLC*, Case No. 20-cv-07868-JMF (S.D.N.Y.), Dkt. No. 28-37, filed on Dec. 22, 2020.

Exhibit 39—Dec. 4, 2018 Letter from SC to IIP to First Amended Complaint, filed in *Stone Castle Management LLC v. Island Intellectual Property LLC*, Case No. 20-cv-07868-JMF (S.D.N.Y.), Dkt. No. 28-38, filed on Dec. 22, 2020.

Exhibit 40—May 24, 2019 (SDNY 013) 2019 Complaint to First Amended Complaint, filed in *Stone Castle Management LLC v. Island Intellectual Property LLC*, Case No. 20-cv-07868-JMF (S.D.N.Y.), Dkt. No. 28-39, filed on Dec. 22, 2020.

Exhibit 41—Aug. 5, 2019 (SDNY 041) SC Motion to Dismiss to First Amended Complaint, filed in *Stone Castle Management LLC v. Island Intellectual Property LLC*, Case No. 20-cv-07868-JMF (S.D.N.Y.), Dkt. No. 28-40, filed on Dec. 22, 2020.

Exhibit 42—Sep. 4, 2019 (SDNY 049) IIP Opp to Motion to Dismiss to First Amended Complaint, filed in *Stone Castle Management LLC v. Island Intellectual Property LLC*, Case No. 20-cv-07868-JMF (S.D.N.Y.), Dkt. No. 28-42, filed on Dec. 22, 2020.

Exhibit 43—Sep. 11, 2019 (SDNY 051) SC Reply ISO Motion to Dismiss to First Amended Complaint, filed in *Stone Castle Management LLC v. Island Intellectual Property LLC*, Case No. 20-cv-07868-JMF (S.D.N.Y.), Dkt. No. 28-43, filed on Dec. 22, 2020.

Exhibit 44—May 29, 2020 (SDNY 058) Opinion and Order re Motion to Dismiss to First Amended Complaint, filed in *Stone Castle Management LLC v. Island Intellectual Property LLC*, Case No. 20-cv-07868-JMF (S.D.N.Y.), Dkt. No. 28-44, filed on Dec. 22, 2020.

Exhibit 45—Jun. 25, 2020 (SDNY 060) IIP Letter to Judge Oetken to First Amended Complaint, filed in *Stone Castle Management LLC v. Island Intellectual Property LLC*, Case No. 20-cv-07868-JMF (S.D.N.Y.), Dkt. No. 28-45, filed on Dec. 22, 2020.

Exhibit 46—Aug. 12, 2020 (NYS 002) IIP State Court Complaint to First Amended Complaint, filed in *Stone Castle Management LLC v. Island Intellectual Property LLC*, Case No. 20-cv-07868-JMF (S.D.N.Y.), Dkt. No. 28-46, filed on Dec. 22, 2020.

Exhibit 47—Aug. 12, 2020 (NYS 022) SC Motion to Dismiss State Court Complaint to First Amended Complaint, filed in *Stone Castle Management LLC v. Island Intellectual Property LLC*, Case No. 20-cv-07868-JMF (S.D.N.Y.), Dkt. No. 28-47, filed on Dec. 22, 2020.

Exhibit 48—Aug. 12, 2020 (NYS 012) SCFC Motion to Dismiss State Court Complaint to First Amended Complaint, filed in *Stone Castle Management LLC v. Island Intellectual Property LLC*, Case No. 20-cv-07868-JMF (S.D.N.Y.), Dkt. No. 28-48, filed on Dec. 22, 2020.

Exhibit 49—Jan. 26, 1975 Opinion Letter issued by the SEC, No. 74-1324 to First Amended Complaint, filed in *Stone Castle Management LLC v. Island Intellectual Property LLC*, Case No. 20-cv-07868-JMF (S.D.N.Y.), Dkt. No. 28-49, filed on Dec. 22, 2020.

Exhibit 50—Jun. 22, 1983 Interp Letter issued by the Federal Reserve to First Amended Complaint, filed in *Stone Castle Management LLC v. Island Intellectual Property LLC*, Case No. 20-cv-07868-JMF (S.D.N.Y.), Dkt. No. 28-50, filed on Dec. 22, 2020.

Exhibit 51—Nov. 16, 1984 Interp Letter issued by the Federal Reserve to First Amended Complaint, filed in *Stone Castle Management LLC v. Island Intellectual Property LLC*, Case No. 20-cv-07868-JMF (S.D.N.Y.), Dkt. No. 28-51, filed on Dec. 22, 2020.

Exhibit 52—Jan. 8, 1985 Opinion Letter issued by the SEC to First Amended Complaint, filed in *Stone Castle Management LLC v. Island Intellectual Property LLC*, Case No. 20-cv-07868-JMF (S.D.N.Y.), Dkt. No. 28-52, filed on Dec. 22, 2020.

Exhibit 53—May 22, 1986 Interp Letter issued by FDIC, No. 86-15 to First Amended Complaint, filed in *Stone Castle Management LLC v. Island Intellectual Property LLC*, Case No. 20-cv-07868-JMF (S.D.N.Y.), Dkt. No. 28-53, filed on Dec. 22, 2020.

Exhibit 54—Jul. 23, 1986 Interp Letter issued by FDIC, No. 86-21 to First Amended Complaint, filed in *Stone Castle Management LLC v. Island Intellectual Property LLC*, Case No. 20-cv-07868-JMF (S.D.N.Y.), Dkt. No. 28-54, filed on Dec. 22, 2020.

Exhibit 55—Aug. 11, 1986 Interp Letter issued by FDIC, No. 86-22 to First Amended Complaint, filed in *Stone Castle Management LLC v. Island Intellectual Property LLC*, Case No. 20-cv-07868-JMF (S.D.N.Y.), Dkt. No. 28-55, filed on Dec. 22, 2020.

Exhibit 56—Aug. 15, 1986 Interp Letter issued by FDIC, No. 86-23 to First Amended Complaint, filed in *Stone Castle Management LLC v. Island Intellectual Property LLC*, Case No. 20-cv-07868-JMF (S.D.N.Y.), Dkt. No. 28-56, filed on Dec. 22, 2020.

Exhibit 57—Oct. 20, 1986 Interp Letter issued by FDIC, No. 86-31to First Amended Complaint, filed in *Stone Castle Management LLC v. Island Intellectual Property LLC*, Case No. 20-cv-07868-JMF (S.D.N.Y.), Dkt. No. 28-57, filed on Dec. 22, 2020.

Exhibit 58—Aug. 31, 1988 Interp Letter issued by FDIC, No. 88-56 to First Amended Complaint, filed in *Stone Castle Management*

(56) References Cited

OTHER PUBLICATIONS

LLC v. *Island Intellectual Property LLC*, Case No. 20-cv-07868-JMF (S.D.N.Y.), Dkt. No. 28-58, filed on Dec. 22, 2020.
Exhibit 59—Jun. 19, 1989 Interp Letter issued by FDIC, No. 89-19 to First Amended Complaint, filed in *Stone Castle Management LLC v. Island Intellectual Property LLC*, Case No. 20-cv-07868-JMF (S.D.N.Y.), Dkt. No. 28-59, filed on Dec. 22, 2020.
Exhibit 60—Exhibit 59—Aug. 9, 1990 Interp letter issued by FDIC, No. 90-34 to First Amended Complaint, filed in *Stone Castle Management LLC v. Island Intellectual Property LLC*, Case No. 20-cv-07868-JMF (S.D.N.Y.), Dkt. No. 28-60, filed on Dec. 22, 2020.
Exhibit 61—Apr. 1, 1994 Interp Letter issued by FDIC, No. 94-18 to First Amended Complaint, filed in *Stone Castle Management LLC v. Island Intellectual Property LLC*, Case No. 20-cv-07868-JMF (S.D.N.Y.), Dkt. No. 28-61, filed on Dec. 22, 2020.
Motion to Dismiss First Amended Complaint, filed in *Stone Castle Management LLC v. Island Intellectual Property LLC*, Case No. 20-cv-07868-JMF (S.D.N.Y.), Dkt. No. 30, filed on Jan. 12, 2021.
Declaration of Bruce R. Bent II in Support of Motion to Dismiss, filed in *Stone Castle Management LLC v. Island Intellectual Property LLC*, Case No. 20-cv-07868-JMF (S.D.N.Y.), Dkt. No. 31, filed on Jan. 12, 2021.
Opposition to Motion to Dismiss First Amended Complaint, filed in *Stone Castle Management LLC v. Island Intellectual Property LLC*, Case No. 20-cv-07868-JMF (S.D.N.Y.), Dkt. No. 34, filed on Jan. 26, 2021.
Declaration of George Shilowitz in Opposition to Motion to Dismiss First Amended Complaint, filed in *Stone Castle Management LLC v. Island Intellectual Property LLC*, Case No. 20-cv-07868-JMF (S.D.N.Y.), Dkt. No. 35, filed on Jan. 26, 2021.
Declaration of Jordan Bekier in Opposition to Motion to Dismiss First Amended Complaint, filed in *Stone Castle Management LLC v. Island Intellectual Property LLC*, Case No. 20-cv-07868-JMF (S.D.N.Y.), Dkt. No. 36, filed on Jan. 26, 2021.
Exhibit 1—DoubleRock Webpage to Declaration of Jordan Bekier in Opposition to Motion to Dismiss First Amended Complaint filed in *Stone Castle Management LLC v. Island Intellectual Property LLC*, Case No. 20-cv-07868-JMF (S.D.N.Y.), Dkt. No. 36-1, filed on Jan. 26, 2021.
Exhibit 2—Dec. 12, 2018 letter to Stone Castle to Declaration of Jordan Bekier in Opposition to Motion to Dismiss First Amended Complaint filed in *Stone Castle Management LLC v. Island Intellectual Property LLC*, Case No. 20-cv-07868-JMF (S.D.N.Y.), Dkt. No. 36-2, filed on Jan. 26, 2021.
Reply in Support of Motion to Dismiss First Amended Complaint, filed in *Stone Castle Management LLC v. Island Intellectual Property LLC*, Case No. 20-cv-07868-JMF (S.D.N.Y.), Dkt. No. 37, filed on Feb. 2, 2021.
Order of Dismissal, issued in *Stone Castle Management LLC v. Island Intellectual Property LLC*, Case No. 20-cv-07868-JMF (S.D.N.Y.), Dkt. No. 39, issued on Mar. 2, 2021.
Amended Complaint, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28, filed on Feb. 1, 2021.
Exhibit A—U.S. Pat. No. 7,509,286 to Amended Complaint filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28-1, filed on Feb. 1, 2021.
Exhibit B—U.S. Pat. No. 7,668,772 to Amended Complaint filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28-2, filed on Feb. 1, 2021.
Exhibit C—U.S. Pat. No. 8,019,667 to Amended Complaint filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28-3, filed on Feb. 1, 2021.
Exhibit D—U.S. Pat. No. 8,260,697 to Amended Complaint filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28-4, filed on Feb. 1, 2021.
Exhibit E—U.S. Pat. No. 8,566,201 to Amended Complaint filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28-5, filed on Feb. 1, 2021.
Brief in Support of Motion to Dismiss Amended Complaint by Kelly Ann Brown and Robert Harm Zondag, filed in Island *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 31, filed on Mar. 1, 2021.
Declaration of Monica A. Mark in Support of Motion to Dismiss Amended Complaint by Kelly Ann Brown and Robert Harm Zondag, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 32, filed on Mar. 1, 2021.
Exhibit A. Affidavit of Robert Zondag dated Sep. 12, 2019 to Declaration of Monica A. Mark in Support of Motion to Dismiss Amended Complaint by Kelly Ann Brown and Robert Harm Zondag, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 32-1, filed on Mar. 1, 2021.
Exhibit B. Affidavit of Kelly Brown dated Sep. 12, 2019 to Declaration of Monica A. Mark in Support of Motion to Dismiss Amended Complaint by Kelly Ann Brown and Robert Harm Zondag, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 32-2, filed on Mar. 1, 2021.
Exhibit C. Online conversation dated Jul. 16, 2020 to Declaration of Monica A. Mark in Support of Motion to Dismiss Amended Complaint by Kelly Ann Brown and Robert Harm Zondag, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 32-3, filed on Mar. 1, 2021.
Brief in Support of Motion to Dismiss Amended Complaint by American Deposit Management LLC, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 35, filed on Mar. 1, 2021.
Brief in Support of Motion to Dismiss Amended Complaint by A.B. Data, Ltd., filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 38, filed on Mar. 1, 2021.
Brief in Support of Motion to Dismiss Amended Complaint by Bruce Allen Arbit, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 40, filed on Mar. 1, 2021.

(56) References Cited

OTHER PUBLICATIONS

Brief in Opposition to Defendant American Deposit Management LLC's Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 41, filed on Apr. 1, 2021.
Brief in Opposition to Defendants Kelly Ann Brown and Robert Harm Zondag's Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 42, filed on Apr. 1, 2021.
Brief in Opposition to Defendants A.B. Data, Ltd. and Bruce Allen Arbits Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 43, filed on Apr. 1, 2021.
Reply in Support of Defendants A.B. Data, Ltd. and Bruce Allen Arbits Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 44, filed on May 3, 2021.
Brief in Support of Defendants Kelly Ann Brown and Robert Harm Zondag's Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 45, filed on May 3, 2021.
Reply in Support of Defendant American Deposit Management LLC's Motion to Dismiss Amended Complaint, filed in Island *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 46, filed on May 3, 2021.
Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47, filed on May 3, 2021.
Exhibit A—per curiam Order, 20-2146 to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-1, filed on May 3, 2021.
Exhibit B—Memorandum of Law, 19-cv-04792-JPO to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-2, filed on May 3, 2021.
Exhibit C—Motion to Stay, 20-2146 to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-3, filed on May 3, 2021.
Exhibit D—Order, 19-cv-04792-JPO to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, LLC, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-4, filed on May 3, 2021.
Exhibit E—per curiam Order, 20-2146 to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-5, filed on May 3, 2021.
Exhibit F—per curiam Order, 20-2146 to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-6, filed on May 3, 2021.
Exhibit G—Joint Letter, 20-cv-07868-JMF to Declaration of Monica A. Mark in Support of Defendant American Deposit Management LLC's Reply in Support of the Motion to Dismiss Amended Complaint, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-7, filed on May 3, 2021.
Joint Stipulation of Dismissal with Prejudice, filed in *Island Intellectual Property LLC* v. *American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 52, filed on Oct. 5, 2021.
Complaint, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1, filed on Jul. 20, 2021.
Exhibit 1 to Complaint, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1-2, filed on Jul. 20, 2021.
Exhibit 2 to Complaint, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1-3, filed on Jul. 20, 2021.
Exhibit 3 to Complaint, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1-4, filed on Jul. 20, 2021.
Exhibit 4 to Complaint, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1-5, filed on Jul. 20, 2021.
Exhibit 5 to Complaint, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1-6, filed on Jul. 20, 2021.
Motion to Dismiss the Complaint for Failure to State a Claim Under Fed. R. Civ. P. 12(b)(6), filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 25, filed on Sep. 30, 2021.

(56) References Cited

OTHER PUBLICATIONS

Response in Opposition to Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 38, filed on Oct. 29, 2021.
Exhibit A—TXISL-010708-TXISL-010715 to Response in Opposition to Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 38-1, filed on Oct. 29, 2021.
Reply in Support of Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 40, filed on Nov. 5, 2021.
Affidavit—Declaration of Janis E. Clements to 115. Reply in Support of Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 40-1, filed on Nov. 5, 2021.
Exhibit A to Declaration—Consent Judgment to Reply in Support of Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 40-2, filed on Nov. 5, 2021.
Sur-Reply in Opposition to Motion to Dismiss the Complaint for Failure to State a Claim Under Fed. R. Civ. P. 12(b)(6), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 43, filed on Nov. 12, 2021.
Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.
Exhibit A to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.
Exhibit B to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.
Exhibit C to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.
Exhibit D to Plaintiff Island Intellectual Property LLC's Disclosure of Asserted Claims and Infringement Contentions and Identification of Document Production Accompanying Disclosure (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Sep. 15, 2021.
Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit A-1—551 Lincoln—1985 (1985 SEC No-Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit A-2 551—Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit A-3 551—Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit A-4 551—Britt (America's Community Banker. Dec. 97, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Exhibit A-5—551 Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-1—821—Lincoln—1985 (1985 SEC No-Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-2—821—Hagan (U.S. Pat. No. 5,291,328) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-3—821 Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Ex. B-4—821—Britt (America's Community Banker. Dec. 97, vol. 6 Issue 12) to Defendants Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

(56) References Cited

OTHER PUBLICATIONS

Ex. B-5—821—Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. C-1—916—Lincoln—1985 (1985 SEC No-Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. C-2—916—Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. C-3—916—Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. C-4—916—Britt (America's Community Banker. Dec. 97, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. C-5—916—Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. D-1—286—Lincoln—1985 (1985 SEC No-Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. D-2—286 Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. D-3—286—Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. D-4—286—Britt (America's Community Banker. Dec. 97, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. D-5—286—Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. E-1—734—Lincoln—1985 (1985 SEC No-Act. Lexis 1593) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. E-2—734—Hagan (U.S. Pat. No. 5,291,398) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. E-3—734—Gottesman (U.S. Pat. No. 6,049,782) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. E-4—734—Britt (America's Community Banker. Dec. 97, vol. 6 Issue 12) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Ex. E-5—734-Wharton Study (The Merrill Lynch cash management account financial service—a case study in strategic information systems) to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit F-1 551 Subject Matter Contentions to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit F-2 821 Subject Matter Contentions to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit F-3 916 Subject Matter Contentions to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit F-4 286 Subject Matter Contentions to Defendants' Preliminary Invalidity and Subject Matter Eligibility Contentions, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.

Exhibit F-5 734 Subject Matter Contentions to Defendants' Preliminary Invalidity and Subject Matter Eligibility Contentions, served in *Island Intellectual Property LLC v. TD Ameritrade, Inc.,*

(56) References Cited

OTHER PUBLICATIONS

*TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
Plaintiff's PR 4-2 Disclosure of Preliminary Claim Constructions and Extrinsic Evidence, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Jan. 12, 2021.
Defendants' Disclosure of Preliminary Claim Constructions and Extrinsic Evidence Pursuant to P.R. 4-2, served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Jan. 12, 2021.
Exhibit 46—Jun. 25, 2020 (NYS 002) IIP State Court Complaint to First Amended Complaint, filed in *Stone Castle Management LLC v. Island Intellectual Property LLC*, Case No. 20-cv-07868-JMF (S.D.N.Y.), Dkt. No. 28-46, filed on Dec. 22, 2020.
Brief in Support of Motion to Dismiss Amended Complaint by Kelly Ann Brown and Robert Harm Zondag, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 31, filed on Mar. 1, 2021.
Brief in Support of Motion to Dismiss Amended Complaint by Bruce Allen Arbit, filed in *Island Intellectual Property LLC v. American Deposit Management, LLC*, LLC, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 40, filed on Mar. 1, 2021.
Reply in Support of Defendant American Deposit Management LLC's Motion to Dismiss Amended Complaint, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 46, filed on May 3, 2021.
Exhibit D—Order, 19-cv-04792-JPO to Declaration of Monica A. Mark in Support of Defendant American Deposit Management LLC's Reply in Support of the Motion to Dismiss Amended Complaint, filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47-4, filed on May 3, 2021.
Protective Order, issued in in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 1, filed on Jul. 20, 2021.
Joint Claim Construction and Prehearing Statement by Island Intellectual Property LLC, filed in in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47, filed on Feb. 1, 2022.
Exhibit A to Joint Claim Construction and Prehearing Statement by Island Intellectual Property LLC filed in in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-1, filed on Feb. 1, 2022.
Exhibit B to Joint Claim Construction and Prehearing Statement by Island Intellectual Property LLC filed in in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-2, filed on Feb. 1, 2022.
Exhibit C to Joint Claim Construction and Prehearing Statement by Island Intellectual Property LLC filed in in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-3, filed on Feb. 1, 2022.
Exhibit D to Joint Claim Construction and Prehearing Statement by Island Intellectual Property LLC filed in in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 47-4, filed on Feb. 1, 2022.
Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54, filed on Mar. 2, 2022.
Declaration of John Dellaportas in Support of Plaintiff's Opening Claim Construction Brief Filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-1, filed on Mar. 2, 2022.
Exhibit 1 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-2, filed on Mar. 2, 2022.
Exhibit 2 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-2, filed on Mar. 2, 2022.
Exhibit 3 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-4, filed on Mar. 2, 2022.
Exhibit 4 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-5, filed on Mar. 2, 2022.
Exhibit 5 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-6, filed on Mar. 2, 2022.
Exhibit 6 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-7, filed on Mar. 2, 2022.
Exhibit 7 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-8, filed on Mar. 2, 2022.
Exhibit 8 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-9, filed on Mar. 2, 2022.

(56) References Cited

OTHER PUBLICATIONS

Exhibit 9 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-10, filed on Mar. 2, 2022.
Exhibit 10 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-11, filed on Mar. 2, 2022.
Exhibit 11 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-12, filed on Mar. 2, 2022.
Exhibit 12 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-13, filed on Mar. 2, 2022.
Exhibit 13 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-14, filed on Mar. 2, 2022.
Exhibit 14 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-15, filed on Mar. 2, 2022.
Exhibit 15 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-16, filed on Mar. 2, 2022.
Exhibit 16 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-17, filed on Mar. 2, 2022.
Exhibit 17 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-18, filed on Mar. 2, 2022.
Exhibit 18 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-19, filed on Mar. 2, 2022.
Exhibit 19 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-20, filed on Mar. 2, 2022.
Exhibit 20 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-21, filed on Mar. 2, 2022.
Exhibit 21 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-22, filed on Mar. 2, 2022.
Exhibit 22 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-23, filed on Mar. 2, 2022.
Exhibit 23 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-24, filed on Mar. 2, 2022.
Exhibit 24 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-25, filed on Mar. 2, 2022.
Exhibit 25 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-26, filed on Mar. 2, 2022.
Exhibit 26 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-27, filed on Mar. 2, 2022.
Exhibit 27 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-28, filed on Mar. 2, 2022.
Exhibit 28 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-29, filed on Mar. 2, 2022.
Exhibit 29 to Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-30, filed on Mar. 2, 2022.
Declaration of Ivan Zatkovich in Support of Opening Claim Construction Brief filed by Island Intellectual Property LLC in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 54-30, filed on Mar. 2, 2022.
Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55, filed on Mar. 16, 2022.
Exhibit 1 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade*

(56) References Cited

OTHER PUBLICATIONS

*Trust Company, TD Ameritrade Holding Corp., and The Charles Schwab Corporation*, Case No. 21-cv-00273-JRG (E.D. Tex.), Dkt. No. 55-1, filed on Mar. 16, 2022.
Exhibit 2 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-2, filed on Mar. 16, 2022.
Exhibit 3 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-3, filed on Mar. 16, 2022.
Exhibit 4 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-4, filed on Mar. 16, 2022.
Exhibit 5 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-5, filed on Mar. 16, 2022.
Exhibit 6 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-6, filed on Mar. 16, 2022.
Exhibit 7 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-7, filed on Mar. 16, 2022.
Exhibit 8 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-8, filed on Mar. 16, 2022.
Exhibit 9 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-9, filed on Mar. 16, 2022.
Exhibit 10 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-10, filed on Mar. 16, 2022.
Exhibit 11 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-11, filed on Mar. 16, 2022.
Exhibit 12 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-12, filed on Mar. 16, 2022.
Exhibit 13 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-13, filed on Mar. 16, 2022.
Exhibit 14 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-14, filed on Mar. 16, 2022.
Exhibit 15 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-15, filed on Mar. 16, 2022.
Exhibit 16 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-16, filed on Mar. 16, 2022.
Exhibit 17 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-17, filed on Mar. 16, 2022.
Exhibit 18 to Responsive Claim Construction Brief filed by TD Ameritrade Clearing, Inc., et al. in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 55-18, filed on Mar. 16, 2022.
Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58, filed on Mar. 25, 2022.
Declaration of John Dellaportas to Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58-1, filed on Mar. 25, 2022.
Exhibit 30 to Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58-2, filed on Mar. 25, 2022.
Exhibit 31 to Reply to Claim Construction Brief filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 58-3, filed on Mar. 25, 2022.
Joint Claim Construction Chart by Island Intellectual Property LLC filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 59, filed on Mar. 30, 2022.
Exhibit A to Joint Claim Construction Chart by Island Intellectual Property LLC filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-Jrg (E.D. Tex.), Dkt. No. 59-1, filed on Mar. 30, 2022.
Order denying without prejudice Doc. 25 Motion to Dismiss the Complaint for Failure to State a Claim Under Fed. R. Civ. P.

(56) References Cited

OTHER PUBLICATIONS

12(b)(6), issued in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 63, on Apr. 12, 2022.

Redaction to 68 Response to Non-Motion, Sealed Answer and Counterclaims by TD Ameritrade Clearing, Inc., et al., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 71, on May 5, 2022.

Response to 68 Response to Non-Motion, Answer to Counterclaims by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 71, on May 5, 2022.

Claim Construction Memorandum Opinion and Order. Signed by District Judge Rodney Gilstrap, issued in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 73, on May 20, 2022.

Stipulation by Island Intellectual Property LLC. filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 78, on Jun. 9, 2022.

Stipulation by Island Intellectual Property LLC. filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 79, on Jun. 10, 2022.

Stipulation by Island Intellectual Property LLC. filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 81, on May 5, 2022.

Motion to Strike / Defendants Daubert Motion to Exclude the Opinions and Testimony of Brian P. Murphy by TD Ameritrade Clearing, Inc., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85, on Jul. 15, 2022.

Declaration of Nicholas A. Brown in Support of Defendants' Daubert Motion to Exclude the Opinions and Testimony of Brian P. Murphy, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-1, on Jul. 15, 2022.

Exhibit 1 to Motion to Strike / Defendants Daubert Motion to Exclude the Opinions and Testimony of Brian P. Murphy by TD Ameritrade Clearing, Inc., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-2, on Jul. 15, 2022.

Exhibit 2 to Motion to Strike / Defendants Daubert Motion to Exclude the Opinions and Testimony of Brian P. Murphy by TD Ameritrade Clearing, Inc., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-3, on Jul. 15, 2022.

Exhibit 3 to Motion to Strike / Defendants Daubert Motion to Exclude the Opinions and Testimony of Brian P. Murphy by TD Ameritrade Clearing, Inc., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-4, on Jul. 15, 2022.

Proposed Order to Motion to Strike / Defendants Daubert Motion to Exclude the Opinions and Testimony of Brian P. Murphy by TD Ameritrade Clearing, Inc., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 85-5, on Jul. 15, 2022.

Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88, on Jul. 15, 2022.

Appendix A to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-2, on Jul. 15, 2022.

Appendix B to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-3, on Jul. 15, 2022.

Appendix C to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-4, on Jul. 15, 2022.

Appendix D to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-5, on Jul. 15, 2022.

Appendix E to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-6, on Jul. 15, 2022.

Appendix F to Motion to Strike / Plaintiffs Daubert Motion to Exclude Certain Portions of the Expert Testimony of Richard T.

(56) References Cited

OTHER PUBLICATIONS

Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-7, on Jul. 15, 2022.

Appendix G to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-8, on Jul. 15, 2022.

Appendix H to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-9, on Jul. 15, 2022.

Appendix I to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-10, on Jul. 15, 2022.

Appendix J to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-11, on Jul. 15, 2022.

Appendix K to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-12, on Jul. 15, 2022.

Appendix L to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-13, on Jul. 15, 2022.

Appendix M to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-14, on Jul. 15, 2022.

Appendix N to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-15, on Jul. 15, 2022.

Appendix O to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-16, on Jul. 15, 2022.

Appendix P to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-17, on Jul. 15, 2022.

Appendix Q to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-18, on Jul. 15, 2022.

Appendix R to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-19, on Jul. 15, 2022.

Appendix S to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-20, on Jul. 15, 2022.

Appendix T to Motion to Strike / Plaintiffs Daubert Motion to Exclude Certain Portions of the Expert Testimony of Richard T. Powers Regarding Invalidity of U.S. Pat. Nos. 7,508,286; 7,519,551;

(56) References Cited

OTHER PUBLICATIONS 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-21, on Jul. 15, 2022.
Appendix U to Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art by Island Intellectual Property LLC., filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 88-22, on Jul. 15, 2022.
Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97, on Jul. 20, 2022.
Exhibit A to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-2, on Jul. 20, 2022.
Exhibit B to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-3, on Jul. 20, 2022.
Exhibit C to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-4, on Jul. 20, 2022.
Exhibit E to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-6, on Jul. 20, 2022.
Exhibit G to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-8, on Jul. 20, 2022.
Exhibit H to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-9, on Jul. 20, 2022.
Exhibit K to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-12, on Jul. 20, 2022.
Exhibit L to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-13, on Jul. 20, 2022.
Exhibit M to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-14, on Jul. 20, 2022.
Exhibit N to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-15, on Jul. 20, 2022.
Exhibit O to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-16, on Jul. 20, 2022.
Exhibit P to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 97-17, on Jul. 20, 2022.
Exhibit Q to Redaction to 84 Sealed Motion to Strike as Untimely Certain Portions of the Expert Testimony of Richard T. Powers Regarding Invalidity of U.S. Pat. Nos. 7,508,286; 7,519,551; 7,933,821; and 8,311,916 by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-Jrg (E.D. Tex.), Dkt. No. 97-18, on Jul. 20, 2022.
Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98, on Jul. 20, 2022.
Exhibit B to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing,*

(56) References Cited

OTHER PUBLICATIONS

*Inc., TD Ameritrade Trust Company, TD Ameritrade Holding Corp., and The Charles Schwab Corporation*, Case No. 21-cv-00273-JRG (E.D. Tex.), Dkt. No. 98-3, on Jul. 20, 2022.
Exhibit C to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-4, on Jul. 20, 2022.
Exhibit D to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-5, on Jul. 20, 2022.
Exhibit E to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-6, on Jul. 20, 2022.
Exhibit F to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-7, on Jul. 20, 2022.
Exhibit G to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-8, on Jul. 20, 2022.
Exhibit H to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-9, on Jul. 20, 2022.
Exhibit I to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-10, on Jul. 20, 2022.
Exhibit J to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-11, on Jul. 20, 2022.
Exhibit L to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-13, on Jul. 20, 2022.
Exhibit M to Redaction to 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916, , filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 98-14, on Jul. 20, 2022.
Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-Jrg (E.D. Tex.), Dkt. No. 99, on Jul. 20, 2022.
Exhibit A to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-2, on Jul. 20, 2022.
Exhibit B to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-3, on Jul. 20, 2022.
Exhibit C to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-4, on Jul. 20, 2022.
Exhibit D to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-5, on Jul. 20, 2022.
Exhibit E to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-6, on Jul. 20, 2022.
Exhibit G to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intel-*

(56) References Cited

OTHER PUBLICATIONS lectual Property LLC v. TD Ameritrade, Inc., TD Ameritrade Clearing, Inc., TD Ameritrade Trust Company, TD Ameritrade Holding Corp., and The Charles Schwab Corporation, Case No. 21-cv-00273-JRG (E.D. Tex.), Dkt. No. 99-8, on Jul. 20, 2022.
Exhibit H to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-9, on Jul. 20, 2022.
Exhibit J to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-11, on Jul. 20, 2022.
Exhibit K to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-12, on Jul. 20, 2022.
Exhibit L to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-13, on Jul. 20, 2022.
Exhibit N to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-15, on Jul. 20, 2022.
Exhibit O to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-16, on Jul. 20, 2022.
Exhibit P to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-17, on Jul. 20, 2022.
Exhibit Q to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-18, on Jul. 20, 2022.
Exhibit R to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-19, on Jul. 20, 2022.
Exhibit S to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-20, on Jul. 20, 2022.
Exhibit T to Redaction to 90 Sealed Motion for Partial Summary Judgment of Dismissal of Defendants Third, Sixth and Twelfth Counterclaims and Ninth Affirmative Defense Alleging Unenforceability of the 551, 821 and 286 Patents Based on Inequitable Conduct by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 99-21, on Jul. 20, 2022.
Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100, on Jul. 20, 2022.
Exhibit C to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-4, on Jul. 20, 2022.
Exhibit F to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-7, on Jul. 20, 2022.
Exhibit G to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-8, on Jul. 20, 2022.
Exhibit H to Redaction to 95 Sealed Motion (Corrected) /Daubert Motion to Exclude Reasonable Royalty Analysis of Dana Trexler as Unreliable and to Strike Her Opinions as to Cost of Alleged

(56) References Cited

OTHER PUBLICATIONS

Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-9, on Jul. 20, 2022.
Exhibit I to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-10, on Jul. 20, 2022.
Exhibit J to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-11, on Jul. 20, 2022.
Exhibit K to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-12, on Jul. 20, 2022.
Exhibit P to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-17, on Jul. 20, 2022.
Exhibit V to Redaction to 95 Sealed Motion (Corrected) /Daubert Motion to Exclude Reasonable Royalty Analysis of Dana Trexler as Unreliable and to Strike Her Opinions as to Cost of Alleged Non-Infringing Alternatives to the 286 Patent as Untimely and Unreliable by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 100-23, on Jul. 20, 2022.
Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102, on Jul. 20, 2022.
Declaration of Nicholas A. Brown in Support of Defendants' Motion for Partial Summary Judgment of no Infringement Under the Doctrine of Equivalents and No Indirect Infringement, to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-1, on Jul. 20, 2022.
Exhibit 2 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-2, on Jul. 20, 2022.
Exhibit 3 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-3, on Jul. 20, 2022.
Exhibit 4 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-4, on Jul. 20, 2022.
Exhibit 5 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-5, on Jul. 20, 2022.
Exhibit 6 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-6, on Jul. 20, 2022.
Exhibit 7 to Redaction to 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 102-7, on Jul. 20, 2022.
Redaction to 91 Sealed Motion / Defendants' Daubert Motion to Exclude the Opinions and Testimony of Bryan M. Van Uden, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103, on Jul. 20, 2022.

(56) References Cited

OTHER PUBLICATIONS

Declaration of Julie P. Bookbinder in Support of Defendants' Daubert Motion to Exclude the Opinions and Testimony of Bryan M. Van Uden Deredaction to 91 Sealed Motion / Defendants' Daubert Motion to Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103-1, on Jul. 20, 2022.

Exhibit 1 to Redaction to 91 Sealed Motion / Defendants' Daubert Motion to Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103-2, on Jul. 20, 2022.

Exhibit 6 to Redaction to 91 Sealed Motion / Defendants' Daubert Motion to Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 103-3, on Jul. 20, 2022.

Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104, on Jul. 20, 2022.

Declaration Nicholas A. Brown in Support of Defendants' Motion for Summary Judgment, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-1, on Jul. 20, 2022.

Exhibit 1 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-2, on Jul. 20, 2022.

Exhibit 2 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-3, on Jul. 20, 2022.

Exhibit 3 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-4, on Jul. 20, 2022.

Exhibit 4 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-5, on Jul. 20, 2022.

Exhibit 5 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-6, on Jul. 20, 2022.

Exhibit 6 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-7, on Jul. 20, 2022.

Exhibit 7 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-8, on Jul. 20, 2022.

Exhibit 8 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-9, on Jul. 20, 2022.

Exhibit 9 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-10, on Jul. 20, 2022.

Exhibit 10 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-11, on Jul. 20, 2022.

Exhibit 11 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-12, on Jul. 20, 2022.

Exhibit 12 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD*

(56) References Cited

OTHER PUBLICATIONS

*Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-13, on Jul. 20, 2022.
Exhibit 13 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-14, on Jul. 20, 2022.
Exhibit 14 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-15, on Jul. 20, 2022.
Exhibit 15 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-16, on Jul. 20, 2022.
Exhibit 16 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-17, on Jul. 20, 2022.
Exhibit 17 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-18, on Jul. 20, 2022.
Exhibit 18 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-19, on Jul. 20, 2022.
Exhibit 19 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-20, on Jul. 20, 2022.
Exhibit 20 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-21, on Jul. 20, 2022.
Exhibit 21 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-22, on Jul. 20, 2022.
Exhibit 22 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-23, on Jul. 20, 2022.
Exhibit 23 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-24, on Jul. 20, 2022.
Exhibit 24 to Redaction to 92 Sealed Motion / Defendants' Motion for Summary Judgment of Invalidity Under 36 U.S.C. § 101 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 104-25, on Jul. 20, 2022.
Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105, on Jul. 20, 2022.
Declaration of Julie P. Bookbinder in Support of Defendants' Daubert Motion to Exclude Certain Opinions and Testimony of Ivan Zatkovich filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-1, on Jul. 20, 2022.
Exhibit 1 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-2, on Jul. 20, 2022.
Exhibit 2 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island*

(56) References Cited

OTHER PUBLICATIONS

*Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-3, on Jul. 20, 2022.
Exhibit 3 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-4, on Jul. 20, 2022.
Exhibit 4 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-5, on Jul. 20, 2022.
Exhibit 6 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-6, on Jul. 20, 2022.
Exhibit 7 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-7, on Jul. 20, 2022.
Exhibit 8 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-8, on Jul. 20, 2022.
Exhibit 10 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-9, on Jul. 20, 2022.
Exhibit 11 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-10, on Jul. 20, 2022.
Exhibit 12 to Redaction to 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 105-11, on Jul. 20, 2022.
Response in Opposition re 85 Motion to Strike / Defendants Daubert Motion to Exclude the Opinions and Testimony of Brian P. Murphy filed by *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106, on Jul. 20, 2022.
Exhibit A to Response in Opposition re 85 Motion to Strike / Defendants Daubert Motion to Exclude the Opinions and Testimony of Brian P. Murphy filed by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-1, on Jul. 20, 2022.
Exhibit B to Response in Opposition re 85 Motion to Strike / Defendants Daubert Motion to Exclude the Opinions and Testimony of Brian P. Murphy filed by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-2, on Jul. 20, 2022.
Exhibit C to Response in Opposition re 85 Motion to Strike / Defendants Daubert Motion to Exclude the Opinions and Testimony of Brian P. Murphy filed by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-3, on Jul. 20, 2022.
Exhibit D to Response in Opposition re 85 Motion to Strike / Defendants Daubert Motion to Exclude the Opinions and Testimony of Brian P. Murphy filed by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 106-4, on Jul. 20, 2022.
Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116, on Jul. 29, 2022.
Exhibit 1 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-1, on Jul. 29, 2022.
Exhibit 2 to Redaction to 107 Sealed Patent Response to Sealed Patent Motion, re 88 Motion to Strike / Plaintiffs Daubert Motion to Exclude Certain Portions of the Expert Testimony of Richard T.

(56) References Cited

OTHER PUBLICATIONS

Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-2, on Jul. 29, 2022.

Exhibit 3 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-3, on Jul. 29, 2022.

Exhibit 4 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-4, on Jul. 29, 2022.

Exhibit 6 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-5, on Jul. 29, 2022.

Exhibit 7 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-6, on Jul. 29, 2022.

Exhibit 8 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-7, on Jul. 29, 2022.

Exhibit 9 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-8, on Jul. 29, 2022.

Exhibit 10 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-9, on Jul. 29, 2022.

Exhibit 11 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-10, on Jul. 29, 2022.

Exhibit 12 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116,-11 on Jul. 29, 2022.

Exhibit 13 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-12, on Jul. 29, 2022.

Exhibit 14 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-13, on Jul. 29, 2022.

(56) References Cited

OTHER PUBLICATIONS

Exhibit 15 to Redaction to 107 Sealed Patent Response to Sealed Patent Motion, re 88 Motion to Strike / Plaintiffs Daubert Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipat by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-14, on Jul. 29, 2022.
Declaration of Nicholas A. Brown in Support of Defendants Opposition to Motion to Exclude Certain Portions of the Expert Testimony of Richard T. Powers Regarding Invalidity of U.S. Pat. Nos. 7,508,286; 7,519,551; 7,933,821; and 8,311,916 and for Summary Judgment of No Anticipation by the Merrill Lynch Prior Art, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 116-15, on Jul. 29, 2022.
Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117, on Jul. 29, 2022.
Exhibit 1 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-1, on Jul. 29, 2022.
Exhibit 2 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-2, on Jul. 29, 2022.
Exhibit 3 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-3, on Jul. 29, 2022.
Exhibit 4 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-4, on Jul. 29, 2022.
Exhibit 5 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-5, on Jul. 29, 2022.
Exhibit 7 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-6, on Jul. 29, 2022.
Exhibit 9 to Redaction to 108 Sealed Patent Response to Sealed Patent Motion, re 86 Sealed Motion to Strike and Exclude New and Untimely Opinions of Steven R. Kursh Regarding Written Description and Noninfringement of U.S. Pat. Nos. 7,508,286; 7,519,551; 7,933,821; and 8,311,916 by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-7, on Jul. 29, 2022.
Declaration of Nicholas A. Brown in Support of Defendants' Opposition to Plaintiff's Motion to Strike and Exclude New and Untimely Opinions of Steven R. Kursh Regarding Written Description and Noninfringement of U.S. Pat. Nos. 7,508,286; 7,519,551; 7,933,821; and 8,311,916, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 117-8, on Jul. 29, 2022.
Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118, on Jul. 29, 2022.
Exhibit 2 to Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-1, on Jul. 29, 2022.
Exhibit 3 to Redaction to 109 Sealed Patent Response to Sealed Patent Motion,, re 84 Sealed Motion to Strike as Untimely Certain Portions of the Expert Testimony of Richard T. Powers Regarding

(56) References Cited

OTHER PUBLICATIONS

Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-2, on Jul. 29, 2022.

Exhibit 4 to Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-3, on Jul. 29, 2022.

Exhibit 6 to Redaction to 109 Sealed Patent Response to Sealed Patent Motion,, re 84 Sealed Motion to Strike as Untimely Certain Portions of the Expert Testimony of Richard T. Powers Regarding Invalidity by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-4, on Jul. 29, 2022.

Declaration of Nicholas A. Brown in Support of Defendants' Opposition to Plaintiff's Motion to Strike as Untimely Certain Portions of the Expert Testimony of Richard T. Powers Regarding Invalidity of U.S. Pat. Nos. 7,508,286; 7,519,551; 7,933,821; and 8,311,916, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 118-5, on Jul. 29, 2022.

Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 2 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 9 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 10 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Exhibit 12 to Redaction to 111 Sealed Patent Response to Sealed Patent Motion,,, re 95 Sealed Motion (Corrected) /Daubert Motion to Exclude Reasonable Royalty Analysis of Dana Trexler as Unreliable and to Strike Her Opinions as to Cost of Alleged Non-Infringing Alternative by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119, on Jul. 29, 2022.

Declaration of Julie P. Bookbinder in Support of Defendants' Opposition to Plaintiff's Corrected Daubert Motion to Exclude Reasonable Royalty Analysis of Dana Trexler as Unreliable and to Strike Her Opinions as to Cost of Alleged Non-Infringing Alternatives, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 119-5, on Jul. 29, 2022.

Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120, on Jul. 29, 2022.

Exhibit 1 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-1, on Jul. 29, 2022.

Exhibit 2 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-2, on Jul. 29, 2022.

Exhibit 3 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-3, on Jul. 29, 2022.

Exhibit 4 to Redaction to 115 Sealed Patent Response to Sealed Patent Motion, re 90 Sealed Motion for Partial Summary Judgment

(56) References Cited

OTHER PUBLICATIONS of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-4, on Jul. 29, 2022.
Exhibit 13 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-8, on Jul. 29, 2022.
Exhibit 14 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-9, on Jul. 29, 2022.
Exhibit 16 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-10, on Jul. 29, 2022.
Exhibit 17 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-11, on Jul. 29, 2022.
Exhibit 18 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-12, on Jul. 29, 2022.
Exhibit 19 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-13, on Jul. 29, 2022.
Exhibit 20 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-14, on Jul. 29, 2022.
Exhibit 23 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-15, on Jul. 29, 2022.
Exhibit 24 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-16, on Jul. 29, 2022.
Exhibit 25 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-17, on Jul. 29, 2022.
Exhibit 26 to Redaction to 115 Sealed Patent Response to Sealed Patent Motion, re 90 Sealed Motion for Partial Summary Judgment of Dismissal of Defendants Third, Sixth and Twelfth Counterclaims and Ninth Affirmative Defense by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-18, on Jul. 29, 2022.
Declaration of Nicholas A. Brown in Support of Defendants' Opposition to Plaintiff's Sealed Motion for Partial Summary Judgment of Dismissal of Defendants' Third, Sixth and Twelfth Counterclaims and Ninth Affirmative Defense Alleging Unenforceability of the '551, '821 and '286 Patents Based on Inequitable Conduct, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 120-19, on Jul. 29, 2022.
Redaction to 110 Sealed Response to Motion, by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121, on Aug. 1, 2022.
Exhibit A to Redaction to 110 Sealed Response to Motion, by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-1, on Aug. 1, 2022.

(56) References Cited

OTHER PUBLICATIONS

Exhibit B to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-2, on Aug. 1, 2022.
Exhibit C to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-3, on Aug. 1, 2022.
Exhibit D to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-4, on Aug. 1, 2022.
Exhibit H to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-8, on Aug. 1, 2022.
Exhibit I to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-9, on Aug. 1, 2022.
Exhibit R to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-18, on Aug. 1, 2022.
Exhibit T to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-20, on Aug. 1, 2022.
Exhibit U to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-21, on Aug. 1, 2022.
Exhibit V to Redaction to 110 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 121-22, on Aug. 1, 2022.
Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122, on Aug. 1, 2022.
Exhibit A to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-1, on Aug. 1, 2022.
Exhibit B to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-2, on Aug. 1, 2022.
Exhibit C to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-3, on Aug. 1, 2022.
Exhibit D to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-4, on Aug. 1, 2022.
Exhibit N to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-14, on Aug. 1, 2022.
Exhibit O to Redaction to 112 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 122-15, on Aug. 1, 2022.
Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123, on Aug. 1, 2022.
Exhibit D to Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123, on Aug. 1, 2022.
Exhibit J to Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123-10, on Aug. 1, 2022.
Exhibit L to Redaction to 113 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 123-12, on Aug. 1, 2022.
Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124, on Aug. 1, 2022.
Exhibit A to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-1, on Aug. 1, 2022.
Exhibit B to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-2, on Aug. 1, 2022.
Exhibit C to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade

(56) References Cited

OTHER PUBLICATIONS

Trust Company, TD Ameritrade Holding Corp., and The Charles Schwab Corporation, Case No. 21-cv-00273-JRG (E.D. Tex.), Dkt. No. 124-3, on Aug. 1, 2022.
Exhibit F to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-6, on Aug. 1, 2022.
Exhibit H to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-8, on Aug. 1, 2022.
Exhibit I to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-9, on Aug. 1, 2022.
Exhibit K to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-11, on Aug. 1, 2022.
Exhibit P to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-16, on Aug. 1, 2022.
Exhibit Q to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-17, on Aug. 1, 2022.
Exhibit R to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-18, on Aug. 1, 2022.
Exhibit S to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-19, on Aug. 1, 2022.
Exhibit T to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-20, on Aug. 1, 2022.
Exhibit U to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-21, on Aug. 1, 2022.
Exhibit V to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-22, on Aug. 1, 2022.
Exhibit W to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-23, on Aug. 1, 2022.
Exhibit X to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-24, on Aug. 1, 2022.
Exhibit Y to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-25, on Aug. 1, 2022.
Exhibit DD to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-30, on Aug. 1, 2022.
Exhibit EE to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-31, on Aug. 1, 2022.
Exhibit FF to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-32, on Aug. 1, 2022.
Exhibit GG to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-33, on Aug. 1, 2022.
Exhibit HH to Redaction to 114 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 124-34, on Aug. 1, 2022.
Reply to Response to Motion re 85 Motion to Strike / Defendants Daubert Motion to Exclude the Opinions and Testimony of Brian P. Murphy filed by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 128, on Aug. 3, 2022.
Redaction to 129 Sealed Patent Reply to Response to Patent Motion, re 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 136, on Aug. 5, 2022.
Exhibit 13 to Redaction to 129 Sealed Patent Reply to Response to Patent Motion, re 96 Sealed Motion / Corrected—Defendants' Daubert Motion to Exclude Certain Opinions and Testimony of Ivan Zatkovich by TD Ameritrade Clearing, Inc., TD Ameritrade Holding Corp., TD Ameritrade Trust Company, TD Ameritrade, Inc., The Charles Schwab Corporation, filed in *Island Intellectual Property*

(56) References Cited

OTHER PUBLICATIONS

*LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 136-1, on Aug. 5, 2022.
Declaration of Nicholas A. Brown in Support of Defendants' Reply in Further Support of Their Daubert Motion to Exclude Certain Opinions and Testimony of Ivan Zatkovich filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 136-2, on Aug. 5, 2022.
Redaction to 130 Sealed Patent Reply to Response to Patent Motion, re 87 Sealed Motion / Defendants' Motion for Partial Summary Judgment of No Infringement Under the Doctrine of Equivalents and No Indirect Infringement by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 137, on Aug. 5, 2022.
Redaction to 134 Sealed Patent Reply to Response to Patent Motion,, re 91 Sealed Motion / Defendants' Daubert Motion to Exclude the Opinions and Testimony of Bryan M. Van Uden by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138, on Aug. 5, 2022.
Exhibit 12 to Redaction to 134 Sealed Patent Reply to Response to Patent Motion, re 91 Sealed Motion / Defendants' Daubert Motion to Exclude the Opinions and Testimony of Bryan M. Van Uden by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138-1, on Aug. 5, 2022.
Exhibit 13 to Redaction to 134 Sealed Patent Reply to Response to Patent Motion, re 91 Sealed Motion / Defendants' Daubert Motion to Exclude the Opinions and Testimony of Bryan M. Van Uden by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138-2, on Aug. 5, 2022.
Declaration of Julie P. Bookbinder in Support of Defendants' Reply in Further Support of Their Daubert Motion to Exclude the Opinions and Testimony of Bryan M. Van Uden, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 138-3, on Aug. 5, 2022.
Redaction to 125 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 139, on Aug. 5, 2022.
Exhibit U to Redaction to 125 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 139-1, on Aug. 5, 2022.
Exhibit V to Redaction to 125 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 139-2, on Aug. 5, 2022.
Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140, on Aug. 5, 2022.
Exhibit S to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-2, on Aug. 5, 2022.
Exhibit T to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-3, on Aug. 5, 2022.
Exhibit U to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-4, on Aug. 5, 2022.
Exhibit V to Redaction to 126 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 140-5, on Aug. 5, 2022.
Redaction to 135 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 141, on Aug. 5, 2022.
Redaction to 131 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 142, on Aug. 5, 2022.
Redaction to 132 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 143, on Aug. 5, 2022.
Exhibit S to Redaction to 132 Sealed Reply to Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 143-3, on Aug. 5, 2022.
Sur-Reply to Reply to Response to Motion re 85 Motion to Strike / Defendants Daubert Motion to Exclude the Opinions and Testimony of Brian P. Murphy filed by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 150, on Aug. 10, 2022.
Redaction to 155 Sealed Sur-Reply to Reply to Response to Motion, by TD Ameritrade Clearing, Inc., TD Ameritrade Holding Corp., TD Ameritrade Trust Company, TD Ameritrade, Inc., The Charles

(56) References Cited

OTHER PUBLICATIONS

Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 162, on Aug. 12, 2022.

Declaration of Nicholas A. Brown in Support of Defendants' Sur-Reply in Further Opposition to Plaintiff's Sealed Motion for Partial Summary Judgment of Dismissal of Defendants' Third, Sixth and Twelfth Counterclaims and Ninth Affirmative Defense Alleging Unenforceability of the '551, '821 and '286 Patents Based on Inequitable Conduct, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 162-1, on Aug. 12, 2022.

Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163, on Aug. 12, 2022.

Declaration of Julie P. Bookbinder in Support of Defendants' Sur-Reply in Further Opposition to Plaintiff's Corrected Daubert Motion to Exclude Reasonable Royalty Analysis of Dana Trexler as Unreliable and to Strike Her Opinions as to Cost of Alleged Non-Infringing Alternatives, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-1, on Aug. 12, 2022.

Exhibit 14 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-2, on Aug. 12, 2022.

Exhibit 15 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-3, on Aug. 12, 2022.

Exhibit 16 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-4, on Aug. 12, 2022.

Exhibit 17 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-5, on Aug. 12, 2022.

Exhibit 18 to Redaction to 156 Sealed Sur-Reply to Reply to Response to Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 163-6, on Aug. 12, 2022.

Redaction to 157 Sealed Patent Sur-Reply to Reply to Response to Patent Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 164, on Aug. 12, 2022.

Redaction to 158 Sealed Patent Sur-Reply to Reply to Response to Patent Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 165, on Aug. 12, 2022.

Agreed Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 167, on Aug. 15, 2022.

Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170, on Aug. 17, 2022.

Declaration of Nicholas A. Brown in Support of Defendants' Opposed Motions in Limine and to Exclude, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-1, on Aug. 17, 2022.

Exhibit 1 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-2, on Aug. 17, 2022.

Exhibit 2 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-3, on Aug. 17, 2022.

Exhibit 3 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-4, on Aug. 17, 2022.

Exhibit 4 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-5, on Aug. 17, 2022.

(56) References Cited

OTHER PUBLICATIONS

Exhibit 5 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-6, on Aug. 17, 2022.
Exhibit 8 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-9, on Aug. 17, 2022.
Exhibit 9 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-10, on Aug. 17, 2022.
Exhibit 10 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-11, on Aug. 17, 2022.
Exhibit 12 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-12, on Aug. 17, 2022.
Exhibit 13 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-13, on Aug. 17, 2022.
Exhibit 14 to Redaction to 169 Opposed Sealed Patent Motion in Limine and to Exclude by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 170-14, on Aug. 17, 2022.
Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171, on Aug. 18, 2022.
Exhibit C to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-3, on Aug. 18, 2022.
Exhibit E to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-5, on Aug. 18, 2022.
Exhibit F to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-6, on Aug. 18, 2022.
Exhibit G to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-7, on Aug. 18, 2022.
Exhibit H to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-8, on Aug. 18, 2022.
Exhibit I to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-9, on Aug. 18, 2022.
Exhibit J to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-10, on Aug. 18, 2022.
Exhibit K to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-11, on Aug. 18, 2022.
Exhibit L to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-12, on Aug. 18, 2022.
Exhibit O to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-15, on Aug. 18, 2022.
Exhibit B to Redaction to 168 Sealed Patent Motion in Limine by Island Intellectual Property LLC, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 171-2, on Aug. 18, 2022.
Redaction to 172 Sealed Patent Response to Sealed Patent Motion, re 168 Sealed Patent Motion in Limine by TD Ameritrade Clearing, Inc., TD Ameritrade Holding Corp., TD Ameritrade Trust Company, TD Ameritrade, Inc., The Charles Schwab Corporation, filed in *Island Intellectual Property LLC* v. *TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 175, on Aug. 24, 2022.
Redaction to 173 Sealed Response to Motion, by Island Intellectual Property LLC, filed in *Island Intellectual Property LLC* v. *TD Ameritrade, Inc., TD Ameritrade Clearing, Inc., TD Ameritrade*

(56) References Cited

OTHER PUBLICATIONS

*Trust Company, TD Ameritrade Holding Corp., and The Charles Schwab Corporation*, Case No. 21-cv-00273-JRG (E.D. Tex.), Dkt. No. 176, on Aug. 25, 2022.
Exhibit G to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-7, on Aug. 25, 2022.
Exhibit Q to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-17, on Aug. 25, 2022.
Exhibit R to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-18, on Aug. 25, 2022.
Exhibit S to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-19, on Aug. 25, 2022.
Exhibit T to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-20, on Aug. 25, 2022.
Exhibit Y to Redaction to 173 Sealed Response to Motion, by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 176-25, on Aug. 25, 2022.
Stipulation (Joint Stipulations of the Parties) by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 182, on Sep. 22, 2022.
Report and Recommendations re 92 Sealed Motion / Defendants' Motion for Summary Judgment of Invalidity Under 36 U.S.C. § 101 filed by TD Ameritrade Holding Corp., TD Ameritrade Trust Company, TD Ameritrade, Inc., TD Ameritrade Clearing, Inc., The Charles Schwab Corporation. Signed by Magistrate Judge Roy S. Payne on Sep. 28, 2022 in filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 184.
Redaction to 189 Sealed Objection to Report and Recommendations by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 190 on Oct. 19, 2022.
Appendix A—Material Disputed Facts on Inventiveness to Redaction to 189 Sealed Objection to Report and Recommendations by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 190-1 on Oct. 19, 2022.
Appendix B—Island's Post-Alice Patents to Redaction to 189 Sealed Objection to Report and Recommendations by Island Intellectual Property LLC, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 190-2 on Oct. 19, 2022.
Redaction to 191 Sealed Patent Response to Non-Motion, by TD Ameritrade Clearing, Inc., TD Ameritrade Holding Corp., TD Ameritrade Trust Company, TD Ameritrade, Inc., The Charles Schwab Corporation, filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 192 on Nov. 1, 2022.
Order Adopting Report and Recommendations for 184 Report and Recommendations, Islands objections (Dkt. No. 189) are Overruled. Defendants motion for summary judgment (Dkt. No. 92) is Granted, issued in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 192 on Nov. 17, 2022.
U.S. Appl. No. 12/453,387, filed May 8, 2009, Bruce Bent et al.
U.S. Appl. No. 12/453,388, filed May 8, 2009, Bruce Bent et al.
U.S. Appl. No. 12/794,488, filed Jun. 4, 2010, Bruce Bent et al.
U.S. Appl. No. 12/794,545, filed Jun. 4, 2010, Bruce Bent et al.
U.S. Appl. No. 12/829,961, filed Jul. 2, 2010, Bruce Bent et al.
U.S. Appl. No. 12/025,402, filed Feb. 4, 2008, Bent.
U.S. Appl. No. 12/453,390, filed May 8, 2009, Bruce Bent.
U.S. Appl. No. 12/408,507.
U.S. Appl. No. 12/453,387.
U.S. Appl. No. 12/453,388.
U.S. Appl. No. 12/622,979.
U.S. Appl. No. 12/638,544.
U.S. Appl. No. 12/794,448.
U.S. Appl. No. 12/816,092.
U.S. Appl. No. 13/032,456.
U.S. Appl. No. 12/032,467.
U.S. Appl. No. 13/228,031.
Order Granting Plantiff's Requesr for an Indicative Ruling, issued in *Island Intellectual Property LLC v. Stone Castle Management LLC et al.*, Case No. 19-04792-JPO (S.D.N.Y.), Dkt. No. 73, issued on Apr. 13, 2021.
First Amended Complaint (with Exhibits), filed in *Stone Castle Management LLC v. Island Intellectual Property LLC*, Case No. 20-cv-07868-JMF (S.D.N.Y.), Dkt. No. 28, filed on Dec. 22, 2020.
Declaration of Jordan Bekier in Opposition to Motion to Dismiss First Amended Complaint (with Exhibits), filed in *Stone Castle Management LLC v. Island Intellectual Property LLC*, Case No. 20-cv-07868-JMF (S.D.N.Y.), Dkt. No. 36, filed on Jan. 26, 2021.
Amended Complaint (with Exhibits), filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 28, filed on Feb. 1, 2021.
Declaration of Monica A. Mark in Support of Motion to Dismiss Amended Complaint by Kelly Ann Brown and Robert Harm Zondag (with Exhibits), filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 32, filed on Mar. 1, 2021.
Declaration of Monica A. Mark in Support of Defendant American Deposit Management LLC's Reply in Support of the Motion to Dismiss Amended Complaint (with Exhibits), filed in *Island Intellectual Property LLC v. American Deposit Management, LLC*, dba The American Deposit Management Co., A.B. Data, Ltd., Bruce Allen Arbit, Kelly Ann Brown, and Robert Harm Zondag, Case No. 20-cv-1535 PP (E.D. Wis.), Dkt. No. 47, filed on May 3, 2021.
Complaint (with Exhibits), filed in *Island Intellectual Property LLC v. TD Ameritrade, Inc., TD Ameritrade Clearing, Inc., TD Ameritrade*

(56) References Cited

OTHER PUBLICATIONS

*Trust Company, TD Ameritrade Holding Corp., and The Charles Schwab Corporation*, Case No. 21-cv-00273-JRG (E.D. Tex.), Dkt. No. 1, filed on Jul. 20, 2021.
Response in Opposition to Motion to Dismiss the Complaint for Failure to State a Claim Under Fed. R. Civ. P. 12(b)(6) (with Exhibits), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 38, filed on Oct. 29, 2021.
Reply in Support of Motion to Dismiss the Complaint for Failure to State a Claim Under Fed. R. Civ. P. 12(b)(6) (with Exhibits), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 40, filed on Nov. 5, 2021.
Sur-Reply in Opposition to Motion to Dismiss the Complaint for Failure to State a Claim Under Fed. R. Civ. P. 12(b)(6) (with Exhibits), filed in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), Dkt. No. 43, filed on Nov. 12, 2021.
Defendants' Preliminary Invalidity and Subject Matter Eligibility Contentions (with Exhibits), served in *Island Intellectual Property LLC v. TD Ameritrade, Inc., TD Ameritrade Clearing, Inc., TD Ameritrade Trust Company, TD Ameritrade Holding Corp., and The Charles Schwab Corporation*, Case No. 21-cv-00273-JRG (E.D. Tex.), served on Nov. 23, 2021.
U.S. Appl. No. 09/176,340, filed Oct. 21, 1998, Issued USP Expired.
U.S. Appl. No. 09/324,296, filed Jun. 2, 1999, Abandoned.
U.S. Appl. No. 09/677,535, filed Oct. 2, 2000, Issued USP Expired.
U.S. Appl. No. 10/071,053, filed Feb. 8, 2002, Issued USP Expired.
U.S. Appl. No. 10/305,439, filed Nov. 26, 2002, Issued USP Expired.
U.S. Appl. No. 10/382,946, filed Mar. 6, 2003, now U.S. Pat. No. 7,536,350.
U.S. Appl. No. 10/411,650, filed Apr. 11, 2003, now U.S. Pat. No. 7,509,286.
U.S. Appl. No. 10/825,440, filed Apr. 14, 2004, Issued USP Expired.
U.S. Appl. No. 11/149,278, filed Jun. 10, 2005, now U.S. Pat. No. 7,672,886.
U.S. Appl. No. 11/641,046, filed Dec. 19, 2006, now U.S. Pat. No. 8,150,766.
U.S. Appl. No. 11/689,247, filed Mar. 21, 2007, now U.S. Pat. No. 7,752,107.
U.S. Appl. No. 11/767,827, filed Jun. 25, 2007, now U.S. Pat. No. 7,668,771.
U.S. Appl. No. 11/767,837, filed Jun. 25, 2007, now U.S. Pat. No. 7,680,716.
U.S. Appl. No. 11/767,846, filed Jun. 25, 2007, now U.S. Pat. No. 7,672,901.
U.S. Appl. No. 11/767,856, filed Jun. 25, 2007, now U.S. Pat. No. 7,672,902.
U.S. Appl. No. 11/840,052, filed Aug. 16, 2007, Issued USP Expired.
U.S. Appl. No. 11/840,060, filed Aug. 16, 2007, Issued USP Expired.
U.S. Appl. No. 11/840,064, filed Aug. 16, 2007, Abandoned.
U.S. Appl. No. 11/932,762, filed Oct. 31, 2007, Issued USP Expired.
U.S. Appl. No. 12/025,402, filed Feb. 4, 2008, now U.S. Pat. No. 8,380,621Granted.
U.S. Appl. No. 12/271,705, filed Nov. 14, 2008, Issued USP Expired.
U.S. Appl. No. 12/340,026, filed Dec. 19, 2008, now U.S. Pat. No. 8,032,456.
U.S. Appl. No. 12/385,522, filed Apr. 10, 2009, Issued USP Expired.
U.S. Appl. No. 12/408,507, filed Mar. 20, 2009, Issued USP Expired.
U.S. Appl. No. 12/408,511, filed Mar. 20, 2009, Issued USP Expired.
U.S. Appl. No. 12/408,523, filed Mar. 20, 2009, Issued USP Expired.
U.S. Appl. No. 12/453,387, filed May 8, 2009, Issued USP Expired.
U.S. Appl. No. 12/453,388, filed May 8, 2009, Issued USP Expired.
U.S. Appl. No. 12/453,389, filed May 8, 2009, Issued USP Expired.
U.S. Appl. No. 12/453,390, filed May 8, 2009, Issued USP Expired.
U.S. Appl. No. 12/622,979, filed Nov. 20, 2009, Issued USP Expired.
U.S. Appl. No. 12/638,544, filed Dec. 15, 2009, now U.S. Pat. No. 8,781,931.
U.S. Appl. No. 12/684,071, filed Jan. 7, 2010, Issued USP Expired.
U.S. Appl. No. 12/686,797, filed Jan. 13, 2010, now U.S. Pat. No. 8,019,668.
U.S. Appl. No. 12/794,448, filed Jun. 4, 2010, to B Closed.
U.S. Appl. No. 12/794,545, filed Jun. 4, 2010, now U.S. Pat. No. 8,311,939.
U.S. Appl. No. 12/816,092, filed Jun. 15, 2010, now U.S. Pat. No. 8,352,342.
U.S. Appl. No. 12/829,961, filed Jul. 2, 2010, now U.S. Pat. No. 7,996,308.
U.S. Appl. No. 12/953,221, filed Nov. 23, 2010, now U.S. Pat. No. 8,370,236.
U.S. Appl. No. 12/974,974, filed Dec. 21, 2010, Issued USP Expired.
U.S. Appl. No. 13/032,456, filed Feb. 22, 2011, now U.S. Pat. No. 8,458,089.
U.S. Appl. No. 13/032,467, filed Feb. 22, 2011, now U.S. Pat. No. 8,589,289.
U.S. Appl. No. 13/052,696, filed Mar. 21, 2011, Issued USP Expired.
U.S. Appl. No. 13/181,101, filed Jul. 12, 2011, now U.S. Pat. No. 8,239,321.
U.S. Appl. No. 13/181,394, filed Jul. 12, 2011, Issued USP Expired.
U.S. Appl. No. 13/228,031 filed Sept. 8, 2011, now U.S. Pat. No. 8,452,702.
U.S. Appl. No. 13/237,699, filed Sep. 20, 2011, now U.S. Pat. No. 8,583,545.
U.S. Appl. No. 13/248,647, filed Sep. 29, 2011, now U.S. Pat. No. 8,359,267.
U.S. Appl. No. 13/529,540, filed Jun. 21, 2012, now U.S. Pat. No. 8,386,382.
U.S. Appl. No. 13/558,153, filed Jul. 25, 2012, Abandoned.
U.S. Appl. No. 13/562,961, filed Jul. 31, 2012, Issued USP Expired.
U.S. Appl. No. 13/591,793, filed Aug. 22, 2012, Issued USP Expired.
U.S. Appl. No. 13/591,818, filed Aug. 22, 2012, Issued USP Expired.
U.S. Appl. No. 13/650,927, filed Oct. 12, 2012, now U.S. Pat. No. 8,655,689.
U.S. Appl. No. 13/651,932, filed Oct. 15, 2012, now U.S. Pat. No. 8,612,324.
U.S. Appl. No. 13/710,999, filed Dec. 11, 2012, Abandoned.
U.S. Appl. No. 13/715,370, filed Dec. 14, 2012, now U.S. Pat. No. 8,719,157.
U.S. Appl. No. 13/733,645, filed Jan. 3, 2013, to B Closed.
U.S. Appl. No. 13/735,631, filed Jan. 7, 2013, now U.S. Pat. No. 8,521,569.
U.S. Appl. No. 13/736,515, filed Jan. 8, 2013, to B Closed.
U.S. Appl. No. 13/759,434, filed Feb. 5, 2013, now U.S. Pat. No. 8,571,960.
U.S. Appl. No. 13/801,501, filed Mar. 13, 2013, Issued USP Expired.
U.S. Appl. No. 13/801,874, filed Mar. 13, 2013, now U.S. Pat. No. 9,430,798.
U.S. Appl. No. 13/828,468, filed Mar. 14, 2013, Abandoned.
U.S. Appl. No. 13/828,929, filed Mar. 14, 2013, Abandoned.
U.S. Appl. No. 13/829,309, filed Mar. 14, 2013, Abandoned.
U.S. Appl. No. 13/829,747, filed Mar. 14, 2013, Abandoned.
U.S. Appl. No. 13/829,974, filed Mar. 14, 2013, Abandoned.

(56) References Cited

OTHER PUBLICATIONS

U.S. Appl. No. 13/830,143, filed Mar. 14, 2013, Abandoned.
U.S. Appl. No. 13/839,890, filed Mar. 15, 2013, now U.S. Pat. No. 8,712,911.
U.S. Appl. No. 13/840,685, filed Mar. 15, 2013, Abandoned.
U.S. Appl. No. 13/841,778, filed Mar. 15, 2013, now U.S. Pat. No. 9,811,811.
U.S. Appl. No. 13/842,360, filed Mar. 15, 2013, now U.S. Pat. No. 8,606,676.
U.S. Appl. No. 13/842,630, filed Mar. 15, 2013, now U.S. Pat. No. 8,719,062.
U.S. Appl. No. 14/074,219, filed Nov. 7, 2013, Abandoned.
U.S. Appl. No. 14/179,096, filed Feb. 12, 2014, Abandoned.
U.S. Appl. No. 14/268,479, filed May 2, 2014, now U.S. Pat. No. 10,068,294.
U.S. Appl. No. 14/933,580, filed Nov. 5, 2015, now U.S. Pat. No. 9,374,370.
U.S. Appl. No. 14/933,689, filed Nov. 5, 2015, Abandoned.
U.S. Appl. No. 14/933,703, filed Nov. 5, 2015, now U.S. Pat. No. 9,805,344.
U.S. Appl. No. 15/146,645, filed May 4, 2016, now U.S. Pat. No. 9,569,773.
U.S. Appl. No. 15/154,590, filed May 13, 2016, now U.S. Pat. No. 9,483,762.
U.S. Appl. No. 15/241,959, filed Aug. 19, 2016, now U.S. Pat. No. 9,607,335.
U.S. Appl. No. 15/251,091, filed Aug. 30, 2016, now U.S. Pat. No. 10,134,035.
U.S. Appl. No. 15/251,108, filed Aug. 30, 2016, now U.S. Pat. No. 10,623,182.
U.S. Appl. No. 15/412,771, filed Jan. 23, 2017, now U.S. Pat. No. 10,552,910.
U.S. Appl. No. 15/602,916, filed May 23, 2017, now U.S. Pat. No. 9,946,997.
U.S. Appl. No. 15/698,227 filed Sep. 7, 2017, now U.S. Pat. No. 9,904,914.
U.S. Appl. No. 15/789,051, filed Oct. 20, 2017, now U.S. Pat. No. 9,965,750.
U.S. Appl. No. 16/227,993, filed Dec. 20, 2018, now U.S. Pat. No. 10,832,317.
U.S. Appl. No. 16/715,944, filed Dec. 16, 2019, now U.S. Pat. No. 11,367,138.
U.S. Appl. No. 17/104,172, filed Nov. 25, 2020, now U.S. Pat. No. 11,610,260.
U.S. Appl. No. 17/534,546, filed Nov. 24, 2021, Allowed—Notice of Allowance Mailed Apr. 19, 2024.

* cited by examiner

FIG. 7A

Account Management

| Source Accounts (702) | Destination Accounts (704) |

- Broker-Dealer 1 Account 706-1
- Broker-Dealer 1 Account 706-2
- Broker-Dealer 2 Account 706-3
- Source Institution Acct 706-N 710 — ✚ Add Account

FIG. 7B

Account Management

| Source Accounts (702) | Destination Accounts (704) |

Enter Source Institution: [ ] 720

Enter Account Number: [ ] 722

Enter Account Credentials:
Username: [ ] 724
Password: [ ] 726

728 [Submit] [Cancel] 730

FIG. 7C

Account Management

| Source Accounts (702') | Destination Accounts (704') |

- Bank 1 Account 732-1
- Mutual Fund 1 Account 732-2
- Mutual Fund 2 Account 732-3
- Dest. Institution Acct 732-M 710' — ✚ Add Account

FIG. 7D

Account Management

| Source Accounts (702') | Destination Accounts (704') |

Enter Destination Institution: [ ] 720'

Enter Account Number: [ ] 722'

Enter Account Credentials:
Username: [ ] 724
Password: [ ] 726'

728' [Submit] [Cancel] 730'

800

| | | | | |
|---|---|---|---|---|
| Home 802 | Source Accounts 804 | Destination Accounts 806 | Transaction Settings 808 | TMS Account 810 |

Your Transaction Management Account

Transaction History

| Date | From Account | To Account | Amount |
|---|---|---|---|
| May 16, 2014, 01:54:23 PM E.T. | Broker-Dealer 1 Acct. 822-1 | Bank 1 Acct. 824-1 | $3,788.90 |
| May 29, 2014, 10:16:02 AM E.T. | Broker-Dealer 1 Acct. 822-2 | Mutual Fund 2 Acct. 824-2 | $700 |
| Jul. 7, 2014, 04:42:12 PM E.T. | Source Inst. Acct. 822-3 | Destination Inst. Acct. 824-3 | $12,860.38 |
| Jul. 9, 2014, 03:37:49 PM E.T. | Destination Inst. Acct. 824-N | Source Inst. Acct. 822-M | $5,998.17 |

Your Transaction Management Account

| Home 802 | Source Accounts 804 | Destination Accounts 806 | Transaction Settings 808 | TMS Account 810 |
|---|---|---|---|---|

Add Source Account 832

Your Source Accounts:

Broker-Dealer 1 Account 822-1 — 836

Current Balance: $ 32,546.90    [View History]  [Edit Account] — 838

834

Broker-Dealer 1 Account 822-2 +

Broker-Dealer 2 Account 822-3 +

Source Institution Acct 822-N +

FIG. 8B

Your Transaction Management Account

| Home 802 | Source Accounts 804 | Destination Accounts 806 | Transaction Settings 808 | TMS Account 810 |

Source Accounts > New Source Account

Add New Source Account

Enter Source Institution: 842

Enter Account Number: 844

Enter Account Credentials:
Username: 846
Password: 848

Submit    Cancel

Your Transaction Management Account

| Home 802 | Source Accounts 804 | Destination Accounts 806 | Transaction Settings 808 | TMS Account 810 |

Source Accounts > Edit Broker-Dealer 1 Account 822-1

Edit Broker-Dealer 1 Account 822-1

Enter Source Institution: 852
Broker-Dealer 1

Account Number: 854
1004986106

Enter Account Credentials:
Username: jsmith11   856
Password: xxxxxxxxx  858

860 Save Changes     Cancel Changes 862

Delete Account 864

FIG. 8D

SYSTEMS, METHODS AND PROGRAM PRODUCTS FOR ALLOCATION TO MAXIMIZE INSURANCE OR MAXIMIZE INTEREST FOR CLIENT ACCOUNTS

CROSS-REFERENCE TO RELATED APPLICATIONS

This application is a Continuation of U.S. patent application Ser. No. 17/534,546, filed on Nov. 24, 2024, which claims the benefit of and priority to U.S. Provisional Patent Application No. 63/117,590, filed on Nov. 24, 2020, the contents of which are herein incorporated by reference in their entirety into the present application.

FIELD OF THE INVENTION

The field of the invention generally relates to various technological improvements in systems, methods, and program products used in cash management systems, such as, for example, cash sweep systems. In embodiments, the invention generally relates to technological mechanisms by which customers can exert control over computer-implemented deposits to optimize benefits offered by deposit accounts.

BACKGROUND OF THE INVENTION

Cash management systems manage liquidity, account balances, payments and other cash management functions for public entities, non-profit entities, municipalities, businesses, condominiums, homeowner's associations, housing cooperatives, individuals, and publicly traded entities, to name a few. For example, cash management systems may transfer funds directly from account holders to interest-bearing deposit accounts, money market mutual funds, ETFs (exchange traded funds), enhanced cash investments, ultra-short term bond investments, and CDs (certificates of deposit), to name a few, or between trading accounts, such as brokerage accounts, and interest-bearing deposit accounts, such as bank or other depository accounts and other cash management vehicles. Cash management systems often carry out cash management functions for insured accounts, such as, for example, FDIC-insured accounts, SIPC-insured account, NCUSIF-insured accounts and collateral insurance, to name a few. Such systems are implemented using computers specifically programmed to carry out deposit operations, including transfer and allocation operations.

A shortcoming of existing cash management systems is the lack of technological mechanisms by which customers can exert control over the computer-implemented deposit transactions to control the manner in which customer funds are stored in program banks. For example, interaction between a deposit sweep system and an account holder from a separate source institution proves to be difficult among existing deposit sweep systems, and a technological manner in which to obtain such direct interaction, and thus user control, is desirable. Often, if a user knew of which particular depository institution his or her funds are being held at, or are to be held at, at any given moment, a user may object to the use of particular depository institutions for a number of reasons, including lack of insurance, difficulty of access to funds, or personal preference, to name a few reasons. For example, some banks within a deposit sweep program may offer a higher interest rate compared to other banks in the program, and thus certain customers would prefer their funds to be swept into higher interest accounts even if such preference would result in minimization of insurance on those funds. Prior art deposit sweep systems lack technological mechanisms by which users can control the manner in which funds are swept or otherwise deposited into depository institutions, for example, to maximize insurance coverage or to maximize interest. Often users must wait for a monthly statement to arrive to determine how the funds have been deposited. Technological improvements over such prior art deposit systems are desired to inject customer control and/or timely notification into automated computer-implemented deposit sweep processes.

Another shortcoming of existing cash management systems is the lack of technological mechanisms by which such systems can control transfer of funds into depository accounts in a manner that optimizes customers' preferences. For example, even if conventional cash management systems did have a mechanism by which customers are able to set preferences, for example, to maximize interest or to maximize insurance (e.g., FDIC insurance, SIPC insurance, or NCUSIF insurance, to name a few), such systems are not technologically capable of controlling a large number of transactions over a large number of depository accounts in a manner that balances customers' preferences against one another to achieve a desirable result. For example, it is not always practicable to sweep funds from customers having a high-interest preference into all of the higher-interest accounts because then such accounts would be filled up quickly and would not be available to take on funds from customers that prefer maximum insurance coverage. Conversely, cap space must be kept in mind at high interest banks so that those banks are not filled up too quickly by funds from customers with a maximum insurance preference, thereby resulting in those banks becoming unavailable to costumers with a high-interest preference.

SUMMARY OF THE INVENTION

An object of the present invention to address one or more the above problems as outlined in the prior art.

The field of the invention generally relates to various technological improvements in systems, methods, and program products used in cash management systems. In embodiments, the invention further relates generally to new technological mechanisms to communicate with account holders so that such account holders can control the manner in which funds are held at depository institutions. In embodiments, the invention further relates generally to new technological mechanisms by which cash management systems may balance customer needs over a large number of depository institutions by allocating funds in a manner that takes advantage of those depository institutions that offer preferred services, such as a high interest rate, while preventing accounts at those depository institutions from being filled too quickly so that other services at those institutions, such as insurance, are no longer available.

In exemplary embodiments, a method of performing a transaction comprises: (A) receiving, at a transaction computer system comprising one or more computers, a transaction file, the transaction file comprising transaction information; (B) generating, by the transaction computer system, respective first machine readable instructions to render respective destination institution management graphical user interfaces each comprising respective first display data comprising an electronic transaction parameters input element configured to allow for input of transaction parameters associated with the respective allocation, the transaction parameters comprising a selection of the respective allocation to result in maximum interest or maximum insurance coverage; (C) providing, by the transaction computer system to a plurality of respective client devices each associated with a respective customer of a plurality of customers, the respective first computer-readable instructions causing each respective client device to activate a respective interface application to render the respective destination institution management graphical user interface on a respective display screen operatively connected to the respective client device; (D) receiving, at the transaction computer system from the respective client devices, respective transaction parameters comprising a selection of maximum interest or maximum insurance coverage via input through the electronic transaction parameters input element; (E) determining, by the transaction computer system based at least in part upon the transaction information and the transaction parameters, allocations of funds for a plurality of customers, the allocations comprising for each respective customer identifications of a plurality of respective destination depository institutions and respective amounts to allocate to each respective destination depository institution, the step of allocating comprising: (1) determining, by the transaction computer system, a maximum capacity of funds from customers selecting maximum interest allowed to be held at each of the plurality of depository institutions; (2) determining, by the transaction computer system, a maximum capacity of funds from customers selecting maximum insurance coverage allowed to be held at each of the plurality of depository institutions; (3) determining, by the transaction computer system, the allocations so that:

(a) a total amount of funds from customers selecting maximum interest to be allocated to each respective depository institution do not exceed the maximum capacity of funds from customers selecting maximum interest at the depository institution; (b) a total amount of funds from customers selecting maximum insurance coverage to be allocated to each respective depository institution do not exceed the maximum capacity of funds from customers selecting maximum insurance coverage at the depository institution; and (c) funds from customers selecting maximum interest are allocated to one or more respective depository institutions that have the highest interest rate among the plurality of depository institutions; and (F) executing, by the transaction computer system, the allocations of funds.

In exemplary embodiments, a method of performing a deposit sweep transaction comprises: (A) receiving, at a deposit sweep computer system comprising one or more computers, a deposit sweep file for a deposit sweep program, the deposit sweep file comprising transaction information; (B) generating, by the deposit sweep computer system, respective first machine readable instructions to render respective destination institution management graphical user interfaces each comprising respective first display data comprising an electronic transaction parameters input element configured to allow for input of transaction parameters associated with the respective allocation, the transaction parameters comprising a selection of the respective allocation to result in maximum interest or maximum insurance coverage; (C) providing, by the deposit sweep computer system to a plurality of respective client devices each associated with a respective customer of a plurality of customers, the respective first computer-readable instructions causing each respective client device to activate a respective interface application to render the respective destination institution management graphical user interface on a respective display screen operatively connected to the respective client device; (D) receiving, at the deposit sweep computer system from the respective client devices, respective transaction parameters comprising a selection of maximum interest or maximum insurance coverage via input through the electronic transaction parameters input element; (E) determining, by the deposit sweep computer system based at least in part upon the transaction information and the transaction parameters, allocations of funds for a plurality of customers, the allocations comprising for each respective customer identifications of a plurality of respective destination depository institutions and respective amounts to allocate to each respective destination depository institution, the step of allocating comprising: (1) determining, by the deposit sweep computer system, a maximum capacity of funds from customers selecting maximum interest allowed to be held at each of the plurality of depository institutions; (2) determining, by the deposit sweep computer system, a maximum capacity of funds from customers selecting maximum insurance coverage allowed to be held at each of the plurality of depository institutions; (3) determining, by the deposit sweep computer system, the allocations so that: (a) a total amount of funds from customers selecting maximum interest to be allocated to each respective depository institution do not exceed the maximum capacity of funds from customers selecting maximum interest at the depository institution; (b) a total amount of funds from customers selecting maximum insurance coverage to be allocated to each respective depository institution do not exceed the maximum capacity of funds from customers selecting maximum insurance coverage at the depository institution; and (c) funds from customers selecting maximum interest are allocated to one or more respective depository institutions that have the highest interest rate among the plurality of depository institutions; and (F) executing, by the deposit sweep computer system, the allocations of funds.

In exemplary embodiments, step (3)(a) comprises determining, by the deposit sweep computer system, whether a balance of funds from customers selecting maximum interest at each respective depository institution exceeds the maximum capacity of funds from customers selecting maximum interest at the depository institution.

In exemplary embodiments, upon the condition that it is determined a balance of funds from customers selecting maximum interest at a respective depository institution exceeds the maximum capacity of funds from customers selecting maximum interest at the depository institution, the depository institution is determined to be not available for allocation of funds.

In exemplary embodiments, upon the condition that it is determined a balance of funds from customers selecting maximum interest at a respective depository institution does not exceed the maximum capacity of funds from customers selecting maximum interest at the depository institution, the depository institution is determined to be available for allocation of funds.

In exemplary embodiments, the method further comprises: determining, by the deposit sweep computer system, an interest rate for each depository institution determined to be available for allocation; and ranking, by the deposit sweep computer system, the depository institutions determined to be available based on interest rate.

In exemplary embodiments, step (3)(c) comprises allocating, by the deposit sweep computer system, funds from customers selecting maximum interest to the depository institutions determined to be available for allocation based on the interest rate ranking so that, for each customer, funds are allocated to the respective available depository institutions in the order of their ranking.

In exemplary embodiments, the step (F) of executing the allocations of funds comprises updating an electronic ledger.

In exemplary embodiments, the transaction information comprises debits, credits, and/or balance information associated with a client account, and/or net credits, net debits information associated with a client account.

In exemplary embodiments, the respective destination institution management graphical user interfaces each comprise a transfer amount input element by which a user may input a maximum amount of funds permitted to be allocated to the at least one of the plurality of respective different destination depository institutions.

In exemplary embodiments, the method further comprises: (G) storing, by the deposit sweep computer system in one or more databases comprising non-transitory computer-readable memory, an indication of each respective selection of maximum interest or maximum insurance coverage, the indication comprising an identification of the respective customer that corresponds to the each respective selection.

In embodiments, the maximum capacity of funds from customers selecting maximum insurance coverage allowed to be held at each of the plurality of depository institutions is based at least in part upon a maximum insurable amount for FDIC insurance.

In embodiments, the transaction information comprises ACH instructions.

In embodiments, a system for performing transactions comprises one or more processors and non-transitory computer-readable memory having stored thereon instructions that when executed cause the one or more processors to perform the steps of: (A) receiving, at a transaction computer system comprising one or more computers, a transaction file, the transaction file comprising transaction information; (B) generating, by the transaction computer system, respective first machine readable instructions to render respective destination institution management graphical user interfaces each comprising respective first display data comprising an electronic transaction parameters input element configured to allow for input of transaction parameters associated with the respective allocation, the transaction parameters comprising a selection of the respective allocation to result in maximum interest or maximum insurance coverage; (C) providing, by the transaction computer system to a plurality of respective client devices each associated with a respective customer of a plurality of customers, the respective first computer-readable instructions causing each respective client device to activate a respective interface application to render the respective destination institution management graphical user interface on a respective display screen operatively connected to the respective client device; (D) receiving, at the transaction computer system from the respective client devices, respective transaction parameters comprising a selection of maximum interest or maximum insurance coverage via input through the electronic transaction parameters input element; (E) determining, by the transaction computer system based at least in part upon the transaction information and the transaction parameters, allocations of funds for a plurality of customers, the allocations comprising for each respective customer identifications of a plurality of respective destination depository institutions and respective amounts to allocate to each respective destination depository institution, the step of allocating comprising: (1) determining, by the transaction computer system, a maximum capacity of funds from customers selecting maximum interest allowed to be held at each of the plurality of depository institutions; (2) determining, by the transaction computer system, a maximum capacity of funds from customers selecting maximum insurance coverage allowed to be held at each of the plurality of depository institutions; (3) determining, by the transaction computer system, the allocations so that: (a) a total amount of funds from customers selecting maximum interest to be allocated to each respective depository institution do not exceed the maximum capacity of funds from customers selecting maximum interest at the depository institution; (b) a total amount of funds from customers selecting maximum insurance coverage to be allocated to each respective depository institution do not exceed the maximum capacity of funds from customers selecting maximum insurance coverage at the depository institution; and (c) funds from customers selecting maximum interest are allocated to one or more respective depository institutions that have the highest interest rate among the plurality of depository institutions; and (F) executing, by the transaction computer system, the allocations of funds.

In embodiments, a system for performing deposit sweep transactions comprises one or more processors and non-transitory computer-readable memory having stored thereon instructions that when executed cause the one or more processors to perform the steps of: (A) obtaining, at a deposit sweep computer system comprising one or more computers, a deposit sweep file for a deposit sweep program, the deposit sweep file comprising transaction information; (B) generating, by the deposit sweep computer system, respective first machine readable instructions to render respective destination institution management graphical user interfaces each comprising respective first display data comprising an electronic transaction parameters input element configured to allow for input of transaction parameters associated with the respective allocation, the transaction parameters comprising a selection of the respective allocation to result in maximum interest or maximum insurance coverage; (C) providing, by the deposit sweep computer system to a plurality of respective client devices each associated with a respective customer of a plurality of customers, the respective first computer-readable instructions causing each respective client device to activate a respective interface application to render the respective destination institution management graphical user interface on a respective display screen operatively connected to the respective client device; (D) receiving, at the deposit sweep computer system from the respective client devices, respective transaction parameters comprising a selection of maximum interest or maximum insurance coverage via input through the electronic transaction parameters input element; (E) determining, by the deposit sweep computer system based at least in part upon the transaction information and the transaction parameters, allocations of funds for a plurality of customers, the allocations comprising for each respective customer identifications of a plurality of respective destination depository institutions and respective amounts to allocate to each respective destination depository institution, the step of allocating comprising: (1) determining, by the deposit sweep computer system, a maximum capacity of funds from customers selecting maximum interest allowed to be held at each of the plurality of depository institutions; (2) determining, by the deposit sweep computer system, a maximum capacity of funds from customers selecting maximum insurance coverage allowed to be held at each of the plurality of depository institutions; (3) determining, by the deposit sweep computer system, the allocations so that: (a) a total amount of funds from customers selecting maximum interest to be allocated to each respective depository institution do not exceed the maximum capacity of funds from customers selecting maximum interest at the depository institution; (b) a total amount of funds from customers selecting maximum insurance coverage to be allocated to each respective depository institution do not exceed the maximum capacity of funds from customers selecting maximum insurance coverage at the depository institution; and (c) funds from customers selecting maximum interest are allocated to one or more respective depository institutions that have the highest interest rate among the plurality of depository institutions; and (F) executing, by the deposit sweep computer system, the allocations of funds.

BRIEF DESCRIPTION OF THE DRAWINGS

The above and related objects, features, and advantages of the present invention, will be more fully understood by reference to the following detailed description of the exemplary embodiments of the present invention, when taken in conjunction with the following exemplary figures, wherein:

FIG. 7A is a schematic diagram of embodiments of a client interface screen for accessing client source accounts in accordance with exemplary embodiments of the present invention.

FIG. 7B is a schematic diagram of embodiments of a client interface screen for obtaining client authentication data for accessing client source accounts in accordance with exemplary embodiments of the present invention.

FIG. 7C is a schematic diagram of embodiments of a client interface screen for accessing client destination accounts in accordance with exemplary embodiments of the present invention.

FIG. 7D is a schematic diagram of embodiments of a client interface screen for obtaining client authentication data for accessing client destination accounts in accordance with exemplary embodiments of the present invention.

FIG. 8A is a schematic diagram of embodiments of a client interface screen for a client home page that lists recent transaction history for client source accounts and facilitates access to client source accounts and destination accounts and transaction rules and the client TMS account in accordance with exemplary embodiments of the present invention.

FIG. 8B is a schematic diagram of embodiments of a client interface screen for viewing a listing of the client's source accounts, with an Add Source Account button, a View Account button, and an Edit Account button in accordance with exemplary embodiments of the present invention.

FIG. 8C is a schematic diagram of embodiments of a client interface screen that may be presented when the Add Source Account button is activated for adding a new client source account in accordance with exemplary embodiments of the present invention.

FIG. 8D is a schematic diagram of embodiments of a client interface screen that may be presented when the Edit Account button is activated for viewing and editing the data for a particular one of the client's source accounts in accordance with exemplary embodiments of the present invention.

DETAILED DESCRIPTION OF EMBODIMENTS

Figure 1A:
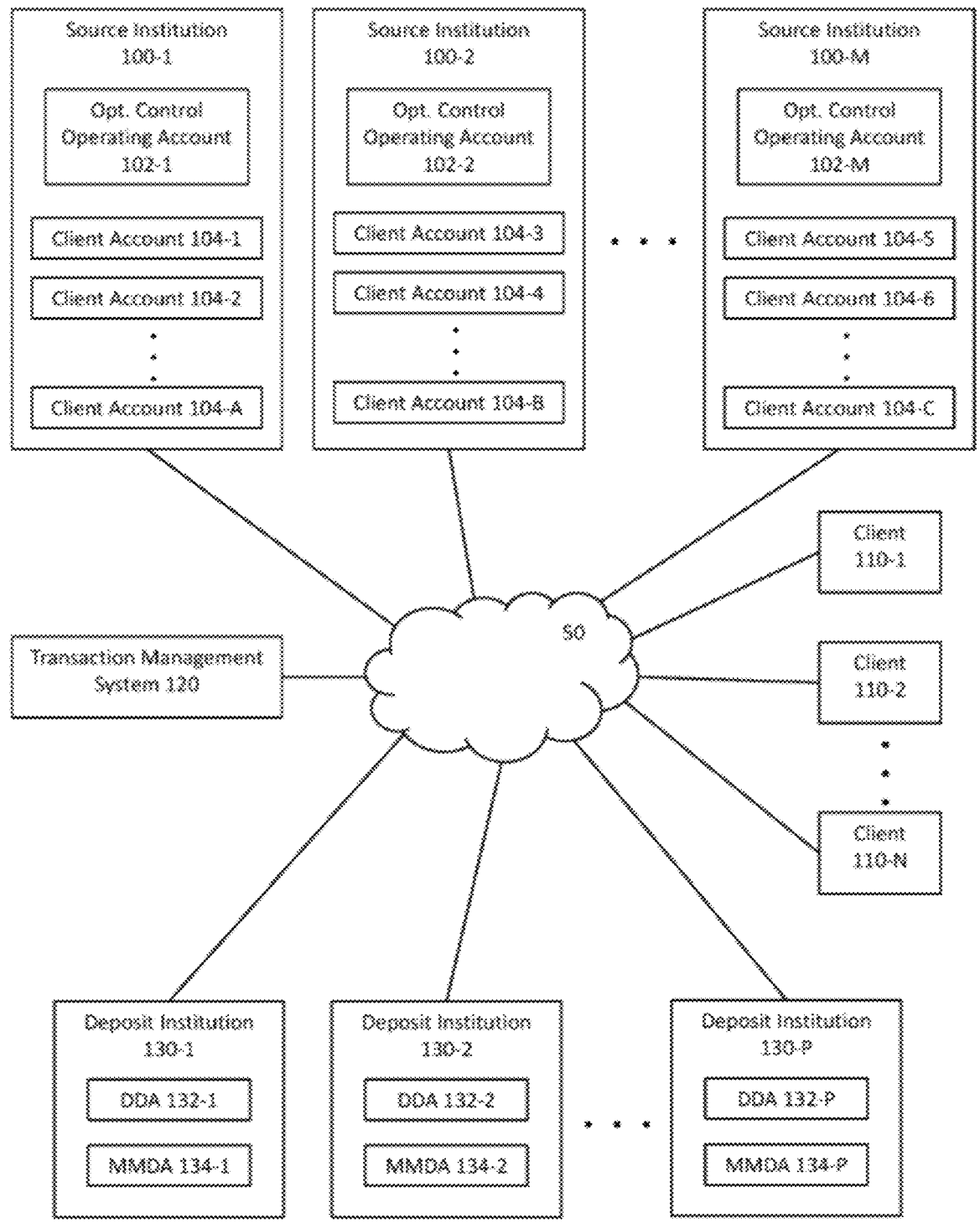
FIG. 1A is a schematic block diagram representing institutions, clients and a transaction management system in accordance with exemplary embodiments of the present invention.

The present invention generally relates to various technological improvements in systems, methods and program products for cash management. More specifically, in exemplary embodiments, cash management systems of the present invention manage liquidity, account balances, payments and other cash management functions for public entities, non-profit entities, municipalities, businesses, condominiums, homeowner's associations, housing cooperatives, individuals, and publicly traded entities, to name a few. For example, cash management systems may transfer funds directly from account holders to interest-bearing deposit accounts, money market mutual funds, ETFs (exchange traded funds), enhanced cash investments, ultra-short term bond investments, and CDs (certificates of deposit), to name a few, or between trading accounts, such as brokerage accounts, and interest-bearing deposit accounts, such as bank or other depository accounts and other cash management vehicles. For example, in conventional deposit sweep systems, a technological problem exists in that such systems are not able to allocate funds across program banks in a manner that meets differing customer preferences. For example, some customers might prefer maximum interest, while other customers might prefer maximum insurance coverage. Conventional deposit sweep system are not able to satisfy these preferences because they are not configured to take into account the different interest rates at each program bank among a potentially large number of program banks and use that information, in addition to other information such as bank balance caps, to determine how best to allocate funds to satisfy customer preferences. In embodiments, the invention provides a technological solution to this technological problem by enabling cash management systems to allocate funds across program banks in a manner that meets customers' preferences that may differ from customer to customer. For example, in embodiments, the invention may take into account interest rates and deposit caps at each depository bank to ensure that enough deposit space is available across the depository banks to meet customer preferences for either maximum interest or maximum insurance coverage.

The technological improvements provided by exemplary embodiments of the present invention may be applicable to many types of cash management systems, such as those described in U.S. Pat. Nos. 8,150,766; 8,359,267; 8,719,157; 8,712,911; 8,234,188; 7,895,099; 7,904,372; 8,090,651; 8,301,560; 9,946,997; and 8,660,920, to name a few, the contents of which are incorporated herein by reference in their entirety.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Referring to FIG. 1A, there is shown a schematic block diagram representing institutions, clients and a transaction management system. The individual clients are represented by the client blocks 110-1, 110-2, . . . 110-N. The transaction management system (TMS) for performing the operations necessary to the automatic fund transfer programs of clearing firm and/or source institution and/or destination institution computers is represented by the block 120. The TMS 120 may be a deposit sweep computer system. The TMS 120 may be configured to access source and/or destination account information, e.g., using user credentials. In embodiments, a plurality of client accounts 104 may be associated with a single client 110.

Source institutions, e.g., various broker dealers which may originate buy and sell orders, are represented by the blocks 100-1, 100-2, . . . 100-M. Each of the source institutions is shown with a control operating account 102, which, in embodiments, may be an optional account. Each of the source institutions 100 is also shown with multiple different client accounts 104, e.g., for the client suffices 1, 2, . . . N. Source institutions may be banks, credit unions, other types of depository institutions, registered investment advisors, broker dealers, asset managers, trust companies, retirement programs, other financial institutions or intermediaries, to name a few. Typically, the source institutions are the institutions that interact with the clients that are placing or authorizing the respective clients' funds to go into and be managed by the system. Note that a source institution can be a clearing institution for one or more other source institutions or an intermediary for other source institutions. Source institutions can hold source accounts relating to securities and/or bonds, including trading thereof.

Depository institutions, e.g., destination institutions, are represented by the blocks 130-1, 130-2, . . . 130-P. Depository institutions can be any institution that is authorized to accept deposits and issue certificates of deposit. This would include state and national banks, state and federal savings banks, savings and loan associations, credit unions, and probably some industrial loan companies, depending on current law. Most but not necessarily all, would have government backed-insurance, such as Federal Deposit Insurance Corporation (FDIC) insurance, Securities Investor Protection Corporation (SIPC), insurance for credit unions (NCUSIF), or state insurance. Depository institutions can include banks holding bank accounts or institutions providing time deposit instruments, negotiable order of withdrawal (NOW) accounts, money market deposit accounts (MMDAs), aggregated MMDAs, demand deposit accounts (DDAs), aggregated DDAs, and/or certificates of deposit (CDs), to name a few. Each of the depository institutions is shown with an aggregated demand deposit account 132 holding the funds of multiple clients, and an aggregated money market deposit account 134 holding the funds of multiple clients. However, in embodiments, there may be a separate DDA and MMDA for each of multiple clients. In embodiments, a source institution may also be a depository institution and vice versa. Depository institutions may hold omnibus accounts and/or individual customer accounts. In embodiments, the source and deposit functions may be maintained in separate institutions. The entities shown may be associated with one or more computer systems and/or user electronic devices, as described herein with respect to FIG. 1C.

Depending on the particular deposit sweep transaction being executed, a source institution or a destination institution may be trading institution, such as a broker-dealer or brokerage institution, or a depository institution, such as a bank or other institution providing interest-bearing accounts (insured or not insured) or other investment accounts (e.g., money fund, exchange traded fund, etc.). Other destination institutions can include, by way of example, institutions holding, managing, and/or providing cash management vehicles and/or cash management accounts, such as DDAs, MMDAs, NOW accounts, stable value funds, credit interest programs, to name a few. Thus, a sweep transaction may involve an allocation, transfer, or other flow of funds from a source institution to a destination institution or vice versa from the destination institution to the source institution. In embodiments, a sweep transaction may involve an allocation, transfer, or other flow of funds from a first destination institution to a second destination institution.

While certain systems, methods, and program products described herein refer to embodiments involving deposit sweep transactions, it will be understood by one of skill in the art that such systems, methods, and program products may apply to other sweep transactions, such as cash sweep transactions, which may include money fund sweeps, stable value fund sweeps, capital investment plan (CIP) sweeps, or sweeps from or to any of the institutions holding cash management vehicles and/or cash management accounts as described herein, and the present invention extends to such embodiments.

Figure 1B:
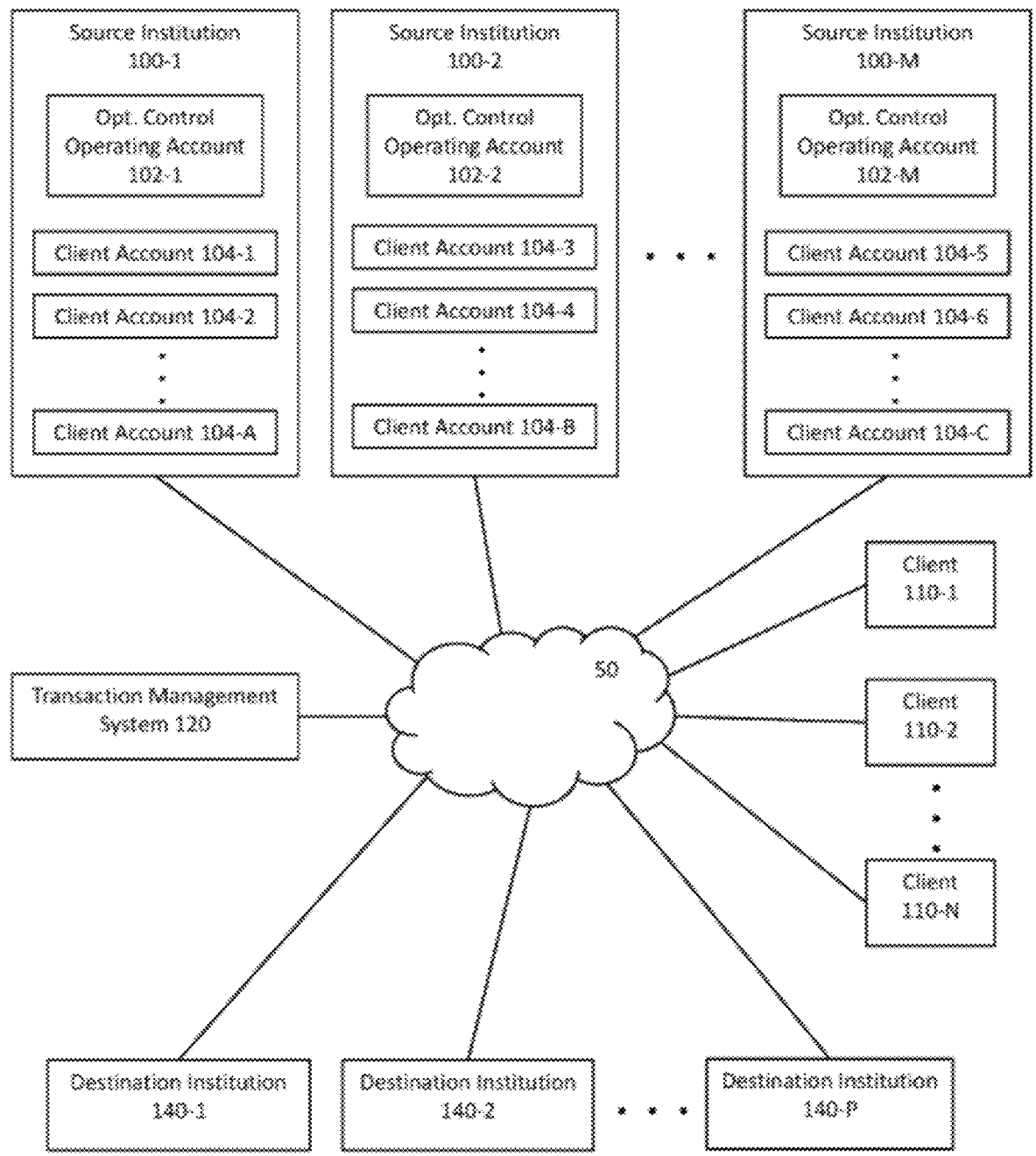
FIG. 1B is similar to FIG. 1A, except that the destination institutions 140 have been substituted for the depository institutions in accordance with exemplary embodiments of the present invention.

FIG. 1B is similar to FIG. 1A, except that the destination institutions 140 have been substituted for the deposit institutions. The destination institutions may include non-FDIC insured investment vehicles, such as money market mutual funds, other kinds of mutual funds, exchange traded funds (ETF), exchange traded notes (ETN), stable value funds, index funds, treasury bonds, stocks, bonds, notes, to name a few. Destination institutions can include institutions holding, managing, and/or providing cash management vehicles and/or cash management accounts, such as DDAs, MMDAs, NOW accounts, credit interest programs, to name a few. In preferred embodiments, investment vehicles should be liquid or substantially liquid, to name a few.

Figure 1C:
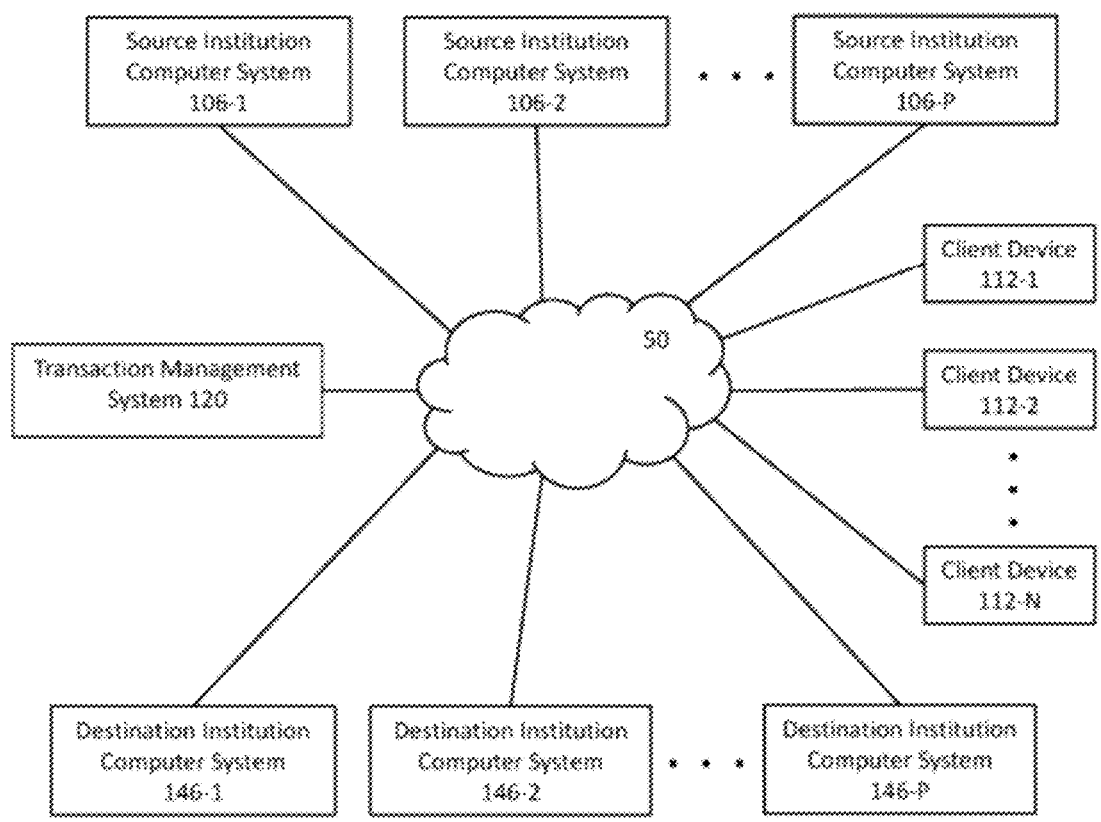
FIG. 1C is a schematic block diagram representing the computer systems for the institutions, clients and the transaction management system connecting via one or more communications networks in accordance with exemplary embodiments of the present invention.

FIG. 1C is a schematic block diagram representing the computer systems and/or user electronic devices for the institutions, clients and the transaction management system connecting via one or more electronic communications networks 50. An electronic communications network 50 may be a data network, such as the Internet, a wide area network, and/or a local area network, to name a few. The computer systems for the source institutions are represented by the blocks 106. The computer systems for the users are represented by the blocks 112. The computer systems for the destination institutions are represented by the blocks 146. The various computer systems may comprise one or more computers or user electronic devices. The computers and user electronic devices may comprise one or more processors, non-transitory computer-readable memory, communications portals, input devices (e.g., keyboard, mouse, touch screen, microphone, camera, scanner, to name a few) and output devices (e.g., display devices, speakers, to name a few). Communications portals can comprise hardware and/or software for transmitting, receiving, retrieving, and/or otherwise obtaining data, such as data packets or streams, according to one or more protocols, using wired and/or wireless communications. In embodiments, communications portals can include one or more communications chipsets, such as a GSM chipset, CDMA chipset, LTE chipset, Wi-Fi chipset, Bluetooth chipset, to name a few, and/or combinations thereof. Wired connections may be adapted for use with cable, telephone, fiber (such as Hybrid Fiber Coaxial), xDSL, to name a few, and wired connections may use coaxial cable, fiber, copper wire (such as twisted pair copper wire), and/or combinations thereof, to name a few. Wired connections may be provided through telephone ports, Ethernet ports, USB ports, and/or other data ports. Wireless connections may include cellular or cellular data connections adapted for use with one or more cellular communications protocols (e.g., digital cellular, PCS, CDPD, GPRS, EDGE, CDMA2000, 1×RTT, Ev-DO, HSPA, UMTS, 3G, 4G, 5G, and/or LTE, to name a few), and/or may include other wireless connections for use with wireless protocols such as Bluetooth, Bluetooth Low Energy, Wi-Fi, radio, satellite, and/or infrared connections, to name a few. Hardware for such communications portals can further include Ethernet interfaces (e.g., supporting a TCP/IP stack), X.25 interfaces, T1 interfaces, and/or antennas, to name a few.

Figure 2:
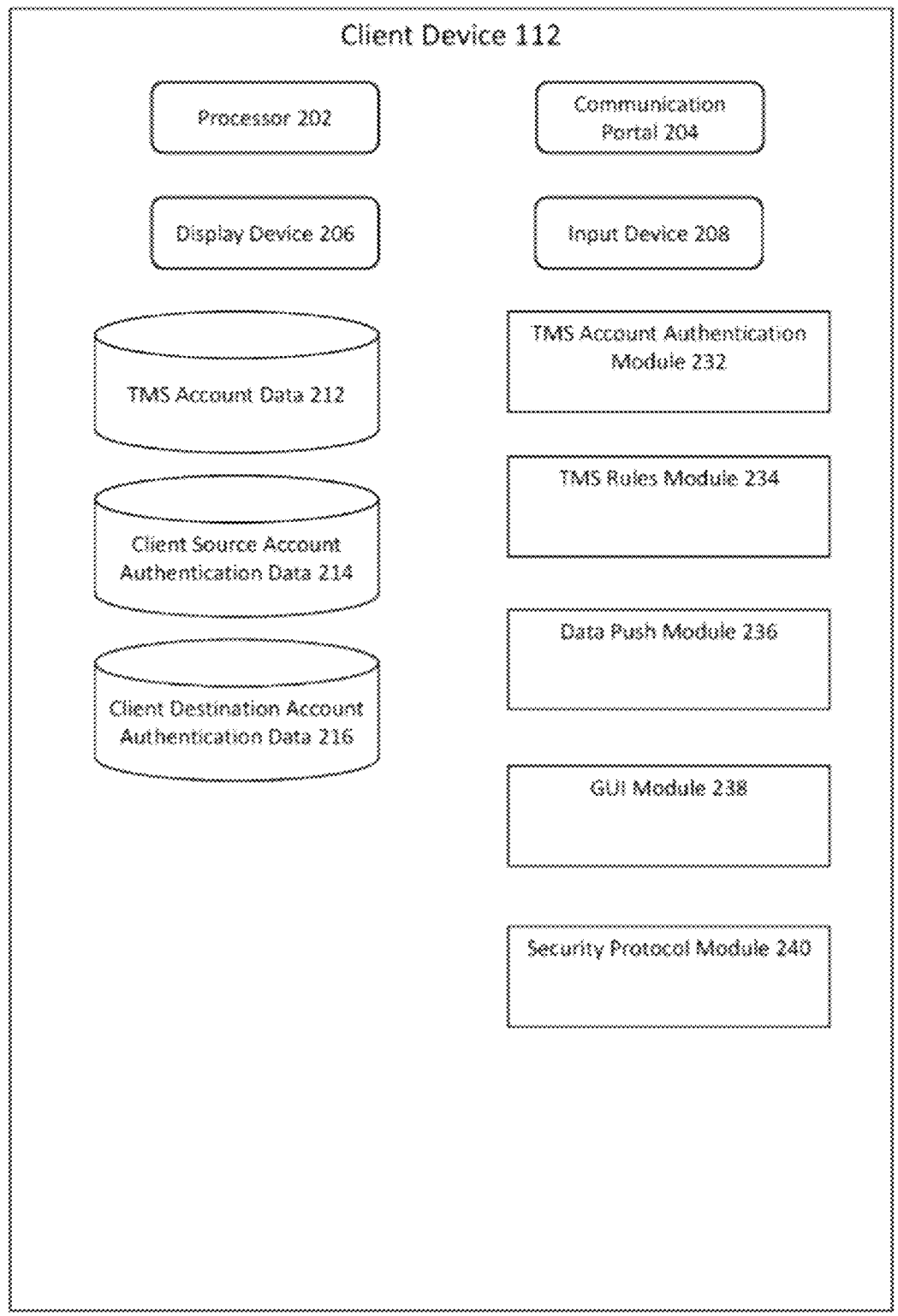
FIG. 2 is schematic block diagram representing components of a client device in accordance with exemplary embodiments of the present invention.

Referring to FIG. 2, there is shown a schematic block diagram representing components of a client device 112. In embodiments, the client device 112 may comprise a user electronic device, such as a computer, laptop computer, tablet computer, mobile phone, smart phone, PDA, web-enabled television, and/or wearable electronic device (e.g., watch and/or glasses), to name a few. In embodiments, the client device may comprise one or more processors 202, communications portals 204, display devices 206, e.g., an LCD display, and input devices 208, e.g., a keyboard, mouse, touch screen, etc. The client device 112 can further include non-transitory computer-readable memory. Data may be stored in one or more database stored on the computer-readable memory, and particular software modules may be stored on the computer-readable memory. Such modules may run or be configured to run on the one or more processors 202. Exemplary data and modules are described herein.

In embodiments, the client device 112 may comprise electronic data storage 212 for TMS account data. The TMS account data may comprise in embodiments, the user's information for the transaction management system 120, e.g., login credentials (username and/or password), contact information (email address, phone number, address), billing information (credit card information, bank account information), transaction rules, and/or notification settings, to name a few.

In embodiments, the client device 112 may comprise electronic data storage 214 for client source account authentication data. In embodiments, the client source account authentication data may comprise the user's information for accessing each account at the one or more source institutions of the client (e.g., account number, authentication information such as account login credentials, multi-factor authentication data, security questions, etc.). In embodiments, the client source account authentication data may also include information identifying the various source institutions. This may or may not be present on the client device. For example, in embodiments, such data may be stored at the TMS 120 instead of at the client device 112.

In embodiments, the client device 112 may comprise electronic data storage 216 for client destination account authentication data. In embodiments, the client destination account authentication data may comprise the user's information (e.g., login credentials, multi-factor authentication data, security questions) for accessing each account at one or more of the destination institutions or funds, or other destination institutions. The client destination account authentication data may also include information identifying the various destination accounts (destination institution or fund+account identifier, e.g. account number). This may or may not be present on the client device.

In embodiments, the client device 112 may store other data, such as transaction logs and/or account balance data for one or more accounts. In embodiments, the client device 112 may store account balance retrieval history data, which may identify one or more times associated with retrievals of account balance information.

In embodiments, the client device 112 may comprise a TMS Account Authentication Module 232 for logging into the user's TMS account (e.g., to manage settings, view history of fund transactions, to add accounts, etc.). In embodiments, this Module 232 may be configured to access the TMS Account Data 212 and the requisite authentication data to log in to the TMS 120. Screens for managing settings, viewing a history of transactions, etc., are shown and will be discussed in relation to FIGS. 8A-8F.

In embodiments, the client device 112 may comprise a TMS Rules electronic module 234 for creating and/or managing transaction rules (e.g., source/deposit account monitoring frequency, accounts to monitor, limits for cash transactions, account minimums and account maximums, to name a few). In embodiments, default electronic rules may be provided by the TMS, which may be stored at the client device 112 and/or stored at the TMS 120.

In embodiments, the client device 112 may comprise a data push module 236 configured to be triggered by an event, e.g., the receipt at the client device 112, via the one or more electronic networks 50 and the communications portal 204, of new balance data for accounts held in the client's source institutions 100, and/or new balance data for accounts held in the destination institutions 130, and/or may be triggered by the transmission of transaction data, e.g., buy and sell orders, or the receipt of this transaction data by the client device. In embodiments, this push module may be implemented using WebSocket technology, Java applets or other plug-ins, to name a few.

The client device 112 may include a graphical user interface (GUI) module 238. A GUI module 238 may receive display data from one or more remote sources (e.g., computer servers) and/or may receive machine-readable instructions for generating a particular graphical user interface comprising display content. In embodiments, the GUI module 238 may generate the display data and/or activate a viewer application to render the graphical user interface. The GUI module 238 may update a GUI with new display data based at least in part upon data and/or instructions received, e.g., from a remote server, and/or in response to user inputs and/or time-based events (e.g., delayed actions) based at least in part upon pre-programmed or previously received instructions.

The client device 112 may include a security protocol module 240, which may perform processes to encrypt electronic messages and/or apply digital signatures to electronic messages, as described herein. A security protocol module 240 may generate an asymmetric private key based at least in part upon an invariant biometric feature vector, which may be extracted from and/or derived at least from a biometric reading of a user (e.g., a fingerprint).

Figure 3:
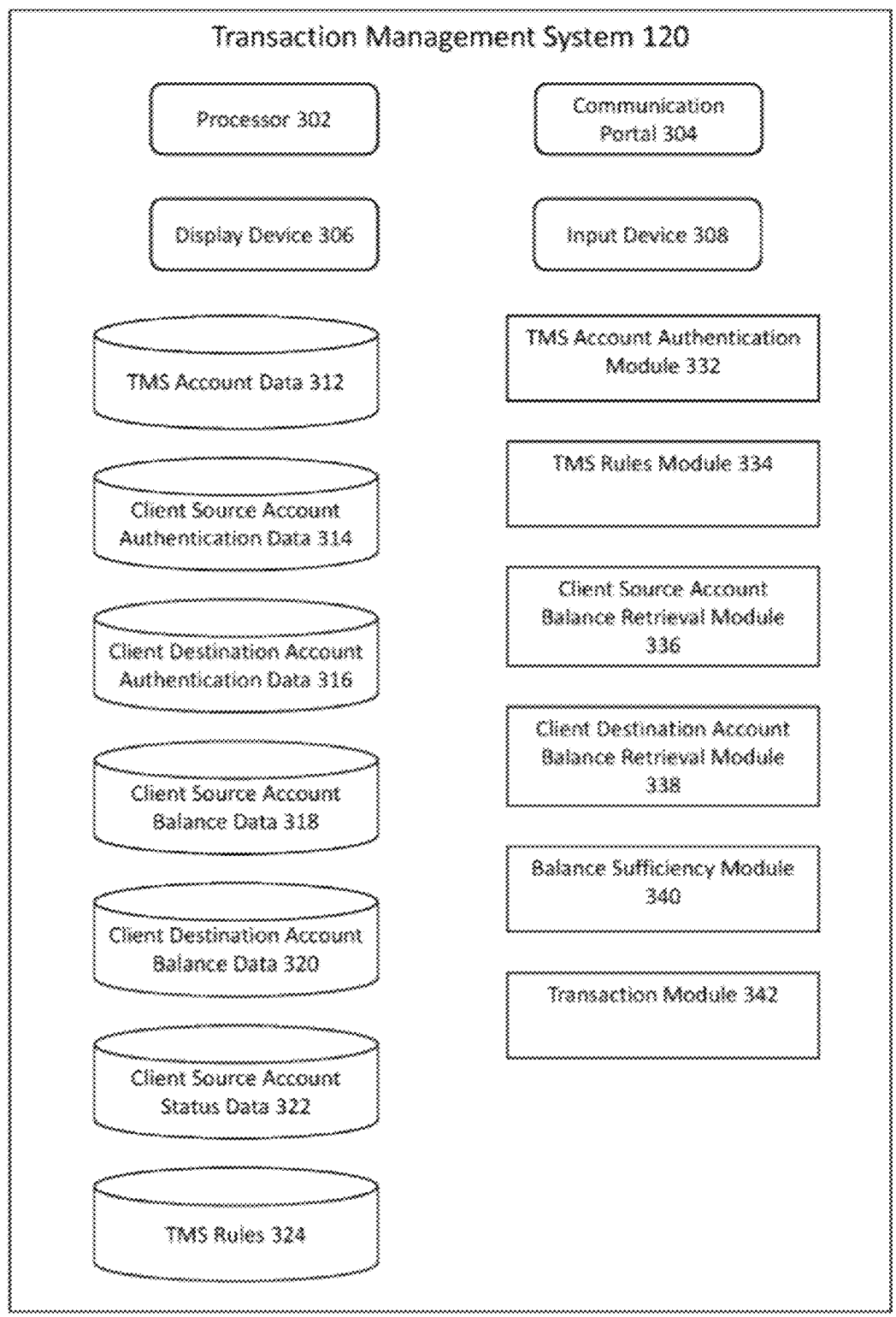
FIG. 3 is a schematic block diagram representing embodiments of a transaction management system in accordance with exemplary embodiments of the present invention.

Referring to FIG. 3, there is shown a schematic block diagram representing embodiments of the transaction management system (TMS) 120. The TMS 120 may be a computer system comprising one or more computers. The TMS 120 may comprise one or more processors 302, communications portals 304, display devices 306, and/or input devices 308. The TMS 120 can further include non-transitory computer-readable memory. Data may be stored in one or more database stored on the computer-readable memory, and particular software modules may be stored on the computer-readable memory. Such modules may run or be configured to run on the one or more processors 302. Exemplary data and modules are described herein.

In embodiments, the TMS 120 may comprise electronic data storage 312 for TMS account data. In embodiments, the TMS account data may comprise the user's information for the transaction management system, such as login credentials (username and/or password), contact information (email address, phone number, address), billing information (credit card information, bank account information), and/or user preferences and/or settings. In embodiments, TMS account data 312 can include TMS transaction history data, which may identify one or more transactions (e.g., fund transfers) performed by the TMS.

In embodiments, the TMS 120 may comprise electronic data storage 314 for client source account authentication data. In embodiments, the client source account authentication data may comprise the user's information for accessing each account at the source institution (account number, authentication information, such as login credentials). It can also include information identifying the various source institutions.

In embodiments, the TMS 120 may comprise electronic data storage 316 for client destination account authentication data. In embodiments, the client destination account authentication data may comprise the user's information for accessing each account at the one or more destination institutions. The client destination account authentication data may also include information identifying the various destination institutions.

In embodiments, the TMS 120 may comprise storage 318 for client source account balance data. In embodiments, client source account balance data may comprise an amount of cash held in a respective source account, and in embodiments, may further include amounts of other financial instruments or commodities (shares of stock, mutual funds, bonds, etc.). In embodiments, this balance data may be obtained on the fly after new transaction data has been received or obtained. In embodiments, the balance data may be obtained periodically, e.g., every 6 hours, 4 pm each day, once a week, twice a day, to name a few.

In embodiments, the TMS 120 may comprise electronic data storage 320 for client destination account balance data for one or more client destination accounts in the same or in different institutions. In embodiments, the client destination account balance data may comprise an amount of cash or liquid financial vehicles (e.g., an MMDA balance) held in a respective destination account, and in embodiments, may further include amounts of other financial instruments or commodities (shares of stock, mutual funds, bonds, etc.) held in the institution. In embodiments, this balance data may be obtained on the fly after new transaction data has been received or obtained. In embodiments, the balance data may be obtained periodically. In embodiments, client destination account transaction data 320 can include transaction history data for one or more destination accounts.

In embodiments, the TMS 120 may comprise electronic data storage 322 for client source account transaction data 322. In embodiments, the client source account transaction data may comprise pending order information for one or more trades, e.g., buy orders and/or sell orders. In embodiments, client source account transaction data 322 can include transaction history data for one or more source accounts.

In embodiments, the TMS 120 may comprise a TMS rules electronic storage 324 for storing electronic rules (e.g., user-specified and/or default rules) for performing various transactions. In embodiments, electronic transaction rules may be generated based at least in part upon user-specified and/or default rules. In embodiments, a user may set destination account balance limits that specify account balance limits (min or max limits), frequencies for performing cash transfer transactions (or other fund transfer transactions), and/or frequencies for determining account balances, to name a few.

In embodiments, the TMS 120 may further comprise a TMS account rules module 334 for generating and/or populating electronic transaction rules based at least in part upon user-specified rules and data and/or default rules. In embodiments, this module 334 may also trigger and/or execute such rules.

The TMS 120 may include a client source account balance retrieval module 336. Such a module may obtain (e.g., retrieve and/or receive) source account balance data, which may comprise a numerical balance amount. In embodiments, a balance amount may have a corresponding timestamp (e.g., date and/or time). The source account balance retrieval module 336 may use client source account authentication data 314 to access one or more source accounts and obtain the source account balance data.

The TMS 120 may include a client destination account balance retrieval module 338. Such a module may obtain (e.g., retrieve and/or receive) destination account balance data, which may comprise a numerical balance amount and may have a corresponding timestamp. The destination account balance retrieval module 338 may use client destination account authentication data 316 to access one or more destination accounts and obtain the destination account balance data.

In embodiments, the TMS 120 may further comprise a balance sufficiency module 340. In embodiments, the balance sufficiency module may be configured to determine whether a source account balance (obtained from the electronic storage 318 or obtained on the fly) is sufficient to cover a pending net buy order, and/or to determine whether there is excess cash in the client source account. In embodiments, this module determination may comprise subtracting an amount for the net buy order from the client source account balance, and determining if the result is a positive amount, or a deficiency amount.

In embodiments, the TMS 120 may further comprise a transaction module 342. In embodiments, the transaction module may be configured to generate electronic transaction instructions to move funds between institutions, and/or execute a movement of funds between institutions, e.g., fund movement from a source account held at a source institution to a destination account at a destination institution, or vice versa. In embodiments, the electronic transaction instructions and/or parameters may identify source and destination accounts, transaction amounts, and/or account credentials or a database pointer to electronically stored credentials to use for authorizing the transaction.

Figure 4:
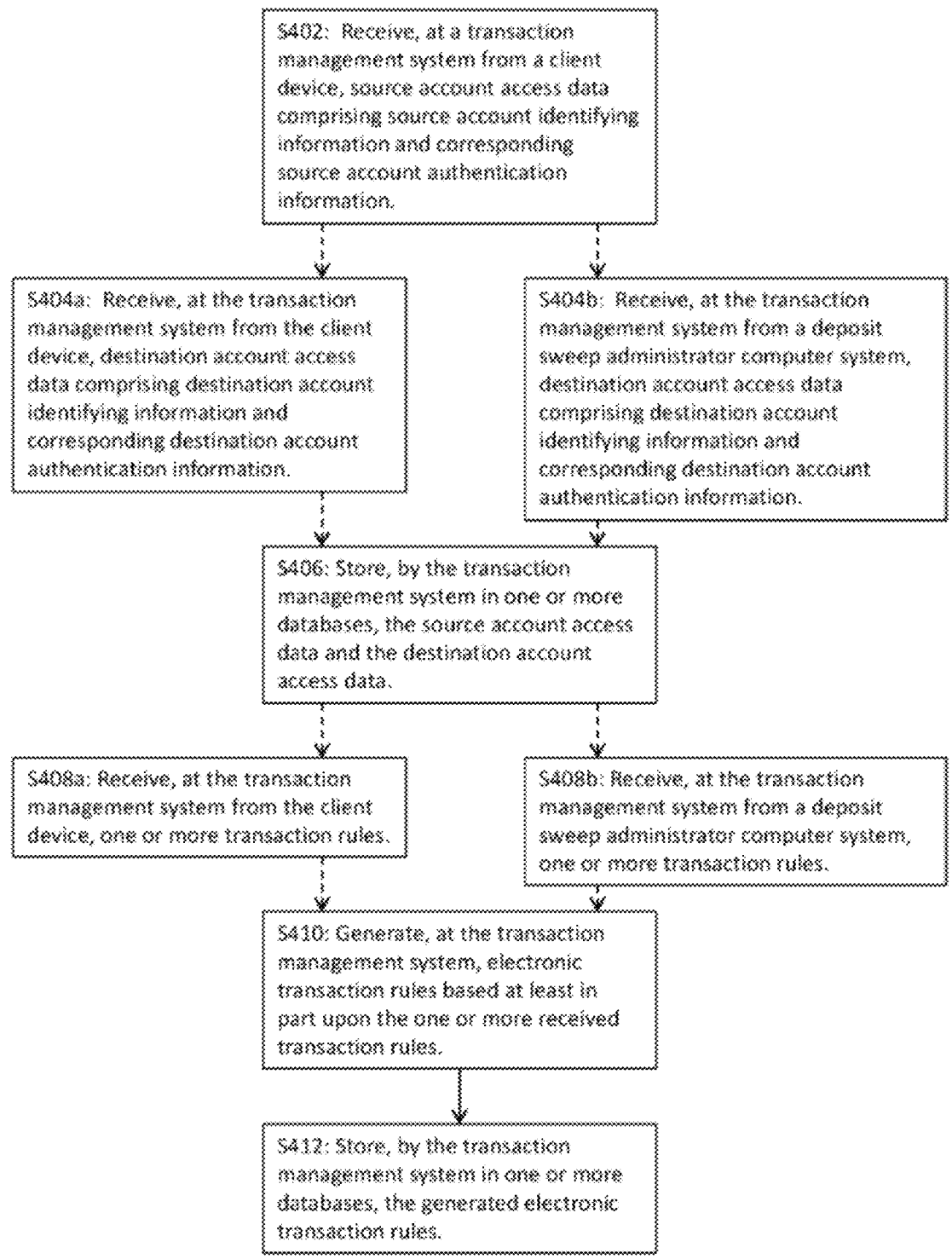
FIG. 4 is a flow chart of embodiments of system configuration operations with a client in accordance with exemplary embodiments of the present invention.

Referring to FIG. 4, there is shown a flow chart of embodiments of system set-up operations with a client. Block S402 represents a computer-implemented operation of receiving, at the transaction management system 120 from a client device 110, source account access data comprising source account identifying information and corresponding source account authentication information, e.g., user ID and password.

Block S404a represents a computer-implemented operation of receiving, at the transaction management system 120 from a client device 110, destination account access data comprising destination account identifying information and corresponding destination account authentication information, e.g., user ID and password. In embodiments, in a step S404b, the transaction management system may instead receive the destination account access data from a cash sweep, e.g., deposit sweep, administrator computer system or user device.

Block S406 represents a computer-implemented operation of storing, by the transaction management system 120 in one or more databases 214, 216, the source account access data and the destination account access data.

Block S408a represents a computer-implemented operation of receiving, at the transaction management system 120 from a client device 110, transaction rules or data for implementing one or more transaction rules. In embodiments, in a step S408b, such transaction rules or rules data may instead be received at the transaction management system from a deposit sweep administrator computer system or user device. Examples of such data to populate transaction rules comprise a source account minimum balance, a source account maximum balance, a source account target balance, a destination account minimum balance, an account balance monitoring frequency, a transaction monitoring frequency, e.g., every 30 seconds, every minute, every 10 minutes, etc., a default destination account for fund transfers from the source accounts, an order of destination institutions or other destination institutions for receiving deposits, and source-destination account links. In an exemplary embodiment, a transaction rule may include a preference from a user associated with a client device to maximize insurance coverage or to maximize interest on funds held at one or more depository institutions.

Block S410 represents a computer-implemented operation of generating, at the transaction management system 120, electronic transaction rules based at least in part upon the data received for implementing the one or more transaction rules.

Block S412 represents a computer-implemented operation of storing, by the transaction management system in one or more databases, the generated electronic transaction rules.

In embodiments, the transaction management system 120 may receive updated transaction rule data and/or updated account access data (e.g., modifications to existing data, new data, and/or requests to remove existing data). The transaction management system 120 may generate and/or store new and/or modified electronic transaction rules based at least in part upon the received updated rule data and/or account access data.

The transaction management system may execute cash sweeps such as deposit sweeps from trading accounts to depository accounts or vice versa, without the technological cooperation of the institutions holding the accounts. In embodiments, the transaction management system may determine whether deposit sweep customers or other cash sweep customers hold other funds, e.g., non-program funds, at program banks and may determine allocations of funds accordingly, e.g., so as not to exceed maximum account balances. In embodiments, the system may determine not to allocate such a customer's funds to a bank that already holds funds of the customer.

In embodiments, the transaction management system may comprise cash sweep software running on a client device. The cash sweep software may comprise deposit sweep software. A user of the client device may execute cash sweep operations, such as deposit sweep operations, using the cash and/or deposit sweep software. Accordingly, a third-party deposit management entity may not be required.

As described herein, a transaction management computer system may determine a need for a sweep transaction, such as a deposit sweep transaction. Such a sweep transaction may be from a source account at a source institution to a depository account at a depository institution. A sweep transaction may also be from a depository account at a depository institution to a source account at a source institution. In other embodiments, a sweep transaction may comprise an allocation or reallocation of funds among a plurality of institutions, such as a plurality of depository institutions or a plurality of both source and depository institutions. In embodiments, such allocations may involve omnibus depository accounts at one or more depository institutions.

Sweep transactions may be triggered by transactions at and/or transaction data obtained from one or more transaction sources or source institutions. Source institutions can include broker-dealers, brokerage firms, card servicers, bill payment servicers, ACH debit and/or credit servicers, check payment or processing servicers, to name a few. Examples of types of transactions that may occur in a source institution and thus trigger an event can include credit and/or debit events against the customer account at the source institution. For example, clients may access their funds for deposits and withdrawals from various transaction sources. Thus, card servicers represent credit and debit card processing organizations and networks. Internet bill payment servicers represent service providers for bill payment, checks, and funds exchanges generally via the Internet (or other electronic or data networks). ACH debits and credits represents various direct deposit and withdrawal clearinghouse services. Check payment servicers represent debit and credit transactions generated by paper check processing. Source institutions can also be associated with transactions generated as a result of other payment vehicles (such as touch-tone bill payment). Accordingly, clients may access their agent-managed funds by credit and debit cards, for Internet transactions, by direct deposits and withdrawals, by checks, and by other payment and funds exchange vehicles. Transaction data may be obtained from any of these source institutions. In embodiments, respective user access credentials may be used, e.g., by a transaction management system, to access electronic portals at such source institutions to obtain account balances and/or transaction information, such as order amounts and/or dates. In embodiments, a transaction management system may monitor respective accounts at the source institutions to determine when transactions have occurred or are scheduled to occur, as described herein. Monitoring such accounts can comprise accessing account information, such as by using user access credentials to access respective electronic portals (e.g., according to a monitoring frequency), obtaining account information (e.g., balance information, transaction information, to name a few), and/or assessing a date and/or time associated with a last update of the account information and or a date and/or time associated with placement of order or fulfillment of orders for one or more transactions. In embodiments, assessing the date and/or time can comprise comparing such date and/or time to a date and/or time associated with the last retrieval of account information to determine if the account information is new. In embodiments, monitoring can comprise comparing current balance amounts to previous balance amounts to determine whether a change in balance has occurred.

Sweep transactions may be triggered by account balances in either the source institution or depository institution reaching or exceeding a threshold amount (e.g., a monetary amount, such as a dollar amount). Such a threshold amount may represent a maximum account balance (e.g., a maximum permissible or desirable balance) or a minimum account balance (e.g., a minimum permissible or desirable balance), which balance limits may be determined by user preference, government regulation, insurance requirements (e.g., maximum insurable amounts for an account or institution, which may be measured per customer), and/or institution requirements (e.g., required minimum account balances to avoid incurring fees). Exceeding a threshold may comprise a balance or projected balance (e.g., a projected post-transaction balance for a pending transaction) rising above the threshold. In other embodiments, exceeding the threshold may comprise falling below the threshold.

A need for one or more sweep transactions may be determined automatically by a transaction management computer system, e.g., based at least in part upon the occurrence of the sweep transaction triggers described herein. In embodiments, sweep transactions may be performed on certain days and/or times. For example, 9 AM E.T., 5 PM E.T., 8 PM E.T., a certain day of the week, or a certain date of the month, to name a few. Certain sweep transactions may require user approval. Such transactions may be defined by transaction parameters or transaction characteristics, such as source account identifiers, destination account identifiers, transfer amounts, and/or allocation amounts, to name a few. Transaction satisfying certain predefined characteristics may require user approval, such as transactions to or from particular accounts or institutions or transactions involving amounts exceeding a preset permissible transfer amount. Such characteristics may be stored as exceptions to default permissible transaction characteristics.

A transaction management computer system may monitor one or more accounts at one or more source and/or depository institutions to obtain the information necessary to determine when sweep transaction triggers occur. Such information can include account balance information, pending order information, and/or transaction information, such as completed order information. Account monitoring may be performed according to a predefined schedule, e.g., once per day, such as at 5 PM E.T., twice per day, such as at 9 AM E.T. and 5 PM E.T., once per week, once per month, twice per month, to name a few. An account monitoring frequency may govern how often to monitor one or more accounts. The system may monitor accounts on demand, e.g., upon receipt of a user electronic request to refresh account information. In embodiments, the system may receive or may determine an account update schedule for one or more particular institutions, e.g., brokerage institutions. Such a schedule may identify when account information is updated for access via a computer-based portal or may identify when transactions involving the account are executed or settled. The system may monitor the accounts according to the schedule of updates.

Thus, the present invention improves upon prior computer implemented deposit sweep systems, which could not automatically institute such a trigger themselves and instead would need to rely upon source institutions or the customer to initiate a sweep event. Thus, the technological solution of the present invention is very advantageous. It can expand the scope of sweep programs to cover additional source and/or depository institutions and/or can automate sweep triggering, such as deposit sweep triggering, without input or instruction from third parties other than sweep settings, which may be stored in advance in memory and may be optional.

In embodiments, the transaction management system may monitor a customer's emails, e.g., by accessing the customer's email account using email login credentials for the email account. The system may search for and/or determine emails matching certain criteria, such as one or more sender names or sender email addresses, e.g., corresponding to financial institutions, and/or determining subject or body information matching certain predefined text (e.g., the words "account", "balance", and/or "transaction", to name a few). In embodiments, the system may receive forwarded emails from the customer. The customer may set rules to forward transaction notification emails or other relevant emails automatically. In embodiments, the customer may specify, at the source and/or destination institutions, a transaction management system email address to receive account alerts. Upon receipt or detection of such an email, the transaction management system may retrieve account information from one or more source and/or depository institution accounts associated with the customer.

Figure 5A:
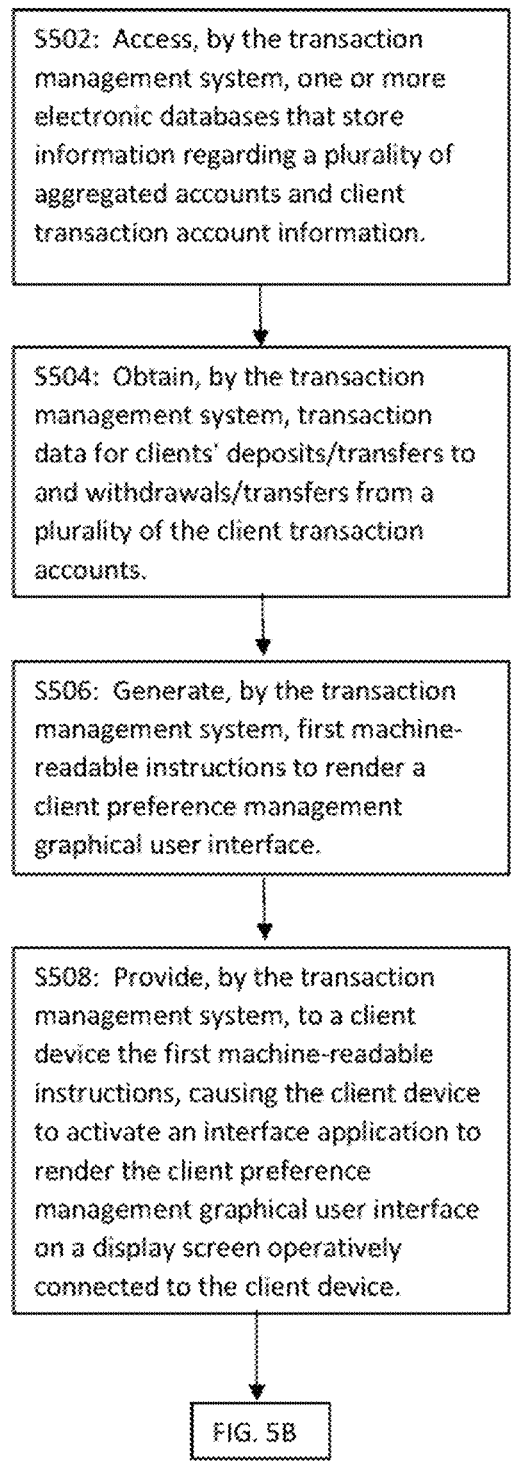
FIGS. 5A and 5B is a flow chart of a process for performing deposit sweep transactions comprising providing customer control in an automated deposit sweep transaction in accordance with exemplary embodiments of the present invention, where the customer control relates to customer selection of one of either maximum interest or maximum insurance.
Figure 5B:
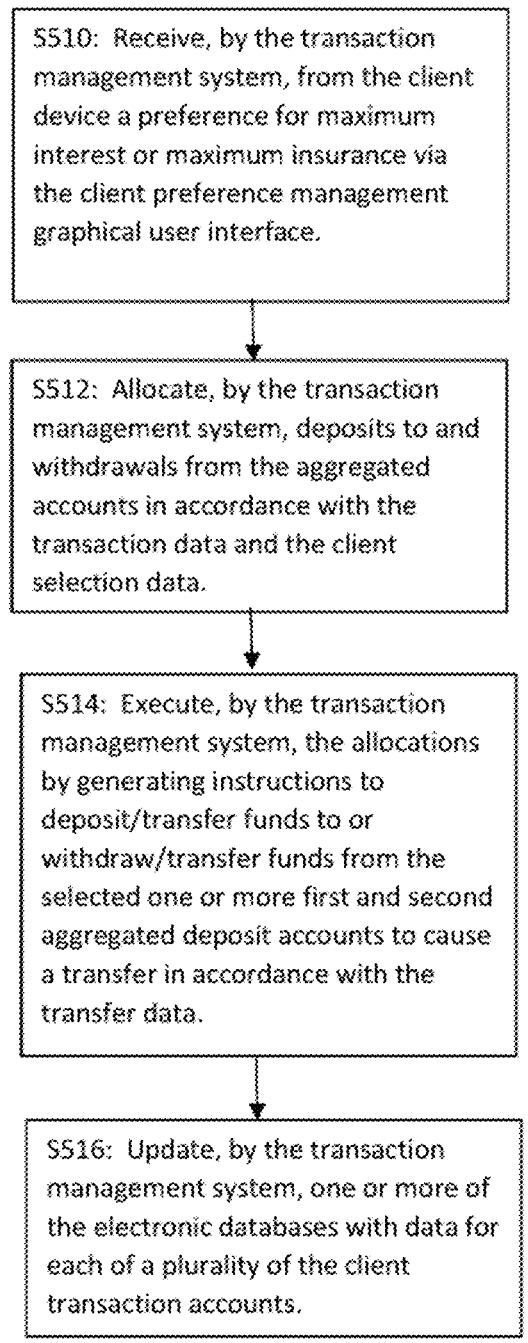

FIGS. 5A and 5B is a flow chart of a process for performing deposit sweep transactions comprising providing customer control in an automated deposit sweep transaction in accordance with exemplary embodiments of the present invention, where the customer control relates to customer selection of one of either maximum interest or maximum insurance.

Block S502 represents a computer-implemented operation of accessing, by the transaction management system 120, one or more electronic databases that store information regarding a plurality of aggregated accounts and client transaction account information. More specifically, the one or more electronic databases may comprise aggregated account information for each of a plurality of FDIC-insured and interest-bearing aggregated accounts held in a plurality of deposit institutions. In exemplary embodiments, each deposit institution may hold one or more of the aggregated accounts, with each aggregated account holding funds of client transaction accounts of a plurality of clients. In exemplary embodiments, the aggregated account information may comprise a respective amount of net assets held in each of a plurality of the respective aggregated accounts.

In exemplary embodiments, the aggregated account information may also comprise, for each respective one of a plurality of the deposit institutions, at least one respective minimum cap, with the minimum cap comprising a minimum amount of assets to be held in the respective deposit institution. In exemplary embodiments, the aggregated account information may also comprise, for each respective one of the plurality of the deposit institutions having a minimum cap, at least one respective maximum cap, with the maximum cap comprising a maximum amount of assets to be held in the respective deposit institution. In exemplary embodiments, the aggregated account information may not include information pertaining to minimum caps, and may only contain information pertaining to maximum caps for each respective deposit institution.

In exemplary embodiments, the aggregated account information may include, for each respective one of the plurality of depository institutions, a maximum cap for funds associated with clients that prefer maximum interest and a maximum cap for funds associated with clients that prefer maximum insurance. The maximum cap for max insurance clients combined with the maximum cap for max interest clients preferably does not exceed the total maximum cap of the respective depository institution. For example, if the total maximum cap of a depository institution is $10 million dollars, then the maximum cap for max insurance clients may be $7 million dollars and the maximum cap for max interest client may be $3 million. In exemplary embodiments, each depository institution may maintain a balance of funds for clients that prefer max interest that is at or below the max interest cap while also maintaining a balance of funds for clients that prefer max insurance that is at or below the max insurance cap.

In exemplary embodiments, the aggregated account information may include, for each respective one of the plurality of depository institutions, an interest rate associated with the depository institution. For example, the interest rate may be a saving account interest rate, a checking account interest rate, a certificate of deposit interest rate, a money market account interest rate, or an interest rate calculated based on a formula that takes into account interest rates of one or more interest-bearing products offered at the depository institution.

In exemplary embodiments, the client transaction account information for each of the respective client transaction accounts may comprise a respective balance of funds in the respective client transaction account, transaction data for the respective client transaction account, and a respective balance of funds from the respective client transaction account held in each of one or more of the insured and interest-bearing aggregated accounts holding funds of the client transaction account. In exemplary embodiments, the client transaction account information may also include respective client selection data associated with a respective client's selection of whether to maximize insurance or maximize interest for the client transaction account.

Block S504 represents a computer-implemented operation obtaining, by the transaction management system 120, transaction data for clients' deposits/transfers to and withdrawals/transfers from a plurality of the client transaction accounts. In exemplary embodiments, the transaction data may be contained in a deposit sweep file, and may comprise transaction data for one or more deposits/transfers for one or more client transaction accounts and/or transaction data for one or more withdrawals/transfers from one or more of the client transaction accounts, with a respective amount of funds associated with each respective deposit/transfer and each respective withdrawal/transfer. In embodiments, transaction information contained in the deposit sweep file can comprise indications of transactions, which can include buy amounts, sell amounts, net transaction amounts, transaction fee amounts, pre-transaction balances, and/or post-transaction balances, to name a few. In embodiments, the transaction management system 120 may obtain one or more transaction amounts and may separately obtain one or more account balances. The system may compute post-transaction account balances therefrom.

Next, the transaction management system 120 may obtain client preference data associated with the plurality of client transaction accounts, where the client preference data is associated with a respective client's selection of whether to maximize insurance or maximize interest for the client transaction account. In this regard, block S506 represents a computer-implemented operation of generating, by the transaction management system 120, first machine-readable instructions (e.g., mark-up code, style code, image data, text data, interaction processing code such as JavaScript, to name a few) to render a client preference management graphical user interface. The interface may comprise a graphical widget that allows a client to select whether to maximize insurance or maximize interest.

Block S508 represents a computer-implemented operation of providing, by the transaction management system 120, to a client device the first machine-readable instructions, causing the client device to activate an interface application to render the client preference management graphical user interface on a display screen (e.g., an embedded display screen and/or touch screen, an external display screen, a projector, to name a few) operatively connected to the client device.

Block S510 represents a computer-implemented operation of receiving, by the transaction management system 120, from the client device a preference for maximum interest or maximum insurance via the graphical widget of the client preference management graphical user interface. In embodiments, client preferences may be stored in one or more databases, e.g., for future access. Accordingly, the transaction management system 120 may store in one or more databases comprising non-transitory computer-readable memory an indication of the preference for maximum interest or maximum insurance.

Block S512 represents a computer-implemented operation of allocating, by the transaction management system 120, deposits to and withdrawals from the aggregated accounts in accordance with the transaction data and the client selection data. The allocations may comprise identifications for each respective customer of one or more respective destination depository institutions and respective amounts to allocate to each respective destination depository institution. In embodiments, executing the allocations may comprise updating one or more electronic ledgers. In embodiments, executing the allocations may comprise transferring the respective amounts from a first account to a second account.

In exemplary embodiments, the step of allocating may include, for each incidence of the obtained selection data being associated with a selection to maximize interest, selecting one or more first aggregated deposit accounts held in one or more first deposit institutions with a highest interest rate among the deposit institutions to which to deposit funds while minimizing withdrawals from the one or more first deposit institutions with the highest interest rate, and also while maintaining the amount of assets within each of the one or more first deposit institutions at or below the maximum cap. In exemplary embodiments, the step of allocating may also include, for each incidence of the obtained selection data being associated with a selection to maximize insurance, selecting one or more second aggregated deposit accounts held in one or more second deposit institutions with a lowest interest rate among the deposit institutions to which to deposit funds while minimizing withdrawals from the one or more second deposit institutions with the lowest interest rate, and also while maintaining the amount of assets within each of the one or more second deposit institutions at or below the maximum cap. In exemplary embodiments, space below the maximum cap at deposit institutions with the highest interest rates may be used to ensure the highest interest rate deposit institutions do not get filled up too quickly and can still be used for maximum insurance clients.

In exemplary embodiments, the step of allocating may include allocation of one or more amounts of funds to the selected one or more first and second aggregated deposit accounts held in one or more of the first and second deposit institutions based at least in part on the transaction data.

Block S514 represents a computer-implemented operation of executing, by the transaction management system 120, the allocations by generating instructions to deposit/transfer funds to or withdraw/transfer funds from the selected one or more first and second aggregated deposit accounts to cause a transfer in accordance with the transfer data. In embodiments, executing the allocations of funds may comprise inserting and/or modifying electronic entries in one or more electronic ledgers, which may comprise one or more databases.

Block S516 represents a computer-implemented operation of updating, by the transaction management system 120, one or more of the electronic databases with data for each of a plurality of the client transaction accounts. In exemplary embodiments, the data for each of the client transaction accounts may comprise a respective balance of funds of the respective client transaction account held in each of one or more of the deposit institutions holding funds of the respective client transaction account.

Figure 6:
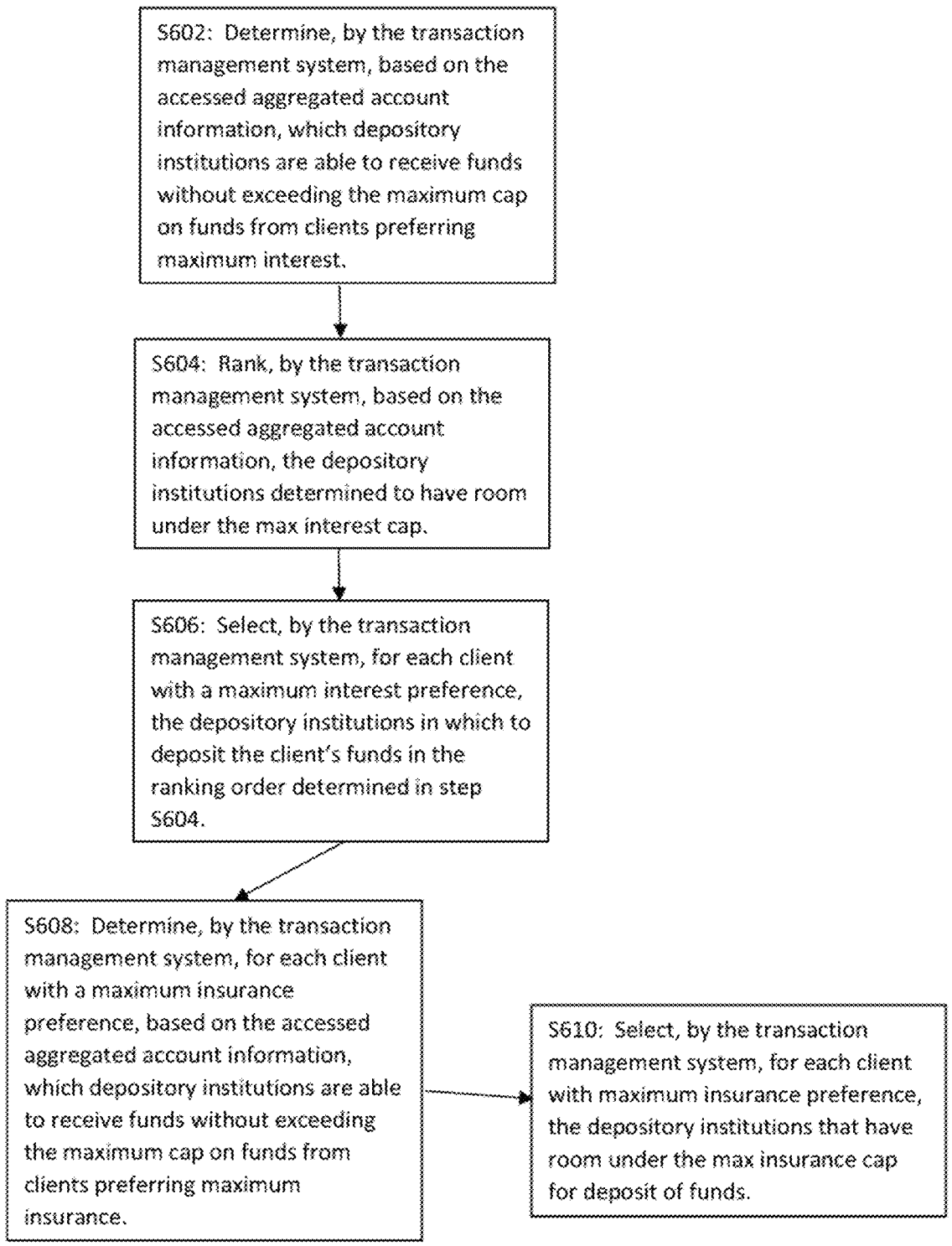
FIG. 6 is a flowchart of a process of allocating deposits to and withdrawals from aggregated depository accounts in accordance with transaction data and client selection data in accordance with exemplary embodiments of the present invention.

FIG. 6 is a flowchart showing a process of allocating deposits to and withdrawals from the aggregated depository accounts in accordance with the transaction data and the client selection data according to an exemplary embodiment of the present invention.

Block S602 represents a computer-implemented operation of determining, by the transaction management system 120, based on the accessed aggregated account information, which depository institutions are able to receive funds without exceeding the maximum cap on funds from clients preferring maximum interest. In exemplary embodiments, the depository institutions determined in this step make up the first and second depository institutions associated with the one or more first and second aggregated deposit accounts selected in step S512.

Block S604 represents a computer-implemented operation of ranking, by the transaction management system 120, based on the accessed aggregated account information, the depository institutions determined in step S602 to have room under the max interest cap. In exemplary embodiments, the ranking may be based on interest rate, with priority given to those depository institutions having the highest interest rate.

Block S606 represents a computer-implemented operation of selecting, by the transaction management system 120, for each client with a maximum interest preference, the depository institutions in which to deposit the client's funds in the ranking order determined in step S604. In this step, portions of the client's funds may be deposited first into those depository institutions that have the highest interest rate. In exemplary embodiments, larger portions of the client's funds may be distributed over the highest interest depository institutions, with smaller portions distributed over the lower interest depository institutions among the ranked depository institutions.

Block S608 represents a computer-implemented operation of determining, by the transaction management system 120, for each client with a maximum insurance preference, based on the accessed aggregated account information, which depository institutions are able to receive funds without exceeding the maximum cap on funds from clients preferring maximum insurance.

Block S610 represents a computer-implemented operation of selecting, by the transaction management system 120, for each client with maximum insurance preference, the depository institutions that have room under the max insurance cap for deposit of funds. In exemplary embodiments, the highest interest rate depository institutions identified in step S602 may still be used for deposit of funds from clients with maximum insurance preference to the extent that there is room under the max insurance cap at those depository institutions. The use of max insurance caps and max interest caps prevents the highest interest depository institutions from getting filled up too quickly with funds from maximum interest clients and thus can still be used for maximum insurance clients.

In exemplary embodiments, pseudo-code for implementing a process of allocating deposits to and withdrawals from the aggregated depository accounts in accordance with the transaction data and the client selection data may be as follows:

```
Allocate ( ) {
    InstitutionList = GetPotentialDepositorInstitutions();
    RankedInstitutions = Rank(InstitutionList);
    ClientList = GetClients WithMaxInterestPref();
    for (i = 0; i <= numClients ; i++) {
        funds = getFunds(client[i]);
        for (j = 0; j <= numRankedInstitutions; j++) {
            fundPortion = portionFunds(funds, RankedInstitutions[j]);
            deposit(fundPortion, RankedInstitutions[j]);
        }
    }
    for (i = 0; i <= numClients; i++) {
        depository InstitutionList = getDepositoryInstitutions(ClientList[i]);
        for (j = 0; j <= numDepositoryInstitutions; j++) {
            depositoryInstitutions[i, j] = depositoryInstitutionList[j];
            if (hasRoomUnderCap(depository Institutions[i, j])) {
                select(depositoryInstitutions[i, j];
            }
        }
    }
}
```

The following example illustrates certain aspects and advantages of the present invention.

Example 1

A deposit sweep program contains the following depository institutions with corresponding maximum caps, balances and interest rates:

| DEPOSITORY INSTITUTION | INTEREST RATE (%) | MAX INSURANCE CAP (MILLION) | MAX INSURANCE BALANCE (MILLION) | MAX INTEREST CAP (MILLION) | MAX INTEREST BALANCE (MILLION) | TOTAL MAX CAP (MILLION) | TOTAL BALANCE (MILLION) |
|---|---|---|---|---|---|---|---|
| BANK 1 | 4.5 | $4 | $3.5 | $3 | $1.5 | $7 | $5 |
| BANK 2 | 5 | $6 | $2.5 | $4 | $4 | $10 | $6.5 |
| BANK 3 | 4.3 | $8 | $7 | $3 | $2.3 | $12 | $9.3 |
| BANK 4 | 2.5 | $4 | $3.5 | $2.5 | $1.7 | $6.5 | $5.2 |
| BANK 5 | 2.7 | $7 | $5 | $5 | $3.4 | $12 | $8.4 |

As part of an allocation process, a deposit sweep program determines which of Banks 1-5 have room under their max interest cap, and then ranks those Banks based on interest rate. In this Example, although Bank 2 has the highest interest rate, the balance at Bank 2 is already at the max interest cap. Accordingly, Bank 2 is not included in the list of depository institutions available for deposit of funds from maximum interest clients. Among the remaining Banks 1, 3, 4 and 5, the ranking based on interest rate is determined to be as follows:

| RANK | DEPOSITORY INSTITUTION | INTEREST RATE (%) |
|---|---|---|
| 1 | BANK 1 | 4.5 |
| 2 | BANK 3 | 4.3 |
| 3 | BANK 5 | 2.7 |
| 4 | BANK 4 | 2.5 |

In this Example, Client 1 selected a preference for maximum interest, and has a balance of $1 million that needs to be deposited in aggregated accounts across the banks within the sweep program. Client 1 has preferred an amount up to $320,000 to be deposited into each depository institutions and thus the allocation for Client 1 may be determined to be as follows:

| ALLOCATION AMOUNT | DEPOSITORY INSTITUTION | INTEREST RATE (%) | MAX INTEREST BALANCE (MILLION) |
|---|---|---|---|
| $320,000 | BANK 1 | 5 | $1.82 |
| $320,000 | BANK 3 | 4.3 | $2.62 |
| $320,000 | BANK 5 | 2.7 | $3.72 |
| $40,000 | BANK 4 | 2.5 | $2.02 |

In this Example, Client 2 selected a preference for maximum insurance, and has a balance of $1.5 million that needs to be deposited in the aggregated accounts across the banks within the sweep program. As shown above, the balance of funds in Banks 1-5 have not exceeded their respective max insurance caps. Thus, Banks 1-5 are available for deposit of Client 2's funds.

Example 2

A cash management system manages deposits into the following depository institutions with corresponding maximum caps, balances and interest rates:

and 2 have room under their max interest cap, and then ranks those Banks and Credit Unions based on interest rate. In this Example, although Bank 1 has the highest interest rate, the balance at Bank 1 is already at the max interest cap. Accordingly, Bank 1 is not included in the list of depository institutions available for deposit of funds from maximum interest clients. Among the remaining Banks 2 and 3 and the Credit Unions 1 and 2, the ranking based on interest rate is determined to be as follows:

| RANK | DEPOSITORY INSTITUTION | INTEREST RATE (%) |
|---|---|---|
| 1 | CREDIT UNION 1 | 4.5 |
| 2 | CREDIT UNION 2 | 4.3 |
| 3 | BANK 3 | 2.7 |
| 4 | BANK 2 | 2.5 |

In this Example, Client 1 selected a preference for maximum interest, and has a balance of $500,000 that needs to be deposited in aggregated accounts across the banks and credit unions within the cash management program. Client 1 has preferred an amount up to $200,000 to be deposited into each depository institutions and thus the allocation for Client 1 may be determined to be as follows:

| ALLOCATION AMOUNT | DEPOSITORY INSTITUTION | INTEREST RATE (%) | MAX INTEREST BALANCE (MILLION) |
|---|---|---|---|
| $200,000 | CREDIT UNION 1 | 5 | $1.6 |
| $200,000 | CREDIT UNION 2 | 4.3 | $2.4 |
| $100,000 | BANK 3 | 2.7 | $3.5 |
| $0 | BANK 2 | 2.5 | $1.7 |

In this Example, Client 2 selected a preference for maximum insurance, and has a balance of $1.5 million that needs to be deposited in the aggregated accounts across the banks credit unions within the cash management program. As shown above, the balance of funds in Banks 1-3 and Credit Unions 1 and 2 have not exceeded their respective max insurance caps. Thus, Banks 1-3 and Credit Unions 1 and 2 are available for deposit of Client 2's funds.

Example 3

A cash management system manages deposits into the following depository institutions and investment vehicles

| DEPOSITORY INSTITUTION | INTEREST RATE (%) | MAX INSURANCE CAP (MILLION) | MAX INSURANCE BALANCE (MILLION) | MAX INTEREST CAP (MILLION) | MAX INTEREST BALANCE (MILLION) | TOTAL MAX CAP (MILLION) | TOTAL BALANCE (MILLION) |
|---|---|---|---|---|---|---|---|
| CREDIT UNION 1 | 4.5 | $4 | $3.5 | $3 | $1.5 | $7 | $5 |
| BANK 1 | 5 | $6 | $2.5 | $4 | $4 | $10 | $6.5 |
| CREDIT UNION 2 | 4.3 | $8 | $7 | $3 | $2.3 | $12 | $9.3 |
| BANK 2 | 2.5 | $4 | $3.5 | $2.5 | $1.7 | $6.5 | $5.2 |
| BANK 3 | 2.7 | $7 | $5 | $5 | $3.4 | $12 | $8.4 |

As part of an allocation process, the cash management system determines which of Banks 1-3 and Credit Unions 1 held at destination institutions with corresponding maximum caps, balances and interest rates:

| DEPOSITORY INSTITUTION | INTEREST RATE (%) | MAX INSURANCE CAP (MILLION) | MAX INSURANCE BALANCE (MILLION) | MAX INTEREST CAP (MILLION) | MAX INTEREST BALANCE (MILLION) | TOTAL MAX CAP (MILLION) | TOTAL BALANCE (MILLION) |
|---|---|---|---|---|---|---|---|
| CREDIT UNION 1 | 4.5 | $4 | $3.5 | $3 | $1.5 | $7 | $5 |
| INVESTMENT VEHICLE 1 | 5 | $6 | $2.5 | $4 | $4 | $10 | $6.5 |
| CREDIT UNION 2 | 4.3 | $8 | $7 | $3 | $2.3 | $12 | $9.3 |
| INVESTMENT VEHICLE 2 | 2.5 | $4 | $3.5 | $2.5 | $1.7 | $6.5 | $5.2 |
| BANK 1 | 2.7 | $7 | $5 | $5 | $3.4 | $12 | $8.4 |

As part of an allocation process, the cash management system determines which of Bank 1, Credit Unions 1 and 2 and Investment Vehicles 1 and 2 have room under their max interest cap, and then ranks those Banks, Credit Unions and Investment Vehicles based on interest rate. In this Example, although Investment Vehicle 1 has the highest interest rate, the balance at Investment Vehicle 1 is already at the max interest cap. Accordingly, Investment Vehicle 1 is not included in the list of depository institutions available for deposit of funds from maximum interest clients. Among the remaining Bank 1, Credit Unions 1 and 2 and Investment Vehicle 1, the ranking based on interest rate is determined to be as follows:

| RANK | DEPOSITORY INSTITUTION | INTEREST RATE (%) |
|---|---|---|
| 1 | CREDIT UNION 1 | 4.5 |
| 2 | CREDIT UNION 2 | 4.3 |
| 3 | BANK 1 | 2.7 |
| 4 | INVESTMENT VEHICLE 2 | 2.5 |

In this Example, Client 1 selected a preference for maximum interest, and has a balance of $1,000,000 that needs to be deposited in aggregated accounts across the banks, credit unions and depository institutions within the cash management program. Client 1 has preferred an amount up to $290,000 to be deposited into each depository institutions and thus the allocation for Client 1 may be determined to be as follows:

| ALLOCATION AMOUNT | DEPOSITORY INSTITUTION | INTEREST RATE (%) | MAX INTEREST BALANCE (MILLION) |
|---|---|---|---|
| $290,000 | CREDIT UNION 1 | 5 | $1.79 |
| $290,000 | CREDIT UNION 2 | 4.3 | $2.59 |
| $290,000 | BANK 1 | 2.7 | $3.69 |
| $130,000 | INVESTMENT VEHICLE 2 | 2.5 | $1.99 |

In this Example, Client 2 selected a preference for maximum insurance, and has a balance of $2 million that needs to be deposited in the aggregated accounts across the banks, credit unions and depository institutions within the cash management program. As shown above, the balance of funds in Bank 1, Credit Unions 1 and 2 and Investment Vehicles 1 and have not exceeded their respective max insurance caps. Thus, Bank 1, Credit Unions 1 and 2 and Investment Vehicles 1 and 2 are available for deposit of Client 2's funds.

Referring to FIGS. 7A-7D, interfaces for a client device are illustrated. FIG. 7A illustrates embodiments of an interface listing multiple client source accounts (note that the Source Accounts button 702 is activated in FIG. 7A). An Add Account button 710 may initiate a process to add a new source account. In the exemplary embodiment, activating this Add Account button 710 will open the screen shown in FIG. 7B comprising a block 720 to input a source institution (e.g., via text entry, searching, selecting from a predefined list, to name a few). A source account number may be input in a block 722. A user's login credentials for the source account may also be input, such as in a block 724 for the client's username and a block 726 for the client's password. A Submit button 728 and a Cancel button 730 are also provided in the interface to complete the add account process and to cancel the process, respectively. In embodiments, a confirmation process may be performed to verify the account credentials. For example, the TMS 120 may attempt to access the account and obtain account balance information, and/or the TMS 120 may perform a test transaction.

FIG. 7C illustrates embodiments of an interface listing multiple client destination accounts, which may be depository accounts (note that the Destination Accounts button 704' is activated in FIG. 7C). The interface comprises an Add Account button 710' to initiate a process to add a new destination account. Activating this Add Account button 710' will open the screen shown in FIG. 7D with a block 720' to enter (e.g., input, search for, and/or select) a destination institution, a block 722' to enter a destination account identifier (e.g., an account number), a block 724' to enter a client username, and a block 726' to enter a client password. A Submit button 728' and a Cancel button 730' are also provided in the interface.

Referring to FIG. 8A, illustrated are embodiments of a Website interface 800 (e.g., accessible at a URL via a web browser) for accessing a user's transaction management account associated with the TMS 120, e.g., to access account information and/or change settings. Activating the "Home 802" element navigates to a home page (shown in the figure). In embodiments, the Home page interface may show a log of TMS transaction activity, such as a log of money movements, time of the transactions, the accounts involved, the amounts transferred, any fees incurred, etc. In embodiments, such information may be provided on a different webpage associated with the TMS.

In embodiments, the Website interface 800 may comprise a Source Accounts 804 element to access an interface for listing the client's source accounts (view accounts, view account balances, view account activity log, to name a few). In embodiments, the Website interface 800 may comprise a Destination Accounts 806 element to access an interface listing the client's destination accounts. In embodiments, the Website interface 800 may comprise a Transaction Settings 808 element to access an interface for creating, setting, and/or editing client transaction rules. In embodiments, the Website interface 800 may comprise a TMS Account 810 element to access and adjust TMS administration information, e.g., a logout option, billing information, contact information, financial information, and change TMS password, to name a few.

Referring to FIG. 8B, embodiments of the Source Accounts 804 interface are illustrated. In the Your Source Accounts box, individual client source accounts are listed. In embodiments, when one of the source accounts is selected, a button for a View History 836 screen may be provided, where an account transaction history may be accessed. In embodiments, this information may be obtained by accessing source account data from the source institution servers using the client source account credentials and parsing and/or reformatting this data for display at the TMS website, as previously described. In embodiments, this information may be obtained in whole or in part from electronic storage in the TMS 120. In embodiments, an Edit Account 838 button may be provided to allow deletion of accounts and/or to allow changing source account credentials, which will update the source account credentials stored at the TMS in electronic storage 314. In embodiments, the TMS may provide an electronic notification to one or more user devices when a source account cannot be accessed and/or may prompt a user to modify the credentials. A button to Add Source Account 832 may be provided to present an interface for adding a new source account.

When the Add Source Account 832 button is clicked, an Add Source Accounts interface is provided. See FIG. 8C for exemplary embodiments of such an interface. Within this interface, block 842 allows entry of a source institution. Block 844 allows entry of a source account identifier (e.g., a source account number). Block 846 allows entry of a username for the source account, and block 848 allows entry of a password for the source account. In embodiments, an account name may be input to facilitate identification of the account for the user. A comparable interface may be provided for adding a new destination account.

When a particular one of the source accounts is highlighted in FIG. 8B, and the Edit Account button is activated, then an Edit interface is provided. Embodiments of an Edit interface are shown in FIG. 8D. Within the interface, block 852 allows entry of a modification of the source institution identifier (e.g., source institution account). Block 854 allows entry of a change of the source account identifier. Block 856 allows entry of a change of the username for the source account. Block 858 allows entry of a change of the password for the source account. Block 860 permits saving changes, block 862 cancels changes, and block 864 deletes an account.

Figure 8E:
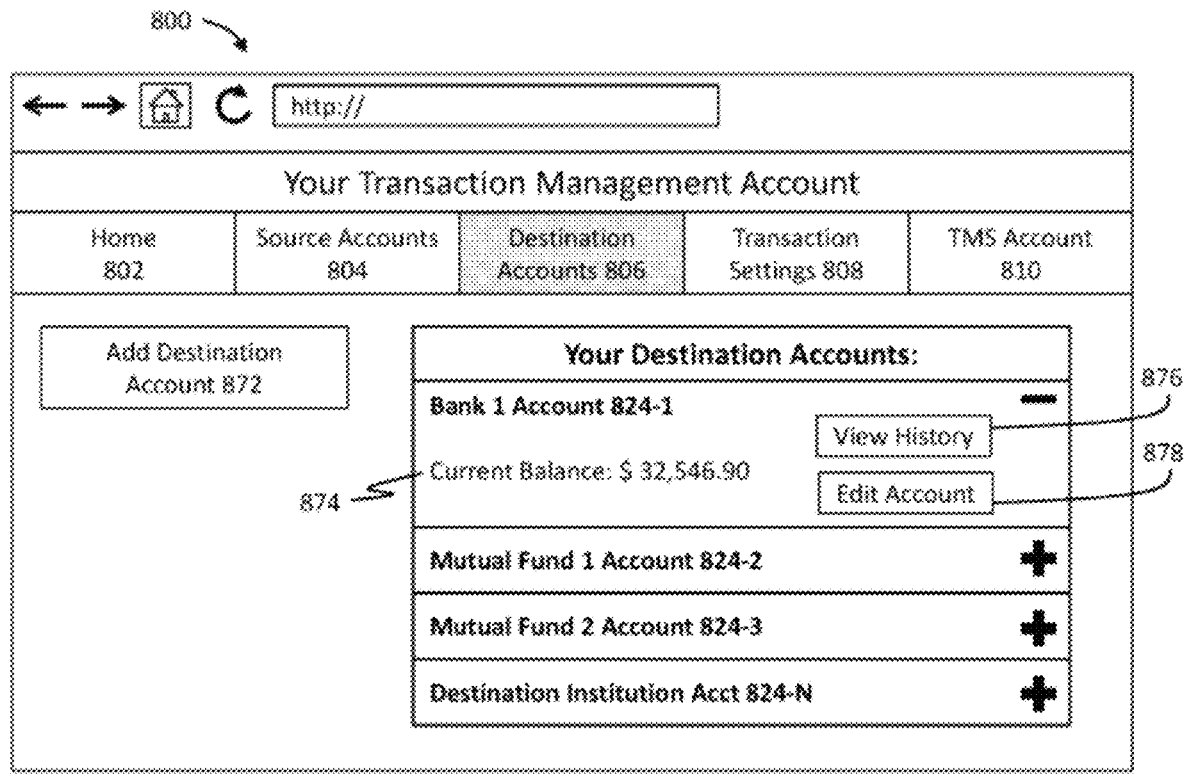
FIG. 8E is a schematic diagram of embodiments of a client interface screen for viewing a listing of the client's destination accounts, with an Add Source Account button, a View Account button, and an Edit Account button in accordance with exemplary embodiments of the present invention.

Referring to FIG. 8E, embodiments of the Destination Accounts 806 interface are illustrated. In the Your Destination Accounts box, individual client destination accounts are listed. In embodiments, when an individual destination account is selected, a button for a View History 876 screen may be provided where the destination account transaction history may be accessed using the account credentials obtained from the electronic storage 316 and parsed and/or reformatted for display at the TMS website. In embodiments, some or all of this account history data may be obtained from electronic storage at the TMS. In embodiments, an Edit Account 878 element (e.g., button) may be provided to allow deletion of accounts and/or to allow changing destination account information, such as account credentials. Changes to account information may be updated in the electronic storage 316. An Add Destination Account 872 button may be provided to open an interface to add a new destination account. An interface comparable to FIG. 8C may be provided for adding a new destination account. An interface comparable to FIG. 8D may be provided for editing the destination account data.

Figure 8F:
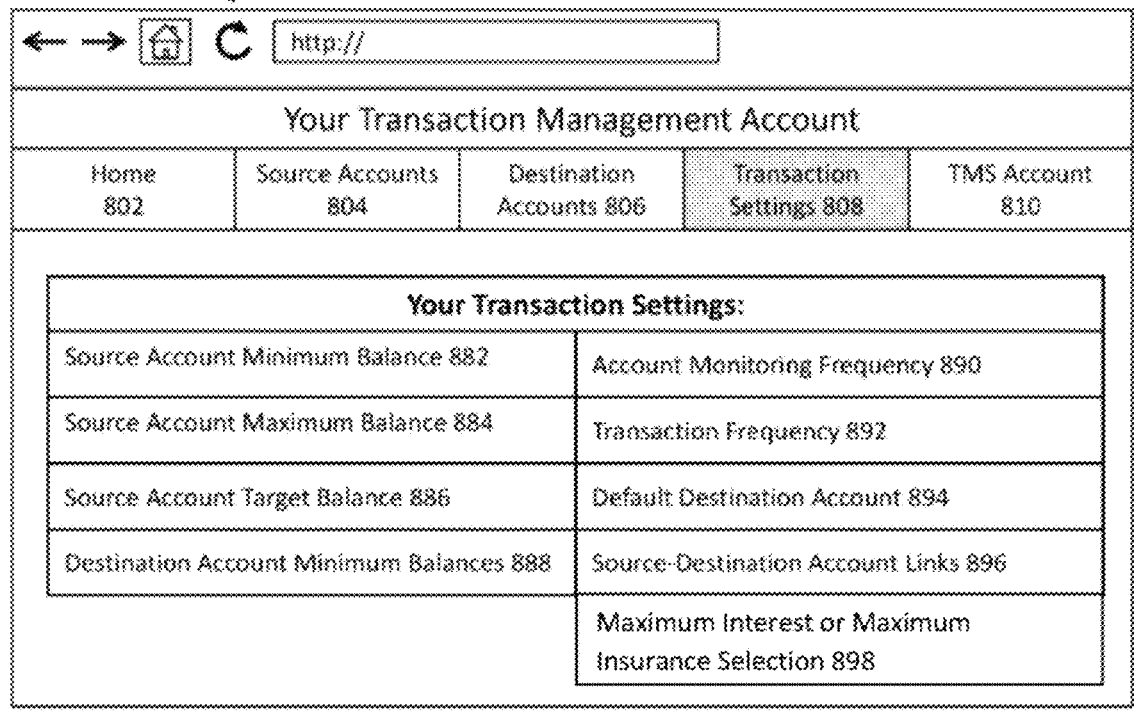
FIG. 8F is a schematic diagram of embodiments of an interface screen for editing transaction settings in accordance with exemplary embodiments of the present invention.

Referring to FIG. 8F, embodiments of a Transactions Settings 808 interface are presented.

These transaction settings are default and/or user-specified settings from which the TMS can generate electronic monitoring rules and/or electronic transaction rules. Listed below are example transaction setting types where a value may be input, an option selected, or a default setting used, to trigger generation of a rule using the setting. In embodiments, a setting may comprise a value (e.g., a threshold value), which may be an absolute value. In other embodiments, the value may be a proportion (e.g., percentage). In exemplary embodiments, the transaction setting types include an option to select maximum interest or maximum insurance coverage.

A Source Account Minimum Balances 882 setting is a minimum balance to be maintained in a source account. The TMS may create a rule to generate transfer instructions to transfer funds from a destination account to the source account to maintain this balance. This threshold minimum balance may be set for each source account individually, or may be used for all accounts. In embodiments, one or more destination accounts may be set for each of the source accounts, or a default one or more destination accounts may be set from which to transfer funds to maintain the source account minimum balance. In embodiments, the threshold minimum balance may be an absolute value or a percentage, e.g., of the account balance.

A Source Account Maximum Balances 884 setting is a maximum balance to be maintained in a source account. Based at least in part upon this threshold, the TMS may generate a rule to perform a subtraction operation or threshold comparison operation to determine when there is an excess amount in the source account over this source account maximum balance threshold, and/or to determine a corresponding excess amount. The rule may then initiate generation of instructions to transfer funds from the respective source account to a client destination account to remove the excess amount. In embodiments, this threshold may be set for each source account.

A Source Account Target Balance 886 setting is a target balance to be maintained in the source account. In embodiments, setting the target balance value may generate a rule to provide an electronic notice to the client device if the source account balance is less than this threshold. In embodiments, violating this target balance (e.g., via one or more executed or pending transactions) may initiate a transfer of funds to restore the target balance.

A Destination Account Minimum Balances 888 setting is a minimum balance to maintain in a destination account. Based at least in part upon this value, the TMS may generate a rule to prevent transfer from this destination account if the transfer transaction will cause the selected destination account balance to drop below the destination account minimum threshold. In embodiments, the TMS 120 may transfer from multiple destination accounts (e.g., according to a predefined order and/or a default order) to avoid violating the destination account minimum balance rule. Thus, the next destination account in an ordered list may be selected by the TMS, when the minimum balance will be violated for a given destination account. The destination account minimum balance threshold may be set for each destination account.

An Account Monitoring Frequency 890 setting may determine how often the TMS 120 monitors the source and/or destination accounts (e.g., once per day, twice per day, every hour, and/or every 5 minutes, to name a few) and/or specific times at which to monitor accounts (e.g., 9 am and/or 5 pm, market open, market close, to name a few). In embodiments, the setting may comprise an instruction to obtain account information following a transaction. This may be a default electronic instruction for the TMS 120.

A Transaction Frequency 892 setting may determine how often the TMS will initiate transfer transactions (e.g., as necessary, no more than once per day, cap of 5 transactions per month, to name a few).

A Default Destination Account 894 setting may allow the client to select a default destination account and/or a default order of destination accounts (e.g., if the first account is insufficient or a transfer will violate a destination account minimum balance rule, then the TMS may use a second account in the order, etc.). In embodiments, a rule may be set to transfer from two accounts a set percentage or amount.

A Source-Destination Account Links 896 setting provides links between source and destination accounts. For example, three source accounts may be linked to one destination account, while a fourth source account may be linked to a second destination account. Thus, in embodiments, the TMS may perform transactions, as described herein, between a source account and the one or more destination accounts to which it is linked in the TMS.

A Maximum Interest or Maximum Insurance Selection 898 setting allows the client to select whether to maximize interest or to maximize insurance coverage on funds held in destination accounts.

Figure 9A:
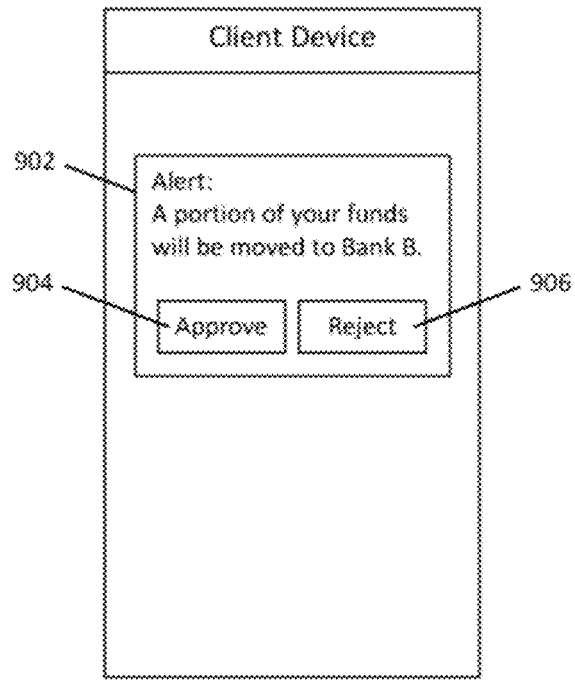
FIGS. 9A-C are screen shots of transaction notifications in accordance with exemplary embodiments of the present invention.
Figure 9B:
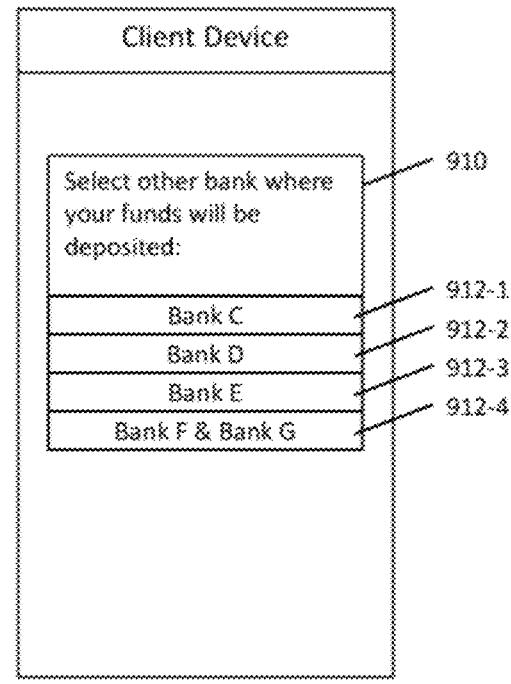
Figure 9C:
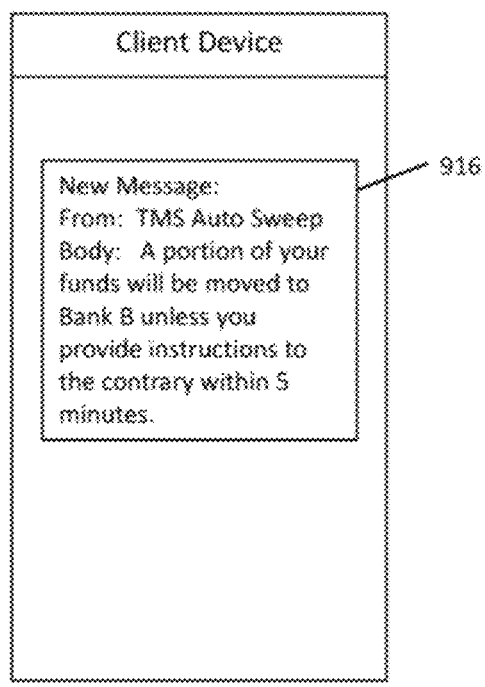

FIGS. 9A-C are exemplary screen shots of transaction notifications in accordance with embodiments of the present invention. The notifications may comprise destination institution management graphical user interfaces. The notifications may indicate to a sweep system customer, such as a deposit sweep system customer, that at least a portion of the customer's funds will be moved to a particular destination institution, such as a depository institution, which may be a depository institution not previously used to hold the customer's funds or not pre-approved by the customer. In embodiments, a customer may not want funds transferred to the particular depository institution for a variety of reasons, such as the existence of additional accounts at that depository institution, which could leave a portion of funds uninsured for being over an insurance limit.

FIG. 9A illustrates a first exemplary notification, which may be provided to a user electronic device, such as a mobile device. The notification 902 indicates that a portion of a user's funds will be moved to a particular bank, e.g., Bank B, which may be a different depository institution than previously used for funds of the deposit sweep customer (or other cash sweep customer). The exemplary notification 902 includes an approve option 904 and a reject option 906, which may be graphically rendered elements and/or hyperlinks. A user may select the approve option 904 to allow the deposit sweep transaction (or other respective cash sweep transaction) to proceed with a movement of the user's funds to the indicated depository institution. In embodiments, the interface may include a transfer amount input element (e.g., a text entry box, a drop-down menu, to name a few), by which the user can specify an amount of funds to allocate and/or transfer to the different depository institution or by which the user can specify a maximum permissible amount of funds to allocate and/or transfer. The user may instead select the reject option 906 to block the transfer, in which case the deposit sweep computer system (or other respective cash sweep computer system) may compute one or more potential reallocations of funds that would exclude the user's funds from the indicated depository institution. Upon selection of a reject option 906, the system may display an interface with alternate depository institution selection options or input options, as illustrated in FIG. 9B. A notification 902 may be a push notification, which may be displayed on a user electronic device, such as a mobile device. In embodiments, the notification 902 may comprise an email, text message, other electronic message, and/or automated telephone call, to name a few.

FIG. 9B shows an exemplary depository institution selection interface 910 in accordance with the present invention. Upon receipt of a user selection of a reject option a client device may display such a selection interface. The interface 910 may request that a user select or input one or more other depository institutions, e.g., banks, where that user's funds may be deposited during a deposit sweep or other cash sweep operation. According the interface 910 may include one or more input elements or selection elements 912 identifying depository institutions available for deposit of the user's funds. Display data indicating the available depository institutions may be received from a transaction management system, which may determine the institutions that have capacity for the user's funds. In embodiments, a plurality of depository institutions, e.g., Bank F and Bank G, may be required to satisfy deposit sweep transaction parameters for a particular deposit sweep operation, and a combination of depository institutions may be presented to a user for selection, as seen from selection option 912-4. The interface 910 may include transfer amount input elements, which may be maximum permissible transfer amounts, for each respective available and/or alternative depository institution.

FIG. 9C illustrates a second exemplary notification, which may be provided to a user electronic device. The notification 916 may indicate that a portion of a user's funds will be moved to a particular depository institution unless the user takes an action to prevent the transfer. In embodiments, the notification may provide a time limit within which the user must act to prevent the transfer successfully. The notification 916 may comprise instructions on how to prevent the transfer, a selectable option (e.g., a rendered GUI element, such as a button) to prevent the transfer, and/or a selectable hyperlink to prevent the transfer, to name a few. In embodiments, the notification 916 may be an informational notification only, providing an indication that at least a portion of the customer's funds have been allocated to a different depository institution, but not providing a mechanism for the user to object to the allocation.

In embodiments, sweep notifications may be provided to indicate that a sweep transaction occurred. Such sweep notifications may include balance information, such as post-sweep balances at one or more institutions and/or pre-sweep balances.

In embodiments, the destination institution management graphical user interface may identify the source account. The interface may include an indication of the amount of funds allocated or targeted for allocation to the different destination depository institution for the first respective customer. The notification may indicate that the allocation will be performed absent selection of a reject option. In embodiments, the notification may indicate a time period within which a reject option must be submitted. The interface may indicate that the allocation will be performed within a predefined period of time absent selection of a reject option. In embodiments, the interface may comprise a transfer amount input element by which a user may input an amount of funds, which may be a maximum amount of funds, permitted to be transferred and/or allocated to the different destination depository institution.

The TMS system 120 may comprise, in embodiments, a computing platform for performing, controlling, and/or initiating computer-implemented operations, for example, via a server and the one or more networks. The computer platform may comprise one or more system computers and other party computers comprising one or more processors. An exemplary system may operate under the control of computer-executable instructions to carry out the process steps described herein. Computer-executable instructions comprise, for example, instructions and data which configure a general or special purpose computer system or processing device to perform a certain function or group of functions. Computer software for the system may comprise, in embodiments, a set of software objects and/or program elements comprising computer-executable instructions collectively having the ability to execute a thread or logical chain of process steps in a single processor, or independently in a plurality of processors that may be distributed, while permitting a flow of data inputs/outputs between components and systems.

Information stored in or maintained in the one or more databases may be provided in conformance with a database system format such as, but not limited to, the Structured Query Language (SQL) format. Database query and access instructions, for example, in the form of one or more scripts, may be used which, when executed by a processor, serve to access, store and retrieve data maintained in the one or more databases according to the instructions contained in the script.

The system may comprise application software instructions which may implement a user interface portion for generating interactive pages or display screens by which a user/participant may provide data to and receive information from the system and the database using a human-machine interface. In embodiments, interactive pages may include user dialog boxes for accepting user entered information. The human-machine interface may comprise a Graphical User Interface (GUI) portion for prompting the user to enter data by providing an interactive dialog box or message box instructing the user to enter particular data, or to select from among a multitude of options provided using a pull-down menu. In embodiments, a user may interact with the system via the graphical user interface by using a pointing device and/or other data entry device. The GUI portion may place the output of the system in a format for presentation to a user via the display. In embodiments, the GUI may be implemented as a sequence of Java instructions.

In embodiments of the present invention, the various program operations as described herein may be provided by the system in response to the one or more processors executing one or more sequences of computer-readable instructions contained in main memory. Such instructions may be read into main memory from another non-transitory computer-readable medium. Execution of the sequences of instructions contained in main memory may cause one or more processors of the system to perform the process steps described herein. It should be appreciated that embodiments of the system may perform fewer or additional processes as compared to those described herein. As noted, the one or more processors may be arranged in a multi-processing arrangement. In embodiments, hard-wired circuitry may be used in place of or in combination with software instructions to implement the invention. Thus, embodiments of the invention are not limited to any specific combination of hardware circuitry and software.

Computer-readable medium or computer-readable storage medium may refer to any medium that is computer-readable and participates in storing and providing instructions to the processor for execution. Such a medium may be removable or non-removable and may be non-volatile media and non-transitory media. Non-volatile media include, for example, optical or magnetic disks, such as the storage device. Common forms of computer-readable media include, for example, floppy disk, a flexible disk, hard disk, magnetic tape, any other magnetic medium, a Compact Disc Read Only Memory (CD ROM), Digital Video Disc (DVD) or any other optical medium, punch cards, paper tape, any other physical medium with patterns of holes, a Random Access Memory (RAM), a Programmable Read Only Memory (PROM), an Erasable Programmable Read Only Memory (EPROM), a Flash EPROM, any other memory chip or cartridge, or any other tangible medium from which a computer can read computer instructions. Combinations of the above are also included within the scope of machine-readable media. Machine-executable instructions comprise, for example, instructions and data which cause a general purpose computer, special purpose computer, or a special purpose processing machine to perform a certain function or group of functions.

In embodiments, the communication system of the TMS 120 may comprise a communication interface that may be communicatively coupled to a web server configured to generate and output web content that is suitable for display using a web browser at a computing device. In embodiments, the server may generate and transmit requested information through the communication interface to a requesting terminal via Hypertext Transfer Markup Language (HTML) formatted pages, extensible Markup Language (XML) formatted pages, or the like, which may be provided as World Wide Web pages that may enable navigation by hyperlinks. The server program may be used to receive commands and data from clients' terminals, access and process data from various sources, and output computer-executable instructions and data using the network. Interactive pages transmitted and received using the network may conform to necessary protocols.

In embodiments, the web server may correspond to a secure web application server behind a web server program that a service provider employs to run one or more web based application programs in a secure fashion. Such a secure web application server may be configured to execute one or more web based application programs, respond to commands and data received from the clients (via a web page supported by the web server), and provide data and results to the clients. The web server and the web application server may be implemented using a single computing platform. Alternatively, it may also be implemented using multiple separate and distributed computing platforms.

As noted above, embodiments of the present invention may be practiced in a networked environment using logical connections to one or more remote computers having processors. Logical connections may include a local area network (LAN) and a wide area network (WAN) that are presented here by way of example and not limitation. Such networked environments are in office-wide or enterprise-wide computer networks, intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments of the invention have been described in the general context of method steps which may be implemented in embodiments by a program product comprising machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based at least in part upon Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

It should be noted that although the flow charts provided herein and the claims show a specific order of method steps, it is understood that the order of these steps may differ from what is depicted and is not limiting on the invention. Also two or more steps may be performed concurrently or with partial concurrence. Such variation will depend on the software and hardware systems chosen and on designer choice. It is understood that all such variations are within the scope of the invention. Likewise, software and web implementations of the present invention may be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations.

All components, modes of communication, and/or processes described heretofore are interchangeable and combinable with similar components, modes of communication, and/or processes disclosed elsewhere in the specification, unless an express indication is made to the contrary. It is intended that any structure or step of an embodiments disclosed herein may be combined with other structure and or method embodiments to form further embodiments with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed:

1. A transaction management system, comprising:
    one or more computers;
    one or more processors operatively connected to the one or more computers; and
    a non-transitory computer-readable memory operatively connected to the one or more processors, the non-transitory computer-readable memory having stored thereon machine readable instructions that, when executed by the one or more processors cause the one or more processors to perform steps of:
    (A) receiving, by the one or more computers, a transaction file comprising transaction information, wherein the transaction management system is arranged to be in electronic communication with depository or destination institutions and programmed to perform operations to allocate, transfer or otherwise move funds between one or more source institutions and one or more depository or destination institutions,
    (B) in response to receiving the transaction file, generating, by the one or more computers, respective first machine readable instructions to trigger the rendering of respective destination institution management graphical user interfaces each comprising respective first display data comprising an electronic transaction parameters input element configured to allow for input of transaction parameters associated with a respective allocation, the transaction parameters comprising a selection of the respective allocation to result in maximum interest or maximum insurance coverage;
    (C) providing, by the one or more computers, to a plurality of respective client devices each associated with a respective customer of a plurality of customers, the respective first machine readable instructions causing each respective client device to activate a respective interface application to trigger the rendering of the respective destination institution management graphical user interface on a respective display screen operatively connected to the respective client device, wherein upon receipt at a respective client device of the first machine readable instructions, the respective client device executes the first machine readable instructions to activate the respective interface application on the respective client device to trigger the rendering of the respective destination institution management graphical user interface including the respective display data including the electronic transaction parameters input element enabling a respective customer associated with the respective client device to input a selection of the responsive allocation to result in maximum interest or maximum coverage;
    (D) receiving, by the one or more computers, respective transaction parameters from the respective client device, the respective transaction parameters comprising a selection of maximum interest or maximum insurance coverage via input through the electronic transaction parameters input element;
    (E) determining, by the one or more computers, based at least in part upon the transaction information and the transaction parameters, allocations of funds for a plurality of customers, the allocations comprising for each respective customer identifications of a respective plurality of destination depository institutions and respective amounts to allocate to each respective destination depository institution, the step of allocating comprising:
        (1) determining, by the one or more computers, a maximum capacity of funds from customers selecting maximum interest allowed to be held at each of the plurality of destination depository institutions;
        (2) determining, by the one or more computers, a maximum capacity of funds from customers selecting maximum insurance coverage allowed to be held at each of the plurality of destination depository institutions;
        (3) determining, by the one or more computers, the allocations so that:
            (a) a total amount of funds from customers selecting maximum interest to be allocated to each respective destination depository institution do not exceed the maximum capacity of funds from customers selecting maximum interest at the destination depository institution;
            (b) a total amount of funds from customers selecting maximum insurance coverage to be allocated to each respective destination depository institution do not exceed the maximum capacity of funds from customers selecting maximum insurance coverage at the destination depository institution; and
            (c) funds from customers selecting maximum interest are allocated to one or more respective destination depository institutions that have the highest interest rate among the plurality of destination depository institutions; and (F) executing, by the one or more computers, the allocations of funds, the step of executing comprising:
  (1) determining, by the one or more computers, that a transaction or transaction data obtained from one or more transaction sources, source institutions or depository institutions or by an account balance in either the source institution or depository institution reaches or exceeds a threshold amount, and
  (2) executing, by the one or more computers, based on the determination, one or more sweep transactions by automatically triggering the allocations of funds such that said threshold amount is no longer exceeded.

2. The transaction management system of claim 1, wherein the step (3)(a) further comprises determining, by the one or more computers, whether a balance of funds from customers selecting maximum interest at each respective destination depository institution exceeds the maximum capacity of funds from customers selecting maximum interest at the destination depository institution.

3. The transaction management system of claim 2, wherein, upon the condition that it is determined a balance of funds from customers selecting maximum interest at a respective destination depository institution exceeds the maximum capacity of funds from customers selecting maximum interest at the destination depository institution, the destination depository institution is determined to be not available for allocation of funds.

4. The transaction management system of claim 2, wherein, upon the condition that it is determined a balance of funds from customers selecting maximum interest at a respective destination depository institution does not exceed the maximum capacity of funds from customers selecting maximum interest at the destination depository institution, the destination depository institution is determined to be available for allocation of funds.

5. The transaction management system of claim 4, wherein non-transitory computer-readable memory further includes machine readable instructions that, when executed by the one or more computers cause the one or more computers to perform the steps of:
  determining, by the one or more computers, an interest rate for each destination depository institution determined to be available for allocation; and
  ranking, by the one or more computers, the destination depository institutions determined to be available based on interest rate.

6. The transaction management system of claim 5, wherein step (3)(c) comprises allocating, by the one or more computers, funds from customers selecting maximum interest to the destination depository institutions determined to be available for allocation based on the interest rate ranking so that, for each customer, funds are allocated to the respective available destination depository institutions in the order of their ranking.

7. The transaction management system of claim 1, wherein executing the allocations of funds comprises updating, by the one or more computers, an electronic ledger.

8. The transaction management system of claim 1, wherein the transaction information comprises debits, credits, and/or balance information associated with a client account, and/or net credits, net debits information associated with a client account.

9. The transaction management system of claim 1, wherein the respective destination institution management graphical user interfaces each comprise a transfer amount input element by which a user may input a maximum amount of funds permitted to be allocated to the at least one of the respective plurality of different destination depository institutions.

10. The transaction management system of claim 1, wherein non-transitory computer-readable memory further includes machine readable instructions that, when executed by the one or more processors cause the one or more processors to perform the step of:
  (g) storing, by the one or more computers, in one or more databases comprising non-transitory computer-readable memory, an indication of each respective selection of maximum interest or maximum insurance coverage, the indication comprising an identification of the respective customer that corresponds to the each respective selection.

11. The transaction management system of claim 1, wherein the maximum capacity of funds from customers selecting maximum insurance coverage allowed to be held at each of the plurality of destination depository institutions is based at least in part upon a maximum insurable amount for FDIC insurance.

12. The transaction management system of claim 1, wherein the transaction information comprises ACH instructions.

* * * * *